US012257832B2

(12) United States Patent
Shimura

(10) Patent No.: US 12,257,832 B2
(45) Date of Patent: Mar. 25, 2025

(54) PRINT HEAD AND LIQUID EJECTING APPARATUS

(71) Applicant: SEIKO EPSON CORPORATION, Tokyo (JP)

(72) Inventor: Atsushi Shimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 18/170,611

(22) Filed: Feb. 17, 2023

(65) Prior Publication Data

US 2023/0264469 A1 Aug. 24, 2023

(30) Foreign Application Priority Data

Feb. 21, 2022 (JP) ................................ 2022-024407

(51) Int. Cl.

| | |
|---|---|
| ***B41J 2/045*** | (2006.01) |
| ***B41J 2/01*** | (2006.01) |
| ***B41J 2/14*** | (2006.01) |
| ***B41J 29/393*** | (2006.01) |
| *B41J 2/165* | (2006.01) |

(52) U.S. Cl.

CPC ............ *B41J 2/04536* (2013.01); *B41J 2/01* (2013.01); *B41J 2/04501* (2013.01); *B41J 2/0451* (2013.01); *B41J 2/04541* (2013.01); *B41J 2/04555* (2013.01); *B41J 2/04571* (2013.01); *B41J 2/04588* (2013.01); *B41J 2/04596* (2013.01); *B41J 2/14* (2013.01); *B41J 29/393* (2013.01); *B41J 2/04581* (2013.01); *B41J 2/14233* (2013.01); *B41J 2002/14241* (2013.01); *B41J 2002/14354* (2013.01); *B41J 2002/14419* (2013.01); *B41J 2002/14491* (2013.01); *B41J 2/16535* (2013.01); *B41J 2029/3937* (2013.01); *B41J 2202/19* (2013.01); *B41J 2202/20* (2013.01)

(58) Field of Classification Search

CPC ........ B41J 2/04536; B41J 2/0451; B41J 2/14; B41J 2002/14491; B41J 2/04541; B41J 2202/19; B41J 2202/20; B41J 2/04501; B41J 2/01; B41J 29/393; B41J 2029/3937; B41J 2/04555; B41J 2/04571; B41J 2/04588; B41J 2/04596; B41J 2/04581; B41J 2/14233; B41J 2/16535; B41J 2002/14241; B41J 2002/14354

See application file for complete search history.

(56) References Cited

U.S. PATENT DOCUMENTS

2019/0238714 A1* 8/2019 Hase .................. H04N 1/00244
2021/0094280 A1* 4/2021 Takagi .................. B41J 29/393

FOREIGN PATENT DOCUMENTS

JP 2001138604 A * 5/2001 ........... B41J 29/393
JP 2021-053864 A 4/2021

* cited by examiner

*Primary Examiner* — Yaovi M Ameh
(74) *Attorney, Agent, or Firm* — Global IP Counselors, LLP

(57) ABSTRACT

A print head ejecting a liquid with respect to a medium and assembled to a liquid ejecting apparatus includes: an ejecting portion ejecting the liquid by receiving a drive signal; an electrically erasable non-volatile memory; and a wireless communication module, in which history information changing in accordance with an operation state of the print head is stored in the non-volatile memory, and the wireless communication module transmits the history information in accordance with a request from an outside.

11 Claims, 21 Drawing Sheets

FIG. 13

| SI[b1,b2,b3] | Ts1 | | | Ts2 | | |
|---|---|---|---|---|---|---|
| | Sa | Sb | Sc | Sa | Sb | Sc |
| [1, 1, 0] | H | L | L | H | L | L |
| [1, 0, 0] | H | L | L | L | H | L |
| [0, 1, 0] | L | H | L | H | L | L |
| [0, 0, 0] | L | H | L | L | H | L |
| [0, 0, 1] | L | L | H | L | L | H |

FIG. 19

| STORAGE REGION | STORAGE INFORMATION | |
|---|---|---|
| M1 | TP | TPth1 |
| M2 | | TPth2 |
| M3 | | TPth3 |
| M4 | | TPc |
| M5 | LDc | LDth1 |
| M6 | | LDth2 |
| M7 | | LDth3 |
| M8 | | LDc |
| M9 | EC | ECth1 |
| M10 | | ECth2 |
| M11 | | ECth3 |
| M12 | | ECc |
| M13 | CEC | CECth1 |
| M14 | | CECth2 |
| M15 | | CECth3 |
| M16 | | CECc |

| STORAGE REGION | STORAGE INFORMATION | |
|---|---|---|
| M17 | CP | CPth1 |
| M18 | | CPth2 |
| M19 | | CPth3 |
| M20 | | CPc |
| M21 | CL | CLth1 |
| M22 | | CLth2 |
| M23 | | CLth3 |
| M24 | | CLc |
| M25 | WP | WPth1 |
| M26 | | WPth2 |
| M27 | | WPth3 |
| M28 | | WPc |

PRINT HEAD AND LIQUID EJECTING APPARATUS

The present application is based on, and claims priority from JP Application Serial Number 2022-024407, filed Feb. 21, 2022, the disclosure of which is hereby incorporated by reference herein in its entirety.

BACKGROUND

1. Technical Field

The present disclosure relates to a print head and a liquid ejecting apparatus.

2. Related Art

From the viewpoint of environmental load reduction in recent years, attention has been focused on so-called refurbished products in which a product having an initial defective product, a used product, or the like is refurbished, finished so as to become comparable to an unused product, and then re-distributed in a market. The amount of waste can be reduced by such refurbished products, and a reduction in environmental load can be achieved as a result. Regarding such efforts and liquid ejecting apparatuses such as ink jet printers, efforts for re-market distribution as recycled machines have been made by, for example, refurbishing and finishing of used ink cartridges, print heads, and so on into a state comparable to a state of non-use.

For example, JP-A-2021-053864 discloses a method for distinguishing the state of a print head in a case where the print head is reused by reading history information stored in the print head used in an ink jet printer that is an example of a liquid ejecting apparatus.

However, in the technique described in JP-A-2021-053864, in reading the history information stored in the print head, it is necessary to use a dedicated jig, wiring, or the like for controlling a storage circuit storing the history information, and there is room for improvement from the viewpoint of easily determining the state of the print head that is reused.

SUMMARY

According to an aspect of the present disclosure, there is provided a print head ejecting a liquid with respect to a medium and assembled to a liquid ejecting apparatus, the print head including:

an ejecting portion ejecting the liquid by receiving a drive signal;

an electrically erasable non-volatile memory; and a wireless communication module, in which history information changing in accordance with an operation state of the print head is stored in the non-volatile memory, and the wireless communication module transmits the history information in accordance with a request from an outside.

According to another aspect of the present disclosure, there is provided a liquid ejecting apparatus including: a drive signal output circuit outputting a drive signal; and a print head ejecting a liquid with respect to a medium and assembled to the liquid ejecting apparatus, in which the print head includes an ejecting portion ejecting the liquid by receiving the drive signal, an electrically erasable non-volatile memory, and a wireless communication module, history information changing in accordance with an operation state of the print head is stored in the non-volatile memory, and the wireless communication module transmits the history information in accordance with a request from an outside.

BRIEF DESCRIPTION OF THE DRAWINGS

FIG. 13 is a diagram illustrating an example of the content of decoding performed by a decoder.

FIG. 19 is a diagram illustrating an example of ejecting portion-related information stored in a storage circuit.

DESCRIPTION OF EXEMPLARY EMBODIMENTS

Preferred embodiments of the present disclosure will be described below with reference to the drawings. The drawings that are used are for convenience of description. It should be noted that the embodiments described below do not unduly limit the content of the present disclosure described in the claims. In addition, not all of the configurations described below are essential configuration requirements of the present disclosure.

1. First Embodiment

1.1 Structure of Liquid Ejecting Apparatus

Figure 1:
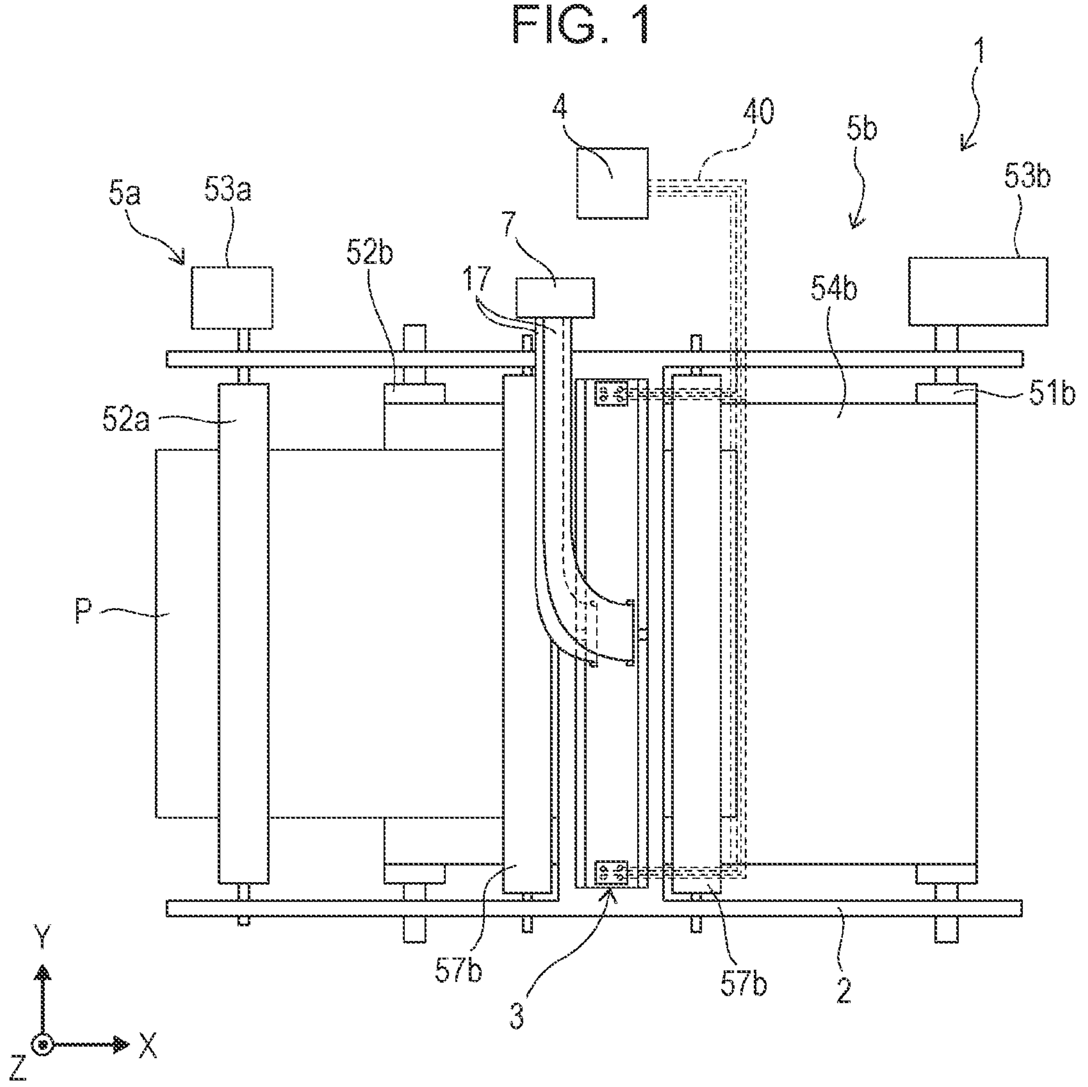
FIG. 1 is a top view illustrating a schematic configuration of a liquid ejecting apparatus.
Figure 2:
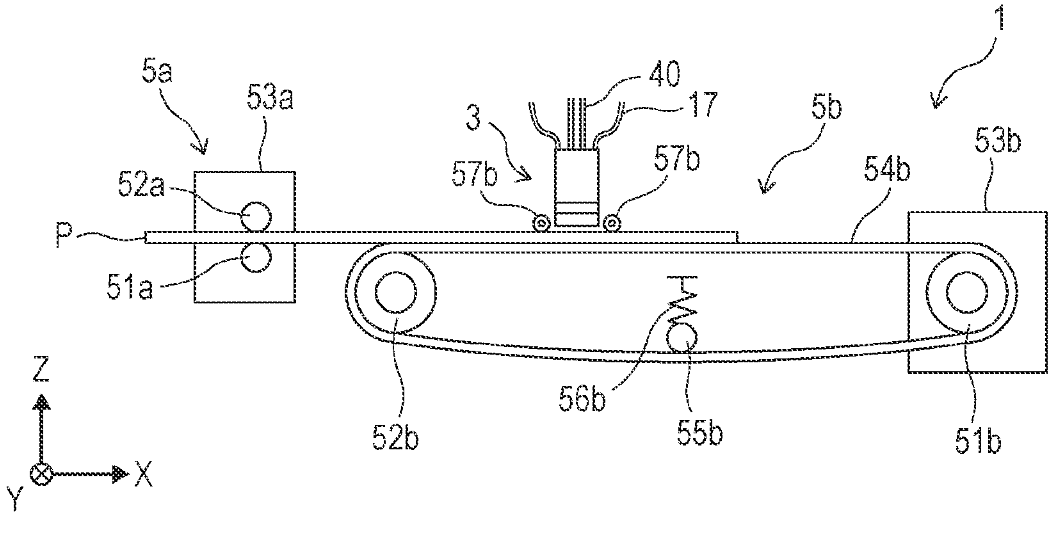
FIG. 2 is a side view illustrating a schematic configuration of the liquid ejecting apparatus.

The structure of a liquid ejecting apparatus 1 will be described. FIG. 1 is a top view illustrating a schematic configuration of the liquid ejecting apparatus 1. FIG. 2 is a side view illustrating a schematic configuration of the liquid ejecting apparatus 1. As illustrated in FIGS. 1 and 2, the liquid ejecting apparatus 1 of the present embodiment will be described by a so-called line-type ink jet printer that performs printing simply by transporting a medium P to which ink is ejected being exemplified. It should be noted that the liquid ejecting apparatus 1 is not limited to the line-type ink jet printer and may be a so-called serial-type ink jet printer in which a print head moves in synchronization with the transport of the medium P.

Here, in the following description, the transport direction in which the medium P is transported will be referred to as the X direction, the direction that is orthogonal to the X direction in the in-plane direction of the ink landing surface of the medium P will be referred to as the Y direction, and the direction that is orthogonal to both the X direction and the Y direction and in which the ink is ejected from a print head 3 to the medium P will be referred to as the Z direction. Further, in some cases, the starting point side of the arrow indicating the illustrated X direction will be referred to as the −X side, the tip side of the arrow indicating the illustrated X direction will be referred to as the +X side, the starting point side of the arrow indicating the illustrated Y direction will be referred to as the −Y side, the tip side of the arrow indicating the illustrated Y direction will be referred to as the +Y side, the starting point side of the arrow indicating the illustrated Z direction will be referred to as the −Z side, and the tip side of the arrow indicating the illustrated Z direction will be referred to as the +Z side. In other words, in the description of the liquid ejecting apparatus 1, the medium P is transported from the −X side toward the +X side and the print head 3 ejects the ink from the +Z side toward the −Z side. It should be noted that although the X direction, the Y direction, and the Z direction are mutually orthogonal in the description of the present embodiment, the present disclosure is not limited to configurations of the liquid ejecting apparatus 1 being disposed so as to be mutually orthogonal.

As illustrated in FIGS. 1 and 2, the liquid ejecting apparatus 1 includes an apparatus main body 2, the print head 3, storage means 4, first transport means **5*a*, and second transport means 5*b***.

The storage means 4 is fixed to the apparatus main body 2. The ink supplied to the print head 3 is stored in the storage means 4. An ink cartridge, a bag-shaped ink pack formed of a flexible film, an ink tank that can be replenished with ink, or the like can be used as the storage means 4. Further, the ink stored in the storage means 4 is supplied to the print head 3 via a supply pipe 40 such as a tube. In addition, the storage means 4 may store ink of a plurality of colors such as black, cyan, magenta, yellow, red, and gray. Accordingly, the storage means 4 may include a plurality of ink cartridges, a plurality of ink packs, and a plurality of ink tanks corresponding to the colors of the stored ink and the supply pipe 40 may include a plurality of tubes corresponding to the colors of the ink stored in the storage means 4. It should be noted that the storage means 4 may be mounted on the print head 3.

The print head 3 is communicably coupled to a print head drive circuit substrate 7 via a cable 17. As a result, various signals for ink ejection control output from the print head drive circuit substrate 7 are input to the print head 3. Then, the print head 3 ejects the ink supplied from the storage means 4 in response to various input signals. It should be noted that details of the print head 3 will be described later.

The first transport means **5*a* is positioned on the −X side of the print head 3. The first transport means 5*a* has a transport roller 51*a*, a driven roller 52*a*, and a drive motor 53*a*. The transport roller 51*a* is positioned on the side of the surface that is opposite to the ink landing surface of the medium P, that is, the −Z side of the medium P. A drive force is supplied from the drive motor 53*a* to the transport roller 51*a*. The transport roller 51*a* is driven in accordance with the drive force supplied from the drive motor 53*a***.

The driven roller **52*a* is positioned on the side of the ink landing surface of the medium P, that is, the +Z side of the medium P. The driven roller 52*a* pinches the medium P with the transport roller 51*a*. The driven roller 52*a* has a biasing member such as a spring (not illustrated). Further, the driven roller 52*a* presses the medium P toward the transport roller 51*a* by the stress that is generated by the biasing member. As a result, the driven roller 52*a* is driven by the driving of the transport roller 51*a***.

At least a part of the second transport means **5*b* is positioned on the +X side of the print head 3. The second transport means 5*b* has a transport roller 51*b*, a driven roller 52*b*, a drive motor 53*b*, a transport belt 54*b*, a tension roller 55*b*, a biasing member 56*b*, and a pressing roller 57*b***.

The transport roller **51*b* is positioned on the +X side of the print head 3 in the direction along the X direction. A drive force is supplied from the drive motor 53*b* to the transport roller 51*b*. The transport roller 51*b* is driven in accordance with the drive force supplied from the drive motor 53*b***.

The driven roller **52*b* is positioned on the −X side of the print head 3** in the direction along the X direction.

The transport belt **54*b* is an endless belt and hung on the outer periphery of the transport roller 51*b* and the driven roller 52*b*. The transport belt 54*b* is positioned on the −Z side of the medium P. Further, the transport belt 54*b* is driven by the transport roller 51*b* being driven by the drive force supplied from the drive motor 53*b* and the driven roller 52*b* is driven by the transport belt 54*b*** being driven.

The tension roller **55*b* abuts against the inner peripheral surface of the transport belt 54*b* between the transport roller 51*b* and the driven roller 52*b*. The tension roller 55*b* applies tension to the transport belt 54*b* by the biasing force that is generated by the biasing member 56*b* such as a spring. As a result, the surface of the transport belt 54*b* that is between the transport roller 51*b* and the driven roller 52*b* and faces the print head 3** is kept substantially flat.

The pressing roller **57*b* is positioned on each of the −X side and the +X side of the print head 3 on the +Z side of the medium P and pinches the medium P with the transport belt 54*b*. As a result, the posture of the medium P facing the print head 3 is kept substantially flat between the pressing roller 57*b* positioned on the −X side of the print head 3 and the pressing roller 57*b* positioned on the +X side of the print head 3**.

In the liquid ejecting apparatus 1 configured as described above, by the first transport means **5*a* and the second transport means 5*b* being driven, the medium P is transported from the −X side toward the +X side along the X direction and the print head 3 ejects ink at a predetermined timing synchronized with the transport of the medium P. As a result, the ink ejected from the print head 3** lands at a desired position of the medium P. As a result, a desired image is formed on the medium P.

1.2 Structure of Print Head

Figure 3:
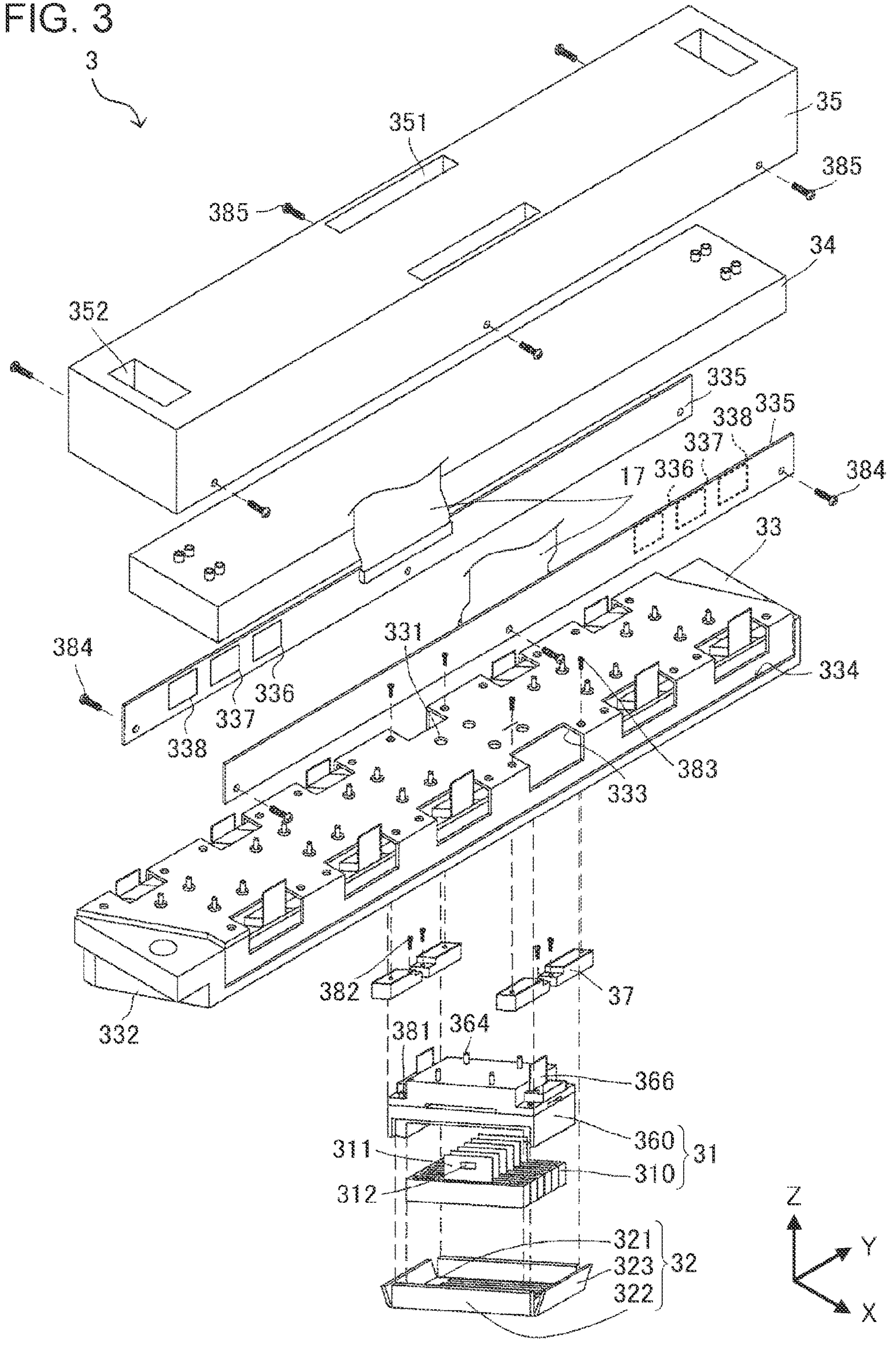
FIG. 3 is an exploded perspective view illustrating the structure of a print head.

Next, the structure of the print head 3 will be described. FIG. 3 is an exploded perspective view illustrating the structure of the print head 3. As illustrated in FIG. 3, the print head 3 has a plurality of head main bodies 31, a plurality of covers 32, a base member 33, a flow path member 34, and a cover member 35. Here, the plurality of covers 32 and the plurality of head main bodies 31 of the print head 3 are provided in one-to-one correspondence. In other words, the print head 3 has a plurality of sets of the head main body 31 and the cover 32. It should be noted that FIG. 3 exemplifies a case where the print head 3 has six sets of the head main body 31 and the cover 32 and yet the present disclosure is not limited thereto.

Figure 4:
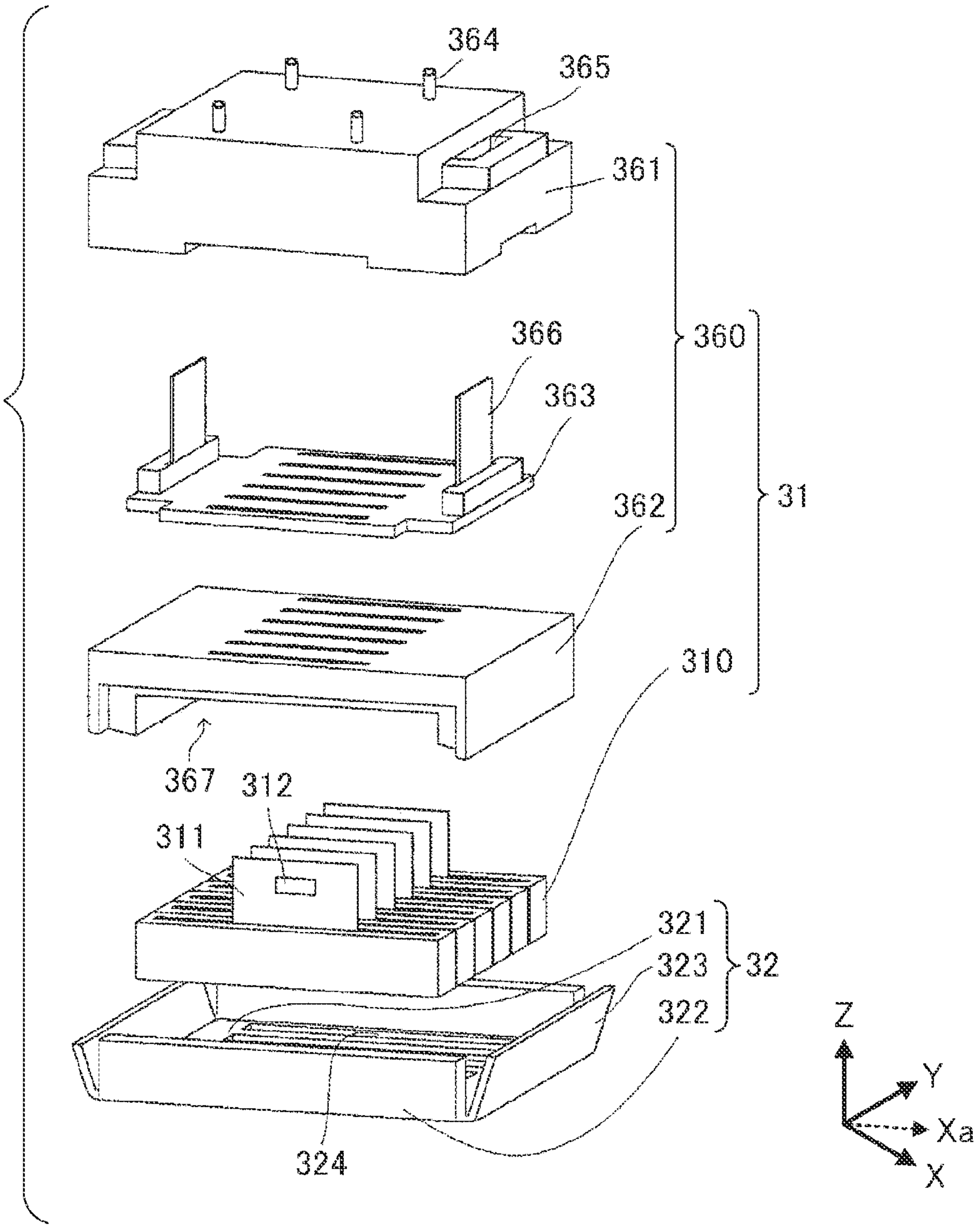
FIG. 4 is an exploded perspective view illustrating the structure of a head main body.
Figure 5:
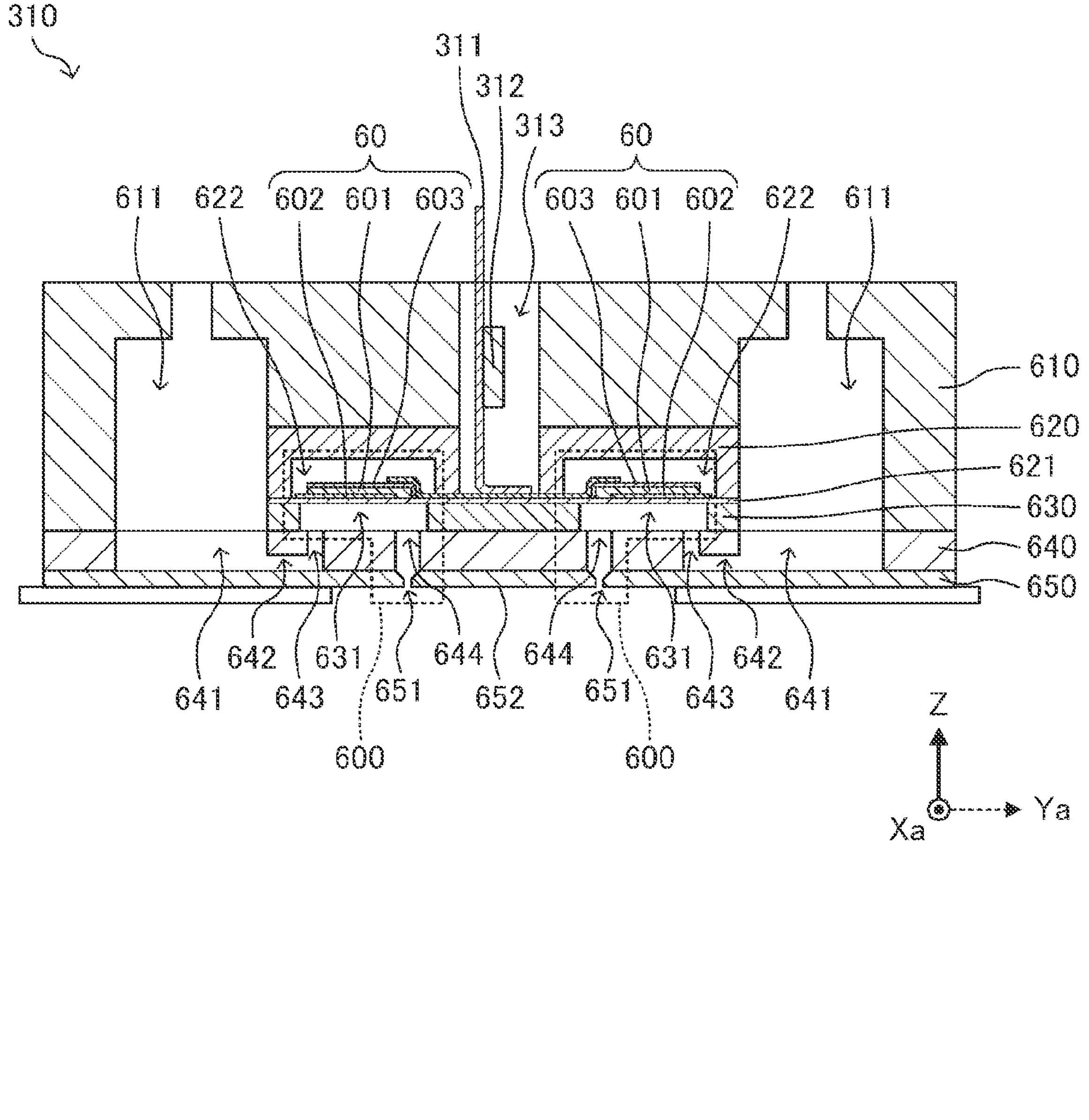
FIG. 5 is a cross-sectional view illustrating the structure of a head chip of the head main body.

First, the structure of the head main body 31 will be described. FIG. 4 is an exploded perspective view illustrating the structure of the head main body 31. FIG. 5 is a cross-sectional view illustrating the structure of a head chip 310 of the head main body 31. As illustrated in FIG. 4, the head main body 31 has a plurality of the head chips 310 and a holding member 360. It should be noted that FIG. 4 exemplifies a case where the head main body 31 has six head chips 310 and yet the present disclosure is not limited thereto.

As illustrated in FIG. 5, the head chip 310 has a case 610, a protective substrate 620, a pressure chamber substrate 630, a flow path substrate 640, and a nozzle plate 650. The case 610, the protective substrate 620, the pressure chamber substrate 630, the flow path substrate 640, and the nozzle plate 650 are bonded by an adhesive (not illustrated) or the like.

The nozzle plate 650 has a plurality of ink ejecting nozzles 651. Specifically, the nozzle plate 650 is provided with two nozzle rows along the Ya direction and the plurality of nozzles 651 are arranged in parallel along the Xa direction in the two nozzle rows. Here, the Xa direction is a direction inclined with respect to the X direction, which is the transport direction of the medium P, and the Ya direction is a direction intersecting with the Xa direction on the X-Y plane defined by the X direction and the Y direction. In other words, the head main body 31 is provided such that the direction in which the nozzles 651 of the head chip 310 are arranged in parallel is inclined with respect to the X direction, which is the transport direction of the medium P. It should be noted that the nozzle rows formed in the head main body 31 are not limited to two rows and may be one row or three or more rows. Here, in the following description, the −Z side surface where the nozzle 651 opens in the nozzle plate 650 may be referred to as a nozzle surface 652.

The pressure chamber substrate 630 is positioned on the +Z side of the nozzle plate 650. The pressure chamber substrate 630 has a plurality of pressure generation chambers 631 partitioned by a partition wall or the like. The plurality of pressure generation chambers 631 are provided so as to correspond to the nozzles 651. In other words, the pressure chamber substrate 630 has the same number of pressure generation chambers 631 as the nozzles 651 provided in the nozzle plate 650. The plurality of pressure generation chambers 631 of the pressure chamber substrate 630 are arranged in parallel along the Xa direction and arranged in two rows along the Ya direction.

The flow path substrate 640 is positioned on the +Z side of the nozzle plate 650 and the −Z side of the pressure chamber substrate 630. In other words, the flow path substrate 640 is positioned between the nozzle plate 650 and the pressure chamber substrate 630 along the Z direction. The flow path substrate 640 has a branch flow path 642, a communication flow path 643, an individual flow path 644, and a common flow path 641 for supplying ink to each of the plurality of nozzles 651.

The individual flow path 644 allows the nozzles 651 and the pressure generation chambers 631 to communicate with each other on a one-to-one basis. The common flow path 641 is provided in common with respect to the plurality of pressure generation chambers 631 of the pressure chamber substrate 630 and the plurality of nozzles 651 of the nozzle plate 650. Ink is supplied from the storage means 4 to the common flow path 641. The ink supplied to the common flow path 641 is supplied to the corresponding pressure generation chamber 631 after branching in the branch flow path 642 and the communication flow path 643 provided so as to correspond to the pressure generation chamber 631. In other words, the branch flow path 642 and the communication flow path 643 allow the common flow path 641 and the corresponding pressure generation chamber 631 to communicate with each other.

The flow path substrate 640 configured as described above supplies the ink supplied to the common flow path 641 to the pressure generation chamber 631 via the communication flow path 643 after causing the ink to branch so as to correspond to each of the plurality of pressure generation chambers 631 in the branch flow path 642.

A diaphragm 621 is bonded to the +Z side surface of the pressure chamber substrate 630. In addition, a plurality of piezoelectric elements 60 respectively corresponding to the plurality of pressure generation chambers 631 are provided on the +Z side surface of the diaphragm 621.

The piezoelectric element 60 includes electrodes 602 and 603 and a piezoelectric layer 601. The electrodes 602 and 603 and the piezoelectric layer 601 are stacked in the order of the electrode 602, the piezoelectric layer 601, and the electrode 603 from the −Z side toward the +Z side along the Z direction on the +Z side surface of the diaphragm 621. At this time, one of the electrodes 602 and 603 of each piezoelectric element 60 is configured as an individual electrode that supplies a signal of an individual potential to the plurality of piezoelectric elements 60 of the head chip 310 and the other of the electrodes 602 and 603 of each piezoelectric element 60 is configured as a common electrode that supplies a signal of a common potential to the plurality of piezoelectric elements 60 of the head chip 310. It should be noted that the electrode 602 is described as an individual electrode and the electrode 603 is described as a common electrode in the present embodiment and yet the present disclosure is not limited thereto.

In the piezoelectric element 60 configured as described above, the piezoelectric layer 601 is deformed in accordance with the potential difference generated between the electrode 602 and the electrode 603. In other words, the piezoelectric element 60 is driven in accordance with the potential difference between the potential of the signal supplied to the electrode 602 and the potential of the signal supplied to the electrode 603. Then, the diaphragm 621 to which the piezoelectric element 60 is coupled is displaced by the piezoelectric element 60 being driven.

The internal pressure of the pressure generation chamber 631 decreases in a case where the diaphragm 621 is displaced to the +Z side by driving the piezoelectric element 60. As a result, the ink stored in the common flow path 641 is supplied to the pressure generation chamber 631 via the branch flow path 642 and the communication flow path 643. On the other hand, the internal pressure of the pressure generation chamber 631 rises in a case where the diaphragm 621 is displaced to the −Z side by driving the piezoelectric element 60. As a result, the ink stored in the pressure generation chamber 631 is ejected from the nozzle 651 via the individual flow path 644. Here, the configuration that includes the piezoelectric element 60, the pressure generation chamber 631, the individual flow path 644, and the nozzle 651 corresponds to an ejecting portion 600 ejecting ink from the print head 3.

The protective substrate 620 is positioned on the +Z side of the diaphragm 621. The protective substrate 620 has a holding portion 622 for protecting the piezoelectric element 60. The holding portion 622 forms a space that has a sufficient size with respect to the displacement of the piezoelectric element 60 entailed by the driving of the piezoelectric element 60.

The case 610 is positioned on the +Z side of the flow path substrate 640 and the protective substrate 620. The case 610 has a manifold 611, which is a common liquid chamber communicating with the common flow path 641 of the flow path substrate 640. The manifold 611 is a space storing the ink supplied to the plurality of nozzles 651 in the head chip 310 and is continuously provided over the plurality of nozzles 651 and the plurality of pressure generation chambers 631. The ink supplied to the manifold 611 is supplied to the common flow path 641.

In addition, the protective substrate 620 and the case 610 include a through hole 313 that penetrates the protective substrate 620 and the case 610 along the Z direction. A flexible wiring substrate 311 is inserted through the through hole 313. Then, one end of the flexible wiring substrate 311 is electrically coupled to a lead electrode pulled out from the electrodes 602 and 603 of the piezoelectric element 60. A signal propagated through the flexible wiring substrate 311 is supplied to the piezoelectric element 60. In addition, an integrated circuit 312 is mounted on the flexible wiring substrate 311. A signal for driving the piezoelectric element 60 propagating on the flexible wiring substrate 311 is input to the integrated circuit 312. The integrated circuit 312 generates a signal for individually driving the plurality of piezoelectric elements 60 of the head chip 310 based on the input signal and outputs the signal to the corresponding piezoelectric element 60. In other words, the integrated circuit 312 controls the timing of driving each of the plurality of piezoelectric elements 60 and the drive amount of each of the plurality of piezoelectric elements 60 based on the input signal. As a result, the ejecting portion 600 including the corresponding piezoelectric element 60 ejects a predetermined amount of ink at a predetermined timing.

The head chip 310 configured as described above is held by the holding member 360 in the head main body 31. As illustrated in FIG. 4, the holding member 360 includes a flow path member 361, a holder 362, and a wiring substrate 363.

The flow path member 361 has an ink flow path for branching and supplying the ink supplied from the storage means 4 so as to correspond to each head chip 310. The ink flow path of the flow path member 361 communicates with an ink supply portion 364 provided on the +Z side surface of the flow path member 361. In other words, the ink supplied from the storage means 4 is supplied to the flow path member 361 via the ink supply portion 364. Here, the flow path member 361 may be provided with a plurality of ink flow paths respectively corresponding to the ink supply portions 364. It should be noted that a case where the flow path member 361 has four ink supply portions 364 is illustrated in FIG. 4 and yet the present disclosure is not limited thereto. In addition, a filter for removing foreign matter such as dust and air bubbles contained in ink may be provided in the flow path member 361.

Cable insertion holes 365 penetrating the flow path member 361 in the Z direction are provided in both end portions of the flow path member 361 facing each other in the X direction. A cable 366 of the wiring substrate 363, which will be described later, is inserted through the cable insertion hole 365.

The holder 362 is positioned on the +Z side of the flow path member 361 and fixed to the flow path member 361 by a screw 381 illustrated in FIG. 3. The holder 362 has a holding portion 367. The holding portion 367 is a groove-shaped space that is continuous over the Y direction and opens on both side surfaces facing each other along the Y direction on the −Z side surface of the holder 362. The plurality of head chips 310 are bonded to the holding portion 367. As a result, the plurality of head chips 310 are held by the holding member 360.

In addition, an ink flow path that communicates with the ink flow path provided in the flow path member 361 is provided in the holder 362. The ink supplied from the ink supply portion 364 is supplied to each head chip 310 via the ink flow path provided in the flow path member 361 and the ink flow path provided in the holder 362.

The wiring substrate 363 is positioned between the flow path member 361 and the holder 362. The flexible wiring substrate 311 of each head chip 310 is electrically coupled to the wiring substrate 363. In addition, the cable 366 is provided on the wiring substrate 363. The wiring substrate 363 configured as described above branches and propagates a signal input via the cable 366 to the corresponding head chip 310 and outputs a signal output by the head chip 310 to the outside of the head main body 31 via the cable 366.

In addition, at least a part of the head main body 31 is covered with the cover 32. As a result, the risk of ink droplets that float in the liquid ejecting apparatus 1 adhering to the head chip 310 is reduced. In other words, the cover 32 protects the head chip 310 of the head main body 31 from ink droplets.

The cover 32 is provided on the −Z side of the plurality of head chips 310 provided in the head main body 31. Further, the cover 32 and the head main body 31 are bonded by an adhesive (not illustrated). As illustrated in FIG. 4, the cover 32 has a base portion 321 and extending portions 322 and 323. The base portion 321 is a plate-shaped member provided on the nozzle surface 652 side of the head chip 310 of the head main body 31 and is bonded to the −Z side surface of the head main body 31 by an adhesive (not illustrated). The extending portion 322 is a plate-shaped member positioned in both end portions of the base portion 321 in the Y direction and extending toward the +Z side and has a size that covers the Y direction of the head main body 31. In addition, the extending portion 323 is a plate-shaped member positioned in both end portions of the base portion 321 in the X direction and extending toward the +Z side and has a size that covers the Y direction of the head main body 31. In other words, the cover 32 protects the head chip 310 from ink droplets floating in the liquid ejecting apparatus 1 by a space being formed by the base portion 321 and the extending portions 322 and 323 and the head main body 31 being inserted into the formed space.

In addition, the base portion 321 has an opening portion 324. The opening portion 324 is positioned so as to correspond to the nozzle row of the head chip 310. As a result, the ink ejected from the head chip 310 lands on the medium P without being hindered by the cover 32.

Returning to FIG. 3, the base member 33 has an accommodation portion 332 including an accommodation space opening to the −Z side. In the accommodation space of the accommodation portion 332, the plurality of head main bodies 31 are held in a state of being accommodated. Specifically, the head main body 31 is accommodated in the accommodation portion 332 such that the nozzle surface 652 protrudes to the −Z side beyond the accommodation portion 332. At this time, each of the plurality of head main bodies 31 is accommodated such that the nozzle row is in the direction along the Xa direction inclined with respect to the X direction.

In addition, the head main body 31 is fixed to the base member 33 via a spacer 37. The spacer 37 is fixed to the +Z side surface of the head main body 31 by a screw 382. In addition, the spacer 37 is fixed to the −Z side surface of the base member 33 by a screw 383. In other words, the head main body 31 is fixed to the base member 33 via the spacer 37. The head main body 31 can be easily attached and detached to and from the base member 33 by the spacer 37 fixed to the head main body 31 by the screw 382 being fixed to the base member 33 by the screw 383 as described above. It should be noted that the spacer 37 and the head main body 31 are not limited to being fixed by means of the screw 382 and the spacer 37 and the head main body 31 may be fixed by being bonded by means of an adhesive. In addition, the spacer 37 and the head main body 31 may be integrally configured.

In addition, the base member 33 has a supply hole 331 penetrating the base member 33 in the Z direction. The ink supply portion 364 of the head main body 31 fixed to the base member 33 is inserted through the supply hole 331. In addition, the base member 33 has an opening portion 333 penetrating the base member 33 in the Z direction. The cable 366 of the head main body 31 fixed to the base member 33 is inserted through the opening portion 333.

A step 334 opening to the Z2 side is positioned on the outer peripheries of the accommodation portion 332 that face each other in the direction along the X direction. A wiring substrate 335 is accommodated in the step 334. The cable 366 of each of the head main bodies 31 led out from the opening portion 333 is electrically coupled to the wiring substrate 335. In other words, a signal input to each of the plurality of head main bodies 31 and a signal output from the plurality of head main bodies 31 propagate through the wiring substrate 335.

In addition, integrated circuits 336, 337, and 338 are mounted on the wiring substrate 335. It should be noted that at least one of two wiring substrates 335 may be provided with the integrated circuits 336, 337, and 338 although the print head 3 illustrated in the present embodiment exemplifies a case where each of the two wiring substrates 335 is provided with the integrated circuits 336, 337, and 338.

Further, the cable 17 electrically coupled to the print head drive circuit substrate 7 fixed to the apparatus main body 2 is attached to the wiring substrate 335. As a result, various signals output by the print head drive circuit substrate 7 are input to the print head 3.

The flow path member 34 is positioned on the +Z side of the base member 33. The flow path member 34 distributes and supplies the ink supplied from the storage means 4 to each of the plurality of head main bodies 31. An ink flow path for supplying the ink supplied from the storage means 4 to the plurality of head main bodies 31 is provided in the flow path member 34. The ink flow path provided in the flow path member 34 communicates with the supply pipe 40 coupled to the storage means 4 and communicates with the ink supply portion 364 of the head main body 31 via the base member 33. As a result, the ink supplied from the storage means 4 is supplied to the corresponding head main body 31.

The cover member 35 is provided on the +Z side of the flow path member 34. The cover member 35 is a box-shaped member that covers the flow path member 34 and the wiring substrate 335. The cover member 35 is provided with an opening portion 351 for inserting the cable 17 and an opening portion 352 for inserting the supply pipe 40. The cover member 35 as described above is fixed to the accommodation portion 332 of the base member 33 by a screw 385.

As described above, the print head 3 is the print head 3 that is assembled to the liquid ejecting apparatus 1 ejecting ink with respect to the medium P and has the ejecting portion 600 ejecting ink in response to a signal supplied to the electrode 602 that is an individual electrode. In addition, the print head 3 includes the plurality of head main bodies 31 and the wiring substrate 335 coupled in common to the plurality of head main bodies 31.

1.3 Functional Configuration of Liquid Ejecting Apparatus

Figure 6A:
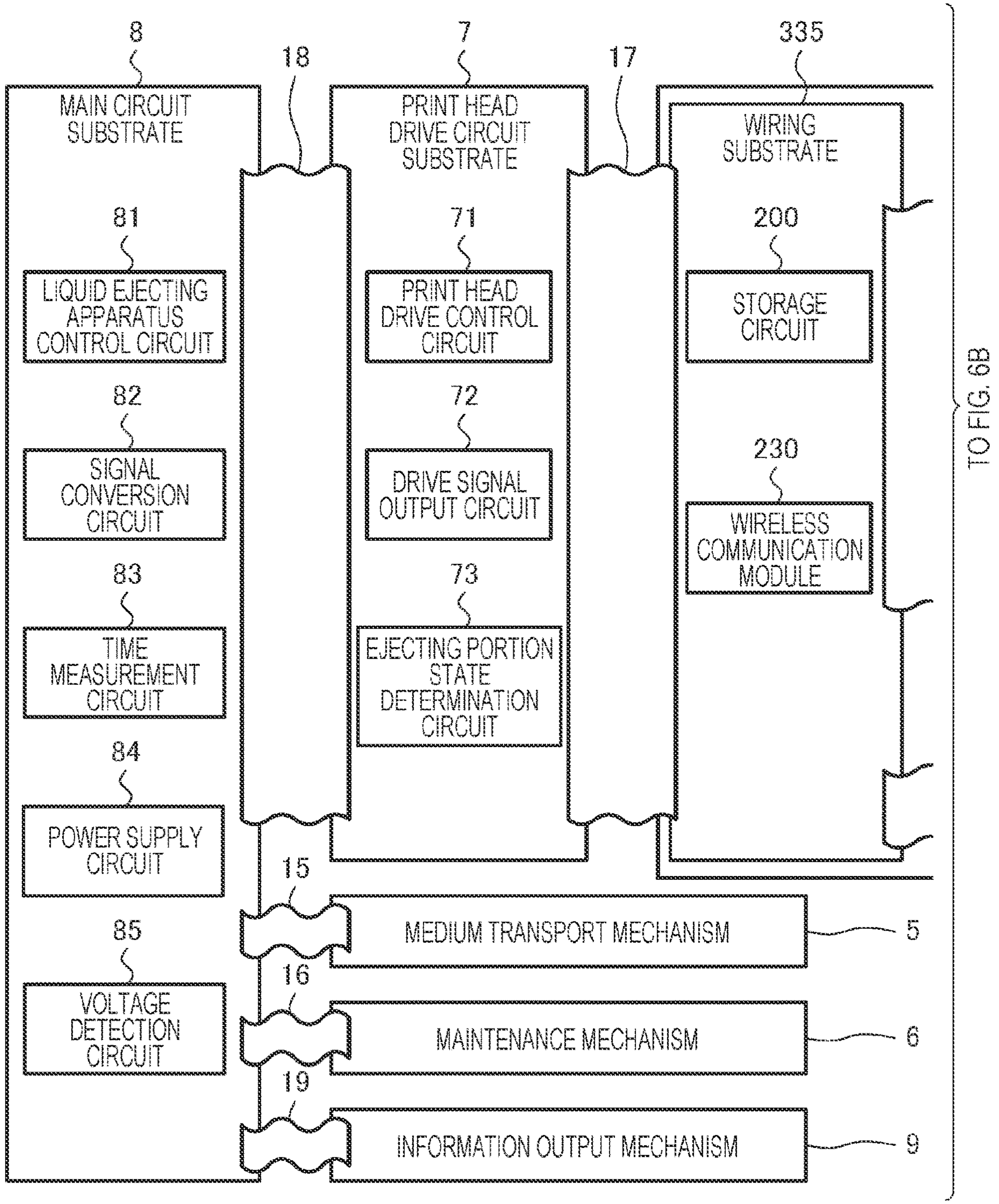
FIGS. 6A and 6B are diagrams illustrating the functional configuration of the liquid ejecting apparatus.
Figure 6B:
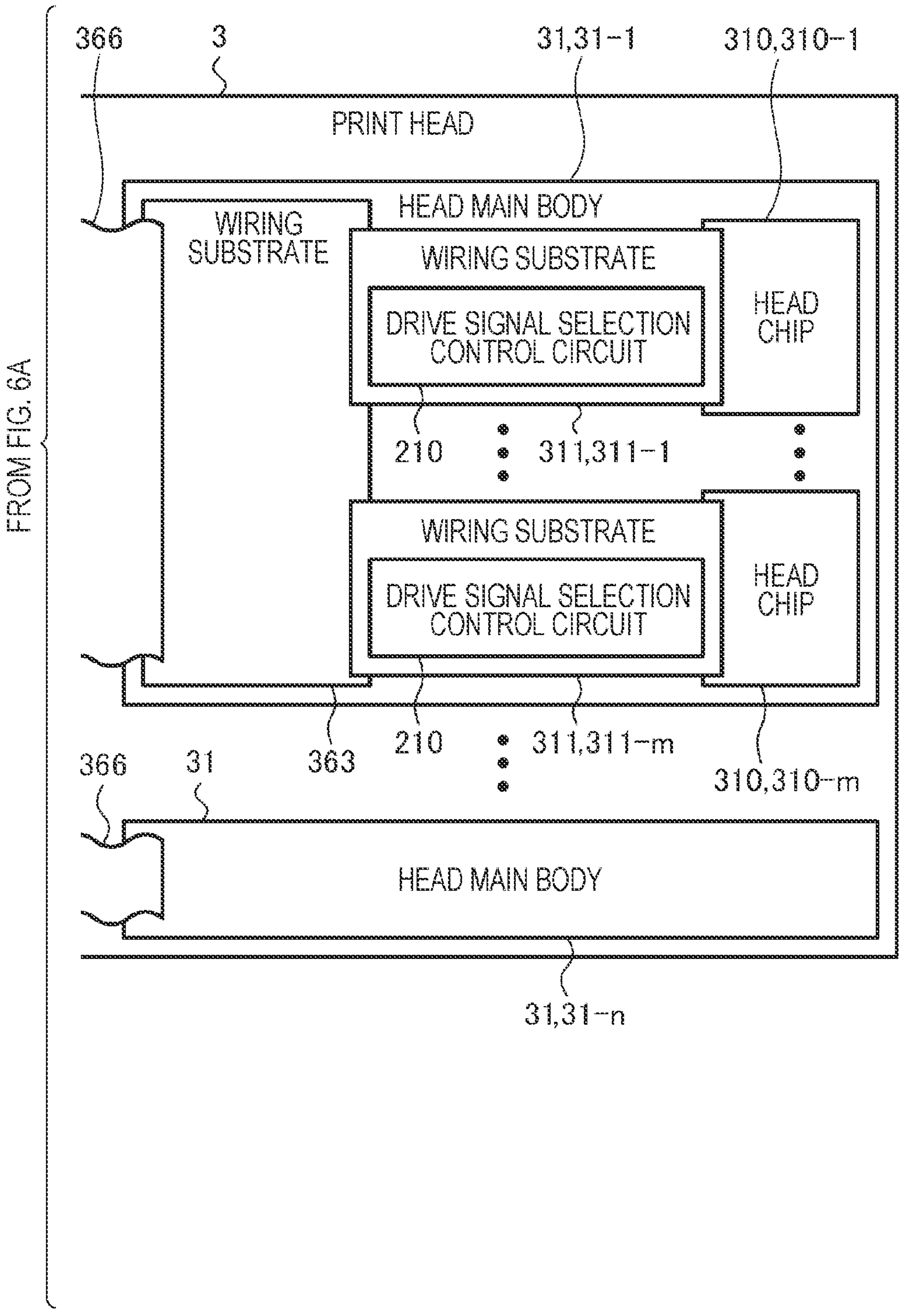

Next, the functional configuration of the liquid ejecting apparatus 1 will be described. FIGS. 6A and 6B are diagrams illustrating the functional configuration of the liquid ejecting apparatus 1.

From the viewpoint of environmental load reduction in recent years, attention has been focused on so-called refurbished products in which a product having an initial defective product, a used product, or the like is refurbished, finished so as to become comparable to an unused product, and then re-distributed in a market. The amount of waste can be reduced by such refurbished products, and a reduction in environmental load can be achieved as a result. Regarding such efforts and liquid ejecting apparatuses such as ink jet printers, efforts for re-market distribution as recycled machines have been made by, for example, refurbishing and finishing of used ink cartridges, print heads, and so on into a state comparable to a state of non-use.

In a case where a refurbished ink cartridge is reused, the used ink cartridge is collected and the collected ink cartridge is replenished with ink suitable for the structure of the ink cartridge and the specifications of a liquid ejecting apparatus in which the ink cartridge is used. When the ink with which the ink cartridge has been replenished is in an appropriate state in a case where the ink cartridge refurbished as described above is reused in the liquid ejecting apparatus, the liquid ejecting apparatus executes operation comparable to an unused product and, because the ink cartridge is mostly a structure that can be easily attached and detached, a user can easily replace the ink cartridge with an ink cartridge replenished with appropriate ink even in a case where the ink with which the ink cartridge has been replenished is not in an appropriate state.

On the other hand, in a case where a refurbished print head is reused, a liquid ejecting apparatus in which an initial defective product has occurred, a used liquid ejecting apparatus, or the like needs to be collected, the print head needs to be removed from the collected liquid ejecting apparatus, the presence or absence of deteriorated and abnormal components in the removed print head needs to be investigated, and the deteriorated and abnormal components found by the investigation need to be, for example, replaced or maintained.

However, the print head is assembled to the liquid ejecting apparatus by a screw or fitting rather than a configuration that is assumed to be attached and detached by a user. Therefore, a great deal of effort is required in removing the print head from the collected liquid ejecting apparatus. Further, as a plurality of components constitute the print head, the components constituting the print head are different in deterioration state. Therefore, in order to determine the deterioration state of the print head, the deterioration states of the components constituting the print head need to be individually checked. However, the print head may include hundreds to thousands of ink ejecting nozzles and it takes a great deal of effort to individually check the deterioration states thereof.

Further, in a case where a print head including a deteriorated or abnormal component is reused and assembled to a liquid ejecting apparatus, ink ejection characteristics in the liquid ejecting apparatus may deteriorate in a short period of time and the service life of the liquid ejecting apparatus may decrease. Therefore, in reusing a refurbished print head in a liquid ejecting apparatus, a great deal of effort is required to accurately determine the state of the print head while the state of the print head needs to be accurately determined.

In response to such a request, the liquid ejecting apparatus 1 of the present embodiment as illustrated in FIGS. 6A and 6B includes a drive signal output circuit 72 that outputs a drive signal and the print head 3 that ejects ink onto the medium P and is assembled to the liquid ejecting apparatus 1, and the print head 3 has the ejecting portion 600 included in the head chip 310 ejecting ink in response to the drive signal, an electrically erasable storage circuit 200, and a wireless communication module 230. Further, the storage circuit 200 stores history information that changes in accordance with the operation state of the print head 3, and the state of the print head 3 refurbished for the purpose of reuse can be easily and accurately determined by the wireless communication module 230 transmitting the history information stored in the storage circuit 200 in accordance with a request from the outside.

Details of the functional configuration of the liquid ejecting apparatus 1 as described above will be described. As illustrated in FIGS. 6A and 6B, the liquid ejecting apparatus 1 has the print head 3, the print head drive circuit substrate 7, a main circuit substrate 8, a medium transport mechanism 5, a maintenance mechanism 6, and an information output mechanism 9. In addition, the liquid ejecting apparatus 1 has cables 15, 16, 17, 18, and 19 electrically coupling the print head 3, the print head drive circuit substrate 7, the main circuit substrate 8, the medium transport mechanism 5, the maintenance mechanism 6, and the information output mechanism 9.

The cable 15 electrically couples the main circuit substrate 8 and the medium transport mechanism 5. The cable 16 electrically couples the main circuit substrate 8 and the maintenance mechanism 6. The cable 17 electrically couples the print head drive circuit substrate 7 and the print head 3. The cable 18 electrically couples the main circuit substrate 8 and the print head drive circuit substrate 7. The cable 19 electrically couples the main circuit substrate 8 and the information output mechanism 9.

It should be noted that the print head 3 has n head main bodies 31 and each of the n head main bodies 31 has m head chips 310, as illustrated in FIG. 6B, in the following description of the functional configuration of the liquid ejecting apparatus 1. In other words, the print head 3 has a total of n×m head chips 310 in the following description. Further, in the following description, the n head main bodies 31 may be referred to as head main bodies 31-1 to **31-*n* in a case where the n head main bodies 31 are distinguished and, similarly, the m head chips 310 may be referred to as head chips 310-1 to 310-*m* in a case where the m head chips 310** are distinguished.

1.3.1 Functional Configuration of Main Circuit Substrate

The main circuit substrate 8 generates a signal for controlling each configuration of the liquid ejecting apparatus 1 based on image data input from a host computer or the like provided outside the liquid ejecting apparatus 1 and outputs the signal to the corresponding configuration.

Figure 7:
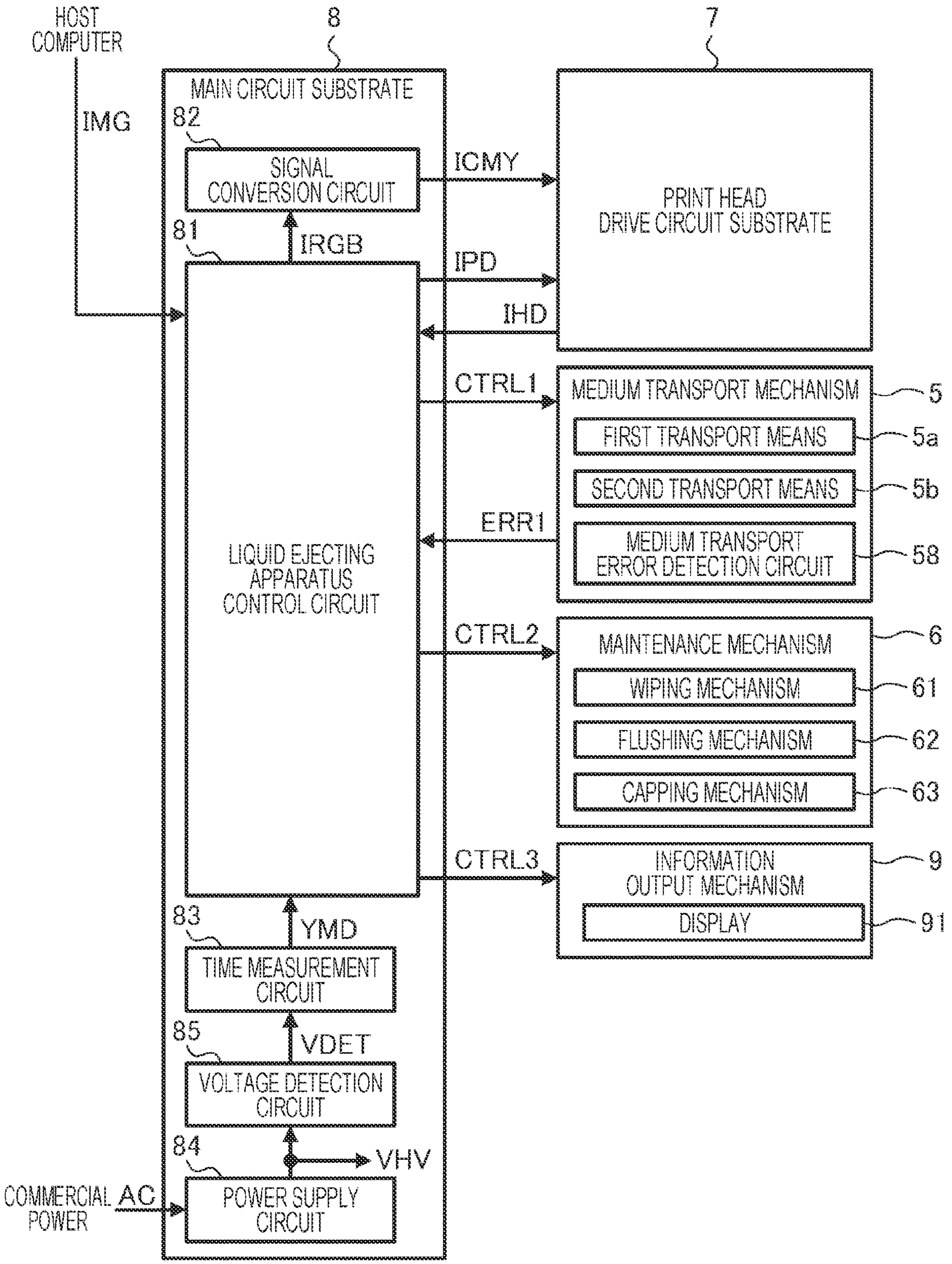
FIG. 7 is a diagram illustrating an example of the functional configuration of a main circuit substrate.

FIG. 7 is a diagram illustrating an example of the functional configuration of the main circuit substrate 8. As illustrated in FIG. 7, the main circuit substrate 8 has a liquid ejecting apparatus control circuit 81, a signal conversion circuit 82, a time measurement circuit 83, a power supply circuit 84, and a voltage detection circuit 85.

Commercial power AC is input to the power supply circuit 84. The power supply circuit 84 converts the input commercial power AC into a voltage VHV, which is a direct current voltage of 42 V or the like, and outputs the voltage VHV. The voltage VHV output from the power supply circuit 84 is input to the voltage detection circuit 85 and used as the power supply voltage of each configuration of the liquid ejecting apparatus 1. Here, in each configuration of the liquid ejecting apparatus 1, the voltage VHV may be used as it is as the power supply voltage and a drive voltage or, after conversion into various voltage values such as 3.3 V, 5 V, and 7.5 V by a voltage conversion circuit (not illustrated), a voltage signal of the voltage value resulting from the conversion may be used as the power supply voltage and the drive voltage.

The voltage detection circuit 85 detects, based on the voltage value of the voltage VHV, whether or not the power supply voltage of commercial power or the like is supplied in the liquid ejecting apparatus 1. Then, the voltage detection circuit 85 generates a voltage detection signal VDET having a logic level corresponding to the result of the detection and outputs the voltage detection signal VDET to the time measurement circuit 83. For example, the voltage detection circuit 85 outputs the H-level voltage detection signal VDET to the time measurement circuit 83 in a case where the voltage value of the voltage VHV exceeds a predetermined value and outputs the L-level voltage detection signal VDET to the time measurement circuit 83 in a case where the voltage value of the voltage VHV is equal to or lower than the predetermined value. It should be noted that the voltage detection circuit 85 may change the logic level of the voltage detection signal VDET based on a voltage value different from the voltage VHV and may change the logic level of the voltage detection signal VDET based on whether or not the commercial power AC is supplied.

The time measurement circuit 83 determines, based on the voltage detection signal VDET, whether or not the power supply voltage is supplied in the liquid ejecting apparatus 1. Then, in a case where the time measurement circuit 83 determines based on the voltage detection signal VDET that the power supply voltage is supplied in the liquid ejecting apparatus 1, the time measurement circuit 83 generates elapsed time information YMD and outputs the elapsed time information YMD to the liquid ejecting apparatus control circuit 81.

The liquid ejecting apparatus control circuit 81 generates various signals for controlling the operation of the liquid ejecting apparatus 1 and outputs the signals to the corresponding configurations included in the liquid ejecting apparatus 1.

Specifically, the liquid ejecting apparatus control circuit 81 generates a control signal CTRL1 for controlling the operation of the medium transport mechanism 5 and outputs the control signal CTRL1 to the medium transport mechanism 5. The medium transport mechanism 5 includes the first transport means **5*a* and the second transport means 5*b* described above. Further, the first transport means 5*a* and the second transport means 5*b* included in the medium transport mechanism 5 are controlled by the control signal CTRL1 output by the liquid ejecting apparatus control circuit 81. Specifically, the control signal CTRL1 is a signal for controlling the driving of the drive motor 53***a* included in the first transport means 5*a* and the drive motor 53*b* included in the second transport means 5*b*, and the transport of the medium P by the medium transport mechanism 5 is controlled thereby. In other words, the control signal CTRL1 is a signal for controlling the transport of the medium P by the medium transport mechanism 5. It should be noted that the medium transport mechanism 5 may include a driver circuit (not illustrated) for converting the input control signal CTRL1 into a signal for driving the drive motors 53*a* and 53*b*.

In addition, the medium transport mechanism 5 includes a medium transport error detection circuit 58 that detects a transport error of the medium P. The medium transport error detection circuit 58 detects whether or not a transport error has occurred in the medium P transported to the print head 3. Here, examples of the transport error detected by the medium transport error detection circuit 58 include a so-called jam in which the medium P transported in the liquid ejecting apparatus 1 is caught in the liquid ejecting apparatus 1 and cannot be normally supplied or discharged due to breakage, wrinkling, or the like of the transported medium P. In a case where a transport error such as the jam has occurred in the medium transport mechanism 5, the medium transport error detection circuit 58 generates a medium transport error signal ERR1 indicating that the transport error has occurred and outputs the medium transport error signal ERR1 to the liquid ejecting apparatus control circuit 81.

In addition, the liquid ejecting apparatus control circuit 81 generates a control signal CTRL2 for controlling the operation of the maintenance mechanism 6 and outputs the control signal CTRL2 to the maintenance mechanism 6. The maintenance mechanism 6 has a wiping mechanism 61, a flushing mechanism 62, and a capping mechanism 63.

The wiping mechanism 61 executes wiping processing of wiping the nozzle surface 652 in order to remove a paper piece or the like attached to the nozzle surface 652 of the print head 3. In addition, the flushing mechanism 62 executes flushing processing of forcibly ejecting the ink stored in the print head 3 from the nozzle 651 in order to maintain the viscosity of the ink stored in the print head 3 in an appropriate range or in order to recover an appropriate ink viscosity in a case where the viscosity of the ink stored in the print head 3 is abnormal. In addition, the capping mechanism 63 executes capping processing of attaching a cap to the nozzle 651 and the nozzle surface 652 where the nozzle 651 is formed in order to reduce a change in the characteristics of the ink stored in the print head 3 in a case where no ink is ejected from the print head 3 for a long time, examples of which include a case where the liquid ejecting apparatus 1 is not used for a long time.

It should be noted that the maintenance mechanism 6 may include a configuration in which various types of processing are executed so that the ejecting portion 600 of the print head 3 is kept in a normal state or the ejecting portion 600 is recovered to the normal state in addition to the wiping mechanism 61, the flushing mechanism 62, and the capping mechanism 63 described above.

In addition, the liquid ejecting apparatus control circuit 81 generates a control signal CTRL3 for controlling the operation of the information output mechanism 9 and outputs the control signal CTRL3 to the information output mechanism 9. The information output mechanism 9 has a display 91. The display 91 notifies a user of various types of information, such as information indicating the operation state of the liquid ejecting apparatus 1, information indicating the operation state of the maintenance mechanism 6, and information regarding the use history of the print head 3, in accordance with the control signal CTRL3. It should be noted that the information output mechanism 9 may be a configuration capable of notifying a user of various types of information and may be a configuration notifying a user of information by voice, light, or the like.

In addition, the liquid ejecting apparatus control circuit 81 generates an RGB signal IRGB based on an image data signal IMG input from the host computer or the like provided outside the liquid ejecting apparatus 1 and outputs the RGB signal IRGB to the signal conversion circuit 82. The RGB signal IRGB includes information on the red, green, and blue included in image data corresponding to the input image data signal IMG. The signal conversion circuit 82 converts the input RGB signal IRGB into an image signal ICMY corresponding to the ink color used in the liquid ejecting apparatus 1 and outputs the image signal ICMY to the print head drive circuit substrate 7.

It should be noted that the signal conversion circuit 82 may output a signal subjected to signal processing such as halftone processing as the image signal ICMY after converting the signal generated based on the RGB signal IRGB input from the liquid ejecting apparatus control circuit 81 into a signal corresponding to the ink color used in the liquid ejecting apparatus 1 and, further, may output a signal resulting from signal processing for converting a halftone-processed signal into a signal corresponding to the plurality of ejecting portions 600 of the print head 3 as the image signal ICMY.

In addition, the signal conversion circuit 82 may convert the image signal ICMY into a pair of differential signals or optical signals and then output the differential signals or optical signals to the print head drive circuit substrate 7. Here, the main circuit substrate 8 in a case where the signal conversion circuit 82 converts the image signal ICMY into the differential signal, the optical signal, and the like and outputs the signals to the print head drive circuit substrate 7 may have a conversion circuit for converting the signals and the print head drive circuit substrate 7 to be described later may have a restoration circuit restoring the input differential signal, optical signal, and the like.

In addition, the liquid ejecting apparatus control circuit 81 outputs various types of information indicating the operation state of the liquid ejecting apparatus 1, which include transport information on the medium P transported by the medium transport mechanism 5, transport error information based on the medium transport error signal ERR1 input from the medium transport mechanism 5, execution information on the maintenance executed by the maintenance mechanism 6, and operation time information based on the elapsed time information YMD indicating the operation time of the liquid ejecting apparatus 1, to the print head drive circuit substrate 7 as a liquid ejecting apparatus operation information signal IPD.

Further, a print head operation information signal IHD including the drive situation of the print head 3 is input to the liquid ejecting apparatus control circuit 81 from the print head drive circuit substrate 7. The liquid ejecting apparatus control circuit 81 generates the control signals CTRL1, CTRL2, and CTRL3 for respectively controlling the medium transport mechanism 5, the maintenance mechanism 6, and the information output mechanism 9 based on the input print head operation information signal IHD and outputs the control signals CTRL1, CTRL2, and CTRL3.

It should be noted that the main circuit substrate 8 is not limited to being constituted by one substrate and may be constituted by a plurality of substrates. In other words, some of the circuits of the main circuit substrate 8 including the liquid ejecting apparatus control circuit 81, the signal conversion circuit 82, the time measurement circuit 83, the power supply circuit 84, and the voltage detection circuit 85 of the main circuit substrate 8 may be mounted on a different substrate without being limited to a case where the circuits of the main circuit substrate 8 including the liquid ejecting apparatus control circuit 81, the signal conversion circuit 82, the time measurement circuit 83, the power supply circuit 84, and the voltage detection circuit 85 of the main circuit substrate 8 are provided on one substrate without exception.

1.3.2 Functional Configuration of Print Head Drive Circuit Substrate

Figure 8:
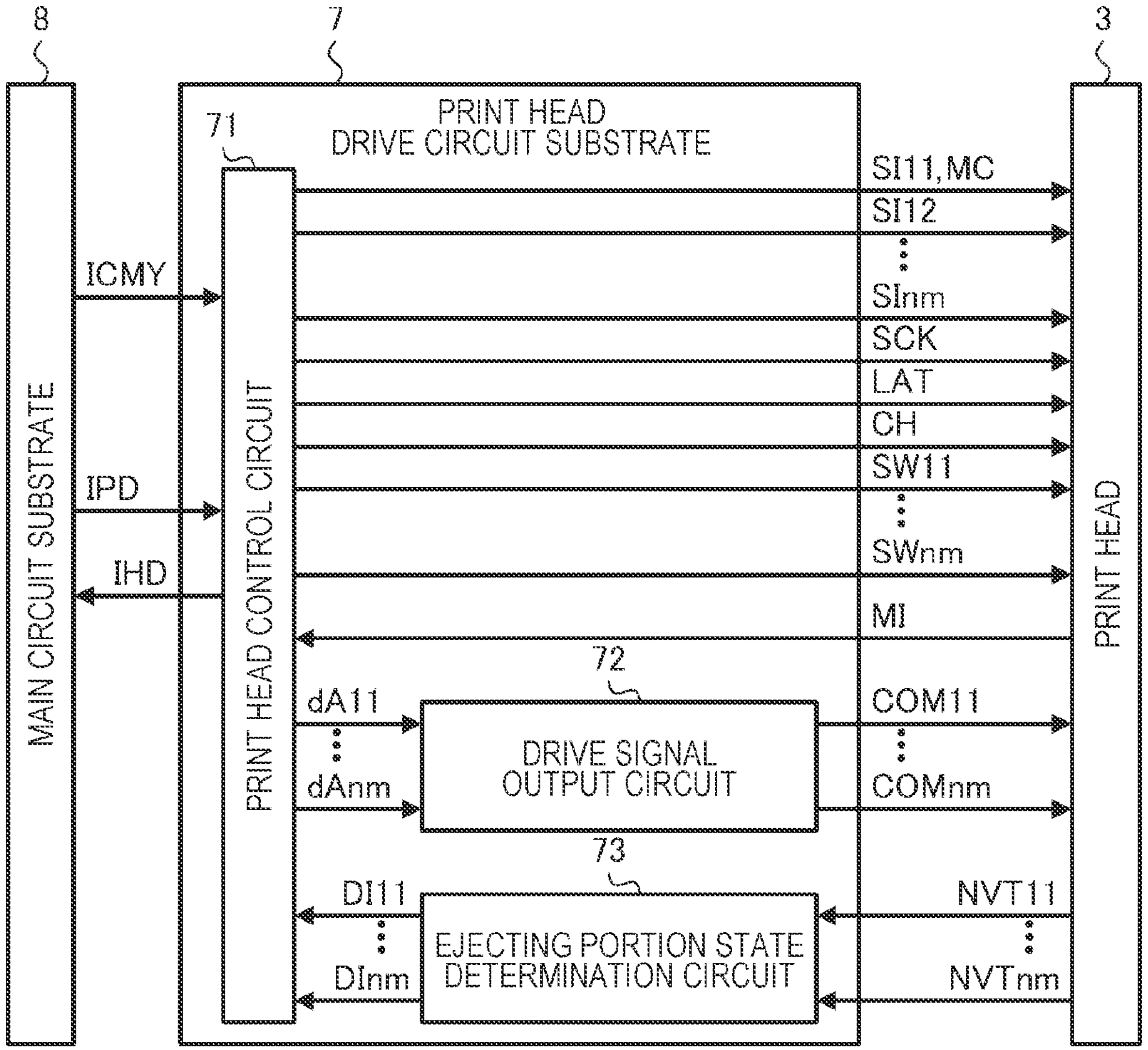
FIG. 8 is a diagram illustrating an example of the functional configuration of a print head drive circuit substrate.

FIG. 8 is a diagram illustrating an example of the functional configuration of the print head drive circuit substrate 7. As illustrated in FIG. 8, the print head drive circuit substrate 7 has a print head control circuit 71, the drive signal output circuit 72, and an ejecting portion state determination circuit 73. Further, the print head drive circuit substrate 7 generates, based on the image signal ICMY input from the main circuit substrate 8, drive signals COM11 to COMnm for driving the plurality of piezoelectric elements 60 of the print head 3 and a clock signal SCK, a latch signal LAT, a change signal CH, switching signals SW11 to SWnm, and printing data signals SI11 to SInm for controlling timings at which the drive signals COM11 to COMnm are supplied to the piezoelectric element 60 and outputs the generated signals to the print head 3.

Here, in the following description, the printing data signals SI11 to SInm may be simply referred to as a printing data signal SI in a case where it is not necessary to distinguish the printing data signals SI11 to SInm, the switching signals SW11 to SWnm may be simply referred to as a switching signal SW in a case where it is not necessary to distinguish the switching signals SW11 to SWnm, and the drive signals COM11 to COMnm may be simply referred to as a drive signal COM in a case where it is not necessary to distinguish the drive signals COM11 to COMnm. In addition, drive data signals dA11 to dAnm respectively corresponding to the drive signals COM11 to COMnm may be simply referred to as a drive data signal dA in a case where it is not necessary to distinguish the drive data signals dA11 to dAnm.

The image signal ICMY is input to the print head control circuit 71. The print head control circuit 71 generates, based on the input image signal ICMY, the clock signal SCK, the latch signal LAT, the change signal CH, the switching signals SW11 to SWnm, and the printing data signals SI11 to SInm corresponding to the ejecting portion 600 and the plurality of head chips 310 of the print head 3 and outputs the generated signals to the print head 3.

Here, in the following description, the printing data signal SI11 is the printing data signal SI input to the head chip 310-1 of the head main body 31-1 and the printing data signal SInm is the printing data signal SI input to the head chip 310-*m* of the head main body 31-*n*. Likewise, in the following description, the switching signal SW11 is the switching signal SW input to the head chip 310-1 of the head main body 31-1 and the switching signal SWnm is the switching signal SW input to the head chip 310-*m* of the head main body 31-*n*.

In other words, the print head control circuit 71 generates and outputs to the print head 3 the printing data signal SI and the switching signal SW corresponding to each of a total of n×m head chips 310 of the print head 3.

In addition, the print head control circuit 71 generates the drive data signals dA11 to dAnm that define the waveforms of the drive signals COM11 to COMnm for driving the piezoelectric element 60 and outputs the drive data signals dA11 to dAnm to the drive signal output circuit 72.

The drive signal output circuit 72 performs digital-analog signal conversion on each of the input drive data signals dA11 to dAnm and then generates the drive signals COM11 to COMnm by amplifying the converted analog signals. In other words, the drive data signals dA11 to dAnm are digital signals respectively defining the waveforms of the drive signals COM11 to COMnm and the drive signal output circuit 72 generates the drive signals COM11 to COMnm by amplifying the waveforms respectively defined by the drive data signals dA11 to dAnm. Then, the drive signal output circuit 72 outputs the generated drive signals COM11 to COMnm to the print head 3.

Therefore, the drive signal output circuit 72 includes a total of n×m amplifier circuits generating the drive signals COM11 to COMnm. The amplifier circuits included in the drive signal output circuit 72 may be capable of amplifying the waveforms respectively defined by the drive data signals dA11 to dAnm and may be configured to include, for example, class-A, class-B, class-AB, and class-D amplifier circuits. Here, the drive data signals dA11 to dAnm may be signals capable of respectively defining the waveforms of the drive signals COM11 to COMnm output by the drive signal output circuit 72 and may be analog signals.

Here, in the following description, the drive signal COM11 is the drive signal COM input to the head chip 310-1 of the head main body 31-1 and the drive signal COMnm is the drive signal COM input to the head chip 310-*m* of the head main body 31-*n*. In addition, in the following description, the drive data signal dA11 is a digital signal that defines the waveform of the drive signal COM11 and the drive data signal dAnm is a digital signal that defines the waveform of the drive signal COMnm.

In addition, ejecting portion state signals DI11 to DInm indicating the state of the ejecting portion 600 of the print head 3 are input from the ejecting portion state determination circuit 73 to the print head control circuit 71. In addition, residual vibration signals NVT11 to NVTnm corresponding to the residual vibration generated in the ejecting portion 600 of the print head 3 are input to the ejecting portion state determination circuit 73. The ejecting portion state determination circuit 73 determines the state of the corresponding ejecting portion 600 based on the input residual vibration signals NVT11 to NVTnm. Then, the ejecting portion state determination circuit 73 generates the ejecting portion state signals DI11 to DInm indicating the result of the determination and outputs the ejecting portion state signals DI11 to DInm to the print head control circuit 71.

The print head control circuit 71 determines, based on the input ejecting portion state signals DI11 to DInm, whether or not to cause the maintenance mechanism 6 to execute the wiping processing, the flushing processing, or the like. Then, the print head control circuit 71 generates the print head operation information signal IHD indicating the result of the determination and outputs the print head operation information signal IHD to the liquid ejecting apparatus control circuit 81. It should be noted that details of the residual vibration signals NVT11 to NVTnm corresponding to the residual vibration generated in the ejecting portion 600 of the print head 3 and the relationship between the residual vibration signals NVT11 to NVTnm and the state of the corresponding ejecting portion 600 will be described later.

Here, in the following description, the residual vibration signals NVT11 to NVTnm may be simply referred to as a residual vibration signal NVT in a case where it is not necessary to distinguish the residual vibration signals NVT11 to NVTnm and the ejecting portion state signals DI11 to DInm may be simply referred to as an ejecting portion state signal DI in a case where it is not necessary to distinguish the ejecting portion state signals DI11 to DInm. In addition, in the following description, the residual vibration signal NVT11 is the residual vibration signal NVT corresponding to the ejecting portion 600 included in the head chip 310-1 of the head main body 31-1 and the residual vibration signal NVTnm is the residual vibration signal NVT corresponding to the ejecting portion 600 included in the head chip 310-*m* of the head main body 31-*n*. Further, in the following description, the ejecting portion state signal DI11 is a signal indicating the state of the ejecting portion 600 corresponding to the residual vibration signal NVT11 and the ejecting portion state signal DInm is a signal indicating the state of the ejecting portion 600 corresponding to the residual vibration signal NVTnm.

In addition, the print head control circuit 71 outputs a memory control signal MC for controlling the storage circuit 200 provided on the wiring substrate 335, which will be described later. Here, examples of the control of the storage circuit 200 by the memory control signal MC include reading of information stored in the storage circuit 200 and information writing to the storage circuit 200. Further, in a case where the memory control signal MC for reading the information stored in the storage circuit 200 is output by the print head control circuit 71, a storage data signal MI corresponding to the information read from storage circuit 200 is input to the print head control circuit 71.

Here, the memory control signal MC output from the print head control circuit 71 propagates through wiring common with the printing data signal SI11 and is input to the print head 3. Specifically, the print head control circuit 71 outputs the memory control signal MC for reading the information stored in the storage circuit 200 in a period when the printing data signal SI11 is not output. As a result, it is not necessary to add wiring for controlling the storage circuit 200 and it is possible to reduce the number of wires of the cable 17 of the liquid ejecting apparatus 1.

It should be noted that the print head drive circuit substrate 7 is not limited to being constituted by one substrate and may be constituted by a plurality of substrates. In other words, some of the circuits of the print head drive circuit substrate 7 including the print head control circuit 71, the drive signal output circuit 72, and the ejecting portion state determination circuit 73 of the print head drive circuit substrate 7 may be mounted on a different substrate without being limited to a case where the circuits of the print head drive circuit substrate 7 including the print head control circuit 71, the drive signal output circuit 72, and the ejecting portion state determination circuit 73 of the print head drive circuit substrate 7 are provided on one substrate without exception.

1.3.3 Functional Configuration of Print Head

Next, the functional configuration of the print head 3 will be described. As illustrated in FIGS. 6A and 6B, the print head 3 has the wiring substrate 335, the n head main bodies 31, and the n cables 366. Further, each of the n head main bodies 31 and the wiring substrate 335 are electrically coupled via the cable 366.

Figure 9:
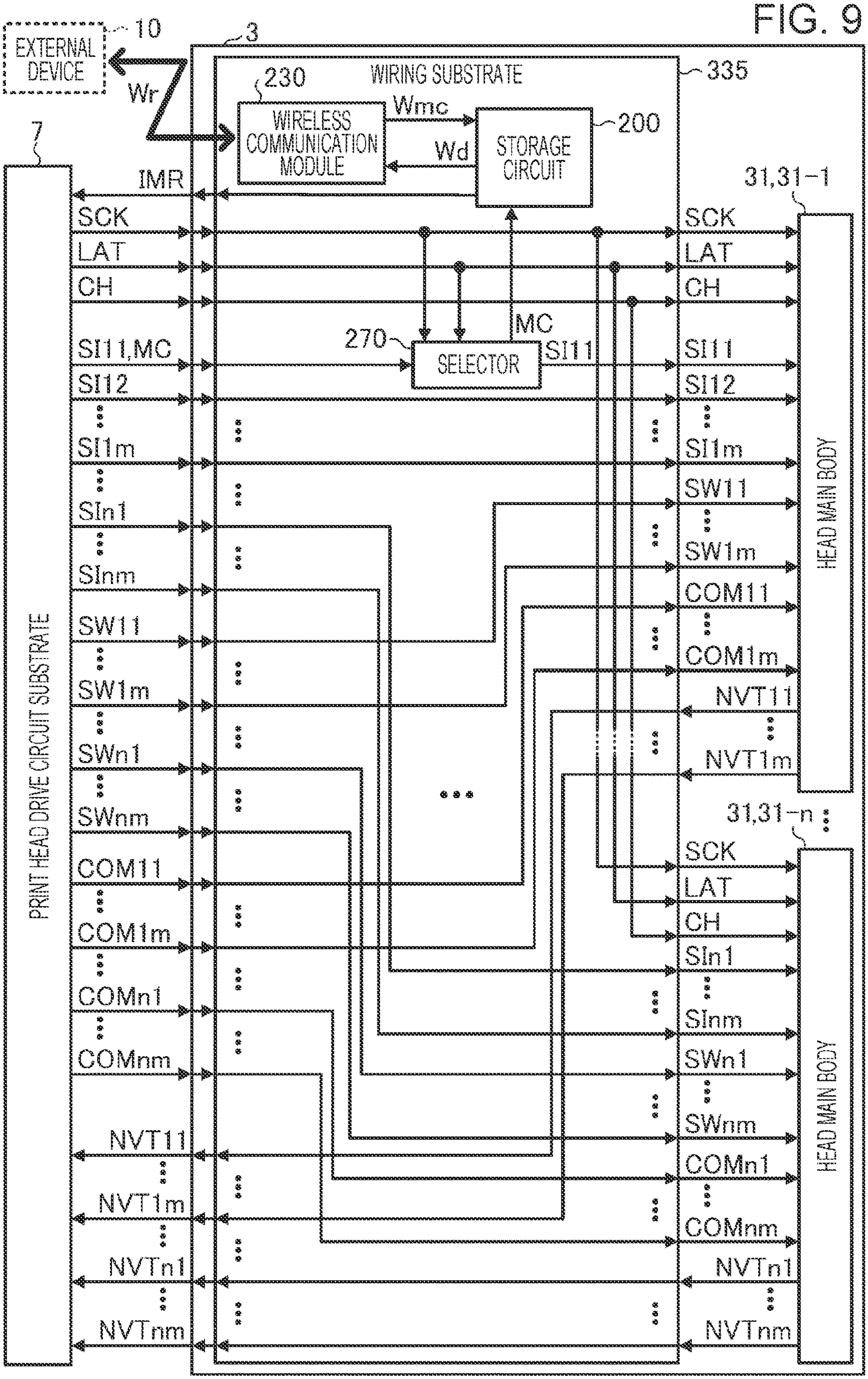
FIG. 9 is a diagram illustrating an example of the functional configuration of a wiring substrate.

First, the functional configuration of the wiring substrate 335 will be described with reference to FIG. 9. FIG. 9 is a diagram illustrating an example of the functional configuration of the wiring substrate 335. The drive signals COM11 to COMnm, the printing data signals SI11 to SInm, the clock signal SCK, the latch signal LAT, the change signal CH, and the switching signals SW11 to SWnm are input to the wiring substrate 335 from the print head drive circuit substrate 7. Each of the drive signals COM11 to COMnm, the printing data signals SI11 to SInm, the clock signal SCK, the latch signal LAT, the change signal CH, and the switching signals SW11 to SWnm input to the wiring substrate 335 propagates through the wiring substrate 335 and is output to the corresponding head main body 31.

Specifically, the drive signals COM11 to COM1*m*, the printing data signals SI11 to SI1*m*, the clock signal SCK, the latch signal LAT, the change signal CH, and the switching signals SW11 to SW1*m* corresponding to the head main body 31-1 propagate through the wiring substrate 335 and are output to the head main body 31-1, and the drive signals COMn1 to COMnm, the printing data signals SIn1 to SInm, the clock signal SCK, the latch signal LAT, the change signal CH, and the switching signals SWn1 to SWnm corresponding to the head main body 31-*n* propagate through the wiring substrate 335 and are output to the head main body 31-*n*. In other words, the wiring substrate 335 functions as a relay substrate that allows the drive signals COM11 to COMnm, the printing data signals SI11 to SInm, the clock signal SCK, the latch signal LAT, the change signal CH, and the switching signals SW11 to SWnm input from the print head drive circuit substrate 7 to branch so as to correspond to the n head main bodies 31 and performs output toward the corresponding head main body 31.

In addition, the wiring substrate 335 is provided with the storage circuit 200, the wireless communication module 230, and a selector 270. Here, at least part of the storage circuit 200 provided on the wiring substrate 335 is mounted on the integrated circuit 336 described above, at least part of the wireless communication module 230 provided on the wiring substrate 335 is mounted on the integrated circuit 337 described above, and at least part of the selector 270 provided on the wiring substrate 335 is mounted on the integrated circuit 338 described above. It should be noted that the storage circuit 200, the wireless communication module 230, and the selector 270 may be configured as a common integrated circuit in part.

The wireless communication module 230 receives a wireless communication signal Wr output by an external device 10 provided outside the liquid ejecting apparatus 1 and the print head 3. The wireless communication module 230 generates and outputs to the storage circuit 200 a memory control signal Wmc for controlling the storage circuit 200, which is a signal based on the received wireless communication signal Wr. Here, a portable terminal such as a smartphone terminal and a tablet terminal, a modem or a router for coupling to an Internet line, and so on can be used as the external device 10 outputting the wireless communication signal Wr to the wireless communication module 230.

The control of the storage circuit 200 based on the memory control signal Wmc includes reading of information stored in the storage circuit 200, information writing to the storage circuit 200, and so on. Further, when the wireless communication module 230 generates the memory control signal Wmc for reading information stored in the storage circuit 200 and outputs the memory control signal Wmc to the storage circuit 200, a storage data signal Wd corresponding to information read from the storage circuit 200 is input to the wireless communication module 230. Then, the wireless communication module 230 generates the wireless communication signal Wr including the input storage data signal Wd and outputs the wireless communication signal Wr to the external device 10. As a result, the external device 10 is capable of acquiring information stored in the storage circuit 200.

A Wi-Fi module capable of wireless communication conforming to Wi-Fi (registered trademark) conforming to the international standard of IEEE802.11 for short-range wireless communication using a radio signal in the frequency band of 2.4 GHz or 5 GHz and a Bluetooth module capable of wireless communication conforming to Bluetooth (registered trademark) conforming to the international standard of IEEE802.15.1 for short-range wireless communication using a radio signal in the frequency band of 2.4 GHz can be used as the wireless communication module 230.

In other words, the wireless communication module 230 may include a Wi-Fi module and wireless communication module 230 may include a Bluetooth module. It should be noted that the wireless communication module 230 is not limited to a Wi-Fi module or a Bluetooth module and the wireless communication module 230 may be, for example, a module capable of short-range wireless communication using a radio signal in the frequency band of 920 MHz or may be a module capable of short-range wireless communication using infrared rays.

History information indicating the operation state of the print head 3 is stored in the storage circuit 200. An electrically erasable non-volatile memory such as an EEPROM and a flash memory can be used as the storage circuit 200. Here, the electrically erasable non-volatile memory is not limited to an EEPROM and a flash memory and may be a non-volatile memory in which a transistor (not illustrated) is included, an electric charge stored in a gate of the transistor can be released by applying a predetermined voltage to the gate of the transistor, and stored information can be erased by releasing the electric charge stored in the gate of the transistor.

The storage circuit 200 is controlled based on the memory control signal MC input from the print head drive circuit substrate 7 and the memory control signal Wmc input from the wireless communication module 230.

Specifically, in a case where the memory control signal MC for reading information stored in a predetermined region of the storage circuit 200 is input to the storage circuit 200, the storage circuit 200 reads information corresponding to the input memory control signal MC and outputs the storage data signal MI including the read information to the print head control circuit 71. In addition, in a case where the memory control signal MC for storing new information in a predetermined region of the storage circuit 200 is input to the storage circuit 200, the storage circuit 200 stores information corresponding to the input memory control signal MC in a predetermined memory region.

Meanwhile, in a case where the memory control signal Wmc for reading information stored in a predetermined region of the storage circuit 200 is input to the storage circuit 200, the storage circuit 200 reads information corresponding to the input memory control signal Wmc and outputs the storage data signal Wd including the read information to the wireless communication module 230. In addition, in a case where the memory control signal Wmc for storing new information in a predetermined region of the storage circuit 200 is input to the storage circuit 200, the storage circuit 200 stores information corresponding to the input memory control signal Wmc in a predetermined memory region.

The storage circuit 200 configured as described above stores the history information indicating the operation state of the print head 3 based on the memory control signal MC input from the print head control circuit 71 and the memory control signal Wmc input from the wireless communication module 230, reads the history information stored based on the memory control signal MC and the memory control signal Wmc, and performs output to the print head control circuit 71 and wireless communication module 230. It should be noted that details of the history information indicating the operation state of the print head 3 stored in the storage circuit 200 will be described later.

The selector 270 switches between supplying the memory control signal MC and the printing data signal SI11 propagating through common wiring to the storage circuit 200 or to the head main body 31-1.

Input to the selector 270 are the memory control signal MC and the printing data signal SI11 propagating through the common wiring, the change signal CH, and the latch signal LAT. Then, in accordance with the logic levels of the input change signal CH and latch signal LAT, the selector 270 switches between outputting the memory control signal MC and the printing data signal SI11 propagating through the common wiring to the storage circuit 200 or to the head main body 31-1.

Specifically, the print head control circuit 71 sets the logic levels of both the change signal CH and the latch signal LAT to the H level in a period when the memory control signal MC is output and sets the logic level of at least one of the change signal CH and the latch signal LAT to the L level in a period when the printing data signal SI11 is output. Then, the selector 270 outputs the memory control signal MC and the printing data signal SI11 propagating through the common wiring to the storage circuit 200 in a case where the logic levels of both the input change signal CH and the input latch signal LAT are at the H level and outputs the memory control signal MC and the printing data signal SI11 propagating through the common wiring to the head main body 31-1 in a case where the logic level of at least one of the input change signal CH and latch signal LAT is the L level.

As a result, the memory control signal MC of the memory control signal MC and the printing data signal SI11 propagating through the common wiring is input to the storage circuit 200, and the printing data signal SI of the memory control signal MC and the printing data signal SI11 propagating through the common wiring is input to the head main body 31-1. As a result, even in a case where the memory control signal MC and the printing data signal SI11 propagate through common wiring, it is possible to achieve both the control of the storage circuit 200 based on the memory control signal MC and the control of the head main body 31-1 based on the printing data signal SI11.

Figure 10:
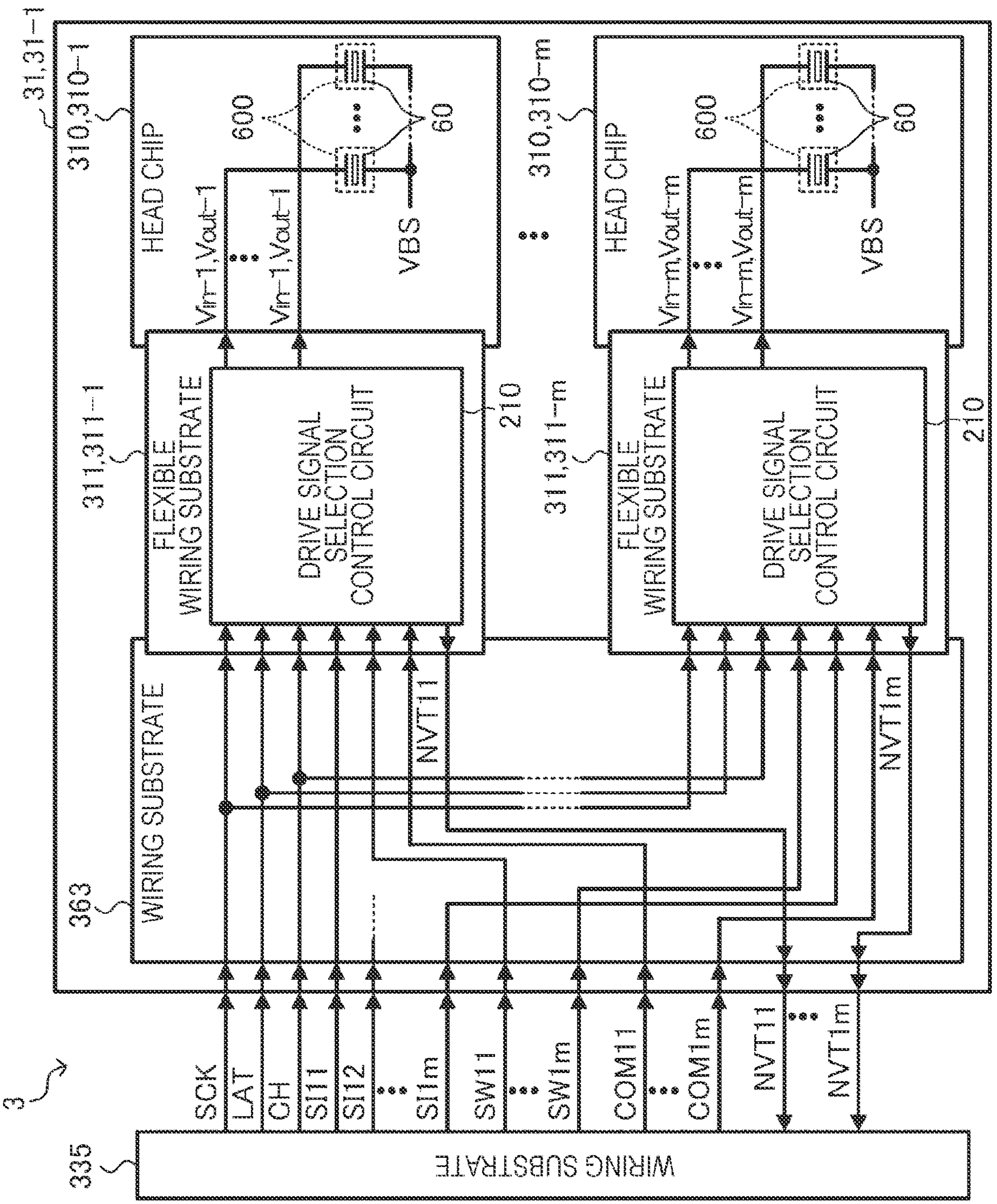
FIG. 10 is a diagram illustrating an example of the functional configuration of the head main body.

Next, the functional configuration of the head main body 31 electrically coupled to the wiring substrate 335 via the cable 366 will be described. FIG. 10 is a diagram illustrating an example of the functional configuration of the head main body 31-1. Here, the head main bodies 31-1 to **31-*n* of the print head 3 have the same configuration. Therefore, in FIG. 10, the functional configuration will be described using the head main body 31-1 and the functional configurations of the head main bodies 31-2 to 31-*n*** will not be described.

As illustrated in FIG. 10, the head main body 31-1 has the wiring substrate 363, the head chips 310-1 to **310-*m*, and the flexible wiring substrates 311-1 to 311-*m*. One ends of the flexible wiring substrates 311-1 to 311**-*m* are coupled in common to the wiring substrate 363. In addition, the other ends of the flexible wiring substrates 311-1 to 311-*m* are electrically and respectively coupled to the corresponding head chips 310-1 to 310-*m*. Specifically, the flexible wiring substrate 311-1 electrically couples the wiring substrate 363 and the head chip 310-1, and the flexible wiring substrate 311-*m* electrically couples the wiring substrate 363 and the head chip 310-*m*.

The drive signals COM11 to COM1*m*, the printing data signals SI11 to SI1*m*, the clock signal SCK, the latch signal LAT, the change signal CH, and the switching signals SW11 to SW1*m* output from the wiring substrate 335 are input to the wiring substrate 363. The drive signals COM11 to COM1*m*, the printing data signals SI11 to SI1*m*, the clock signal SCK, the latch signal LAT, the change signal CH, and the switching signals SW11 to SW1*m* propagate through the wiring substrate 363 and then are input to the corresponding flexible wiring substrate 311.

Specifically, the wiring substrate 363 outputs the drive signal COM11, the printing data signal SI11, the clock signal SCK, the latch signal LAT, the change signal CH, and the switching signal SW11 corresponding to the head chip 310-1 to the flexible wiring substrate 311-1 and outputs the drive signal COM1*m*, the printing data signal SI1*m*, the clock signal SCK, the latch signal LAT, the change signal CH, and the switching signal SW1*m* corresponding to the head chip 310-*m* to the flexible wiring substrate 311-*m*.

In other words, the wiring substrate 363 functions as a relay substrate that allows the drive signals COM11 to COM1*m*, the printing data signals SI11 to SI1*m*, the clock signal SCK, the latch signal LAT, the change signal CH, and the switching signals SW11 to SW1*m* input from the wiring substrate 335 to branch so as to correspond to the m flexible wiring substrates 311 and the m head chips 310 and performs output to the corresponding flexible wiring substrate 311 and head chip 310.

Each of the flexible wiring substrates 311-1 to 311-*m* is provided with a drive signal selection control circuit 210. Here, the drive signal selection control circuits 210 respectively provided in the flexible wiring substrates 311-1 to 311-*m* are mounted on the integrated circuit 312 described above at least in part.

The drive signal COM11, the printing data signal SI11, the clock signal SCK, the latch signal LAT, the change signal CH, and the switching signal SW11 input to the flexible wiring substrate 311-1 are input to the drive signal selection control circuit 210 of the flexible wiring substrate 311-1. The drive signal selection control circuit 210 of the flexible wiring substrate 311-1 generates a drive signal Vin-1 by selecting or non-selecting a signal waveform included in the drive signal COM11 at the timing defined by the input printing data signal SI11, clock signal SCK, latch signal LAT, and change signal CH. Then, the drive signal selection control circuit 210 of the flexible wiring substrate 311-1 supplies the generated drive signal Vin-1 to the electrode 602 of the piezoelectric element 60 included in the plurality of ejecting portions 600 of the head chip 310-1. At this time, a reference voltage signal VBS is supplied to the electrode 603 of the piezoelectric element 60. Accordingly, the piezoelectric element 60 included in the ejecting portion 600 of the head chip 310-1 is driven in accordance with the potential difference between the drive signal Vin-1 supplied to the electrode 602 and the reference voltage signal VBS supplied to the electrode 603.

Here, the reference voltage signal VBS supplied to the electrode 603 of the piezoelectric element 60 is a reference potential for driving the piezoelectric element 60 and is, for example, a constant potential signal such as ground potential, DC 5.5 V, and DC 6 V. This reference voltage signal VBS may be output from, for example, the drive signal output circuit 72 or may be output from a voltage generation circuit (not illustrated).

In addition, a residual vibration Vout-1 generated in the ejecting portion 600 including the piezoelectric element 60 driven based on the drive signal Vin-1 is input to the drive signal selection control circuit 210 of the flexible wiring substrate 311-1. The drive signal selection control circuit 210 of the flexible wiring substrate 311-1 generates the residual vibration signal NVT11 based on the input residual vibration Vout-1. Then, the drive signal selection control circuit 210 of the flexible wiring substrate 311-1 outputs the generated residual vibration signal NVT11 to the ejecting portion state determination circuit 73 of the print head drive circuit substrate 7 via the wiring substrates 363 and 335.

The switching signal SW11 input to the flexible wiring substrate 311-1 switches between whether the drive signal selection control circuit 210 of the flexible wiring substrate 311-1 outputs the drive signal Vin-1 to the piezoelectric element 60 or the residual vibration Vout-1 generated in the corresponding ejecting portion 600 is input to the drive signal selection control circuit 210.

Likewise, the drive signal COM1*m*, the printing data signal SI1*m*, the clock signal SCK, the latch signal LAT, the change signal CH, and the switching signal SW1*m* input to the flexible wiring substrate 311-*m* are input to the drive signal selection control circuit 210 of the flexible wiring substrate 311-*m*. The drive signal selection control circuit 210 of the flexible wiring substrate 311-*m* generates a drive signal Vin-m by selecting or non-selecting a signal waveform included in the drive signal COM1*m* at the timing defined by the input printing data signal SI1*m*, clock signal SCK, latch signal LAT, and change signal CH. Then, the drive signal selection control circuit 210 of the flexible wiring substrate 311-*m* supplies the generated drive signal Vin-m to the electrode 602 of the piezoelectric element 60 included in the plurality of ejecting portions 600 of the head chip 310-*m*. At this time, the reference voltage signal VBS as the reference potential for driving the piezoelectric element 60 is supplied to the electrode 603 of the piezoelectric element 60. Accordingly, the piezoelectric element 60 included in the ejecting portion 600 of the head chip 310-*m* is driven in accordance with the potential difference between the drive signal Vin-m supplied to the electrode 602 and the reference voltage signal VBS supplied to the electrode 603.

In addition, a residual vibration Vout-m generated in the ejecting portion 600 including the piezoelectric element 60 driven based on the drive signal Vin-m is input to the drive signal selection control circuit 210 of the flexible wiring substrate 311-*m*. The drive signal selection control circuit 210 of the flexible wiring substrate 311-*m* generates the residual vibration signal NVT1*m* based on the input residual vibration Vout-m. Then, the drive signal selection control circuit 210 of the flexible wiring substrate 311-*m* outputs the generated residual vibration signal NVT1*m* to the ejecting portion state determination circuit 73 of the print head drive circuit substrate 7 via the wiring substrates 363 and 335.

The switching signal SW1*m* input to the flexible wiring substrate 311-*m* switches between whether the drive signal selection control circuit 210 of the flexible wiring substrate 311-1 outputs the drive signal Vin-m to the piezoelectric element 60 or the residual vibration Vout-m generated in the corresponding ejecting portion 600 is input to the drive signal selection control circuit 210.

Here, in the following description, the drive signals Vin-1 to Vin-m may be simply referred to as a drive signal Vin in a case where it is not necessary to distinguish the drive signals Vin-1 to Vin-m and the residual vibrations Vout-1 to Vout-m may be simply referred to as a residual vibration Vout in a case where it is not necessary to distinguish the residual vibrations Vout-1 to Vout-m.

Here, the residual vibration Vout generated in the ejecting portion 600 and determination of the state of the ejecting portion 600 by the ejecting portion state determination circuit 73 will be described. When ink is ejected from the ejecting portion 600 by supplying the drive signal Vin to the piezoelectric element 60, the internal pressure of the pressure generation chamber 631 changes. When the supply of the drive signal Vin to the electrode 602 is subsequently stopped, damped vibration occurs in the diaphragm 621 in accordance with the change in the internal pressure of the pressure generation chamber 631. The piezoelectric element 60 provided on the diaphragm 621 is displaced as a result of the damped vibration of the diaphragm 621. The drive signal selection control circuit 210 detects a signal corresponding to the displacement of the piezoelectric element 60 as the residual vibration Vout. In other words, the residual vibration Vout corresponds to a signal based on damped vibration attributable to a change in the internal pressure of the pressure generation chamber 631 resulting from ink ejection.

The cycle or the vibration frequency of the residual vibration Vout varies with the state of the ejecting portion 600, examples of which include a case where the ejecting portion 600 is normal, a case where the viscosity of the ink ejected from the ejecting portion 600 is abnormal, a case where air bubbles are mixed in the pressure generation chamber 631 of the ejecting portion 600, and a case where paper dust or the like adheres to the vicinity of the nozzle 651 of the ejecting portion 600. The drive signal selection control circuit 210 generates the residual vibration signal NVT indicating the cycle and the vibration frequency of the residual vibration Vout from the input residual vibration Vout and outputs the residual vibration signal NVT to the ejecting portion state determination circuit 73 of the print head drive circuit substrate 7. Then, the ejecting portion state determination circuit 73 measures the cycle and the vibration frequency of the residual vibration Vout from the input residual vibration signal NVT and determines the state of the corresponding ejecting portion 600 from the measured cycle and frequency. Then, the result of the determination is output as an ejecting portion state signal DI.

1.3.4 Functional Configuration of Drive Signal Selection Control Circuit

Next, the functional configuration of the drive signal selection control circuit 210 of the head main body 31 will be described. It should be noted that each drive signal selection control circuit 210 of the print head 3 has the same configuration. Therefore, the drive signal selection control circuit 210 of the flexible wiring substrate 311-1 of the head main body 31-1 will be described as an example in the following description, and the rest of the drive signal selection control circuits 210 will not be described.

Figure 11:
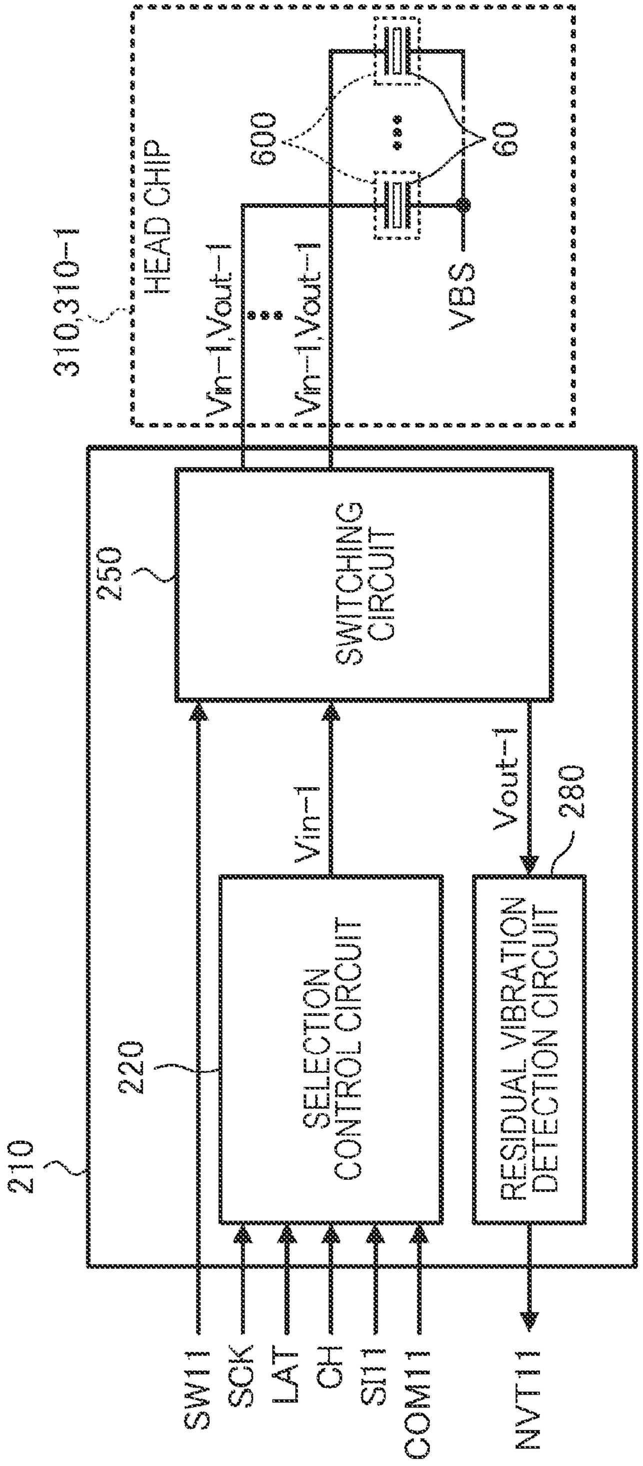
FIG. 11 is a diagram illustrating an example of the functional configuration of a drive signal selection control circuit.

FIG. 11 is a diagram illustrating an example of the functional configuration of the drive signal selection control circuit 210. As illustrated in FIG. 11, the drive signal selection control circuit 210 includes a selection control circuit 220, a switching circuit 250, and a residual vibration detection circuit 280.

The clock signal SCK, the latch signal LAT, the change signal CH, the printing data signal SI11, and the drive signal COM11 are input to the selection control circuit 220. Then, the selection control circuit 220 generates and outputs to the switching circuit 250 the drive signal Vin-1 by selecting or non-selecting a signal waveform included in the drive signal COM11 based on the clock signal SCK, the latch signal LAT, the change signal CH, and the printing data signal SI11.

The drive signal Vin-1, the switching signal SW1, and the drive signal Vin-1 corresponding to the drive signal Vin-1 are input to the switching circuit 250. The switching circuit 250 switches, based on the input switching signal SW11, between whether to supply the drive signal Vin-1 to the head chip 310 or to supply the residual vibration Vout-1 generated after the drive signal Vin-1 is supplied to the head chip 310 to the residual vibration detection circuit 280.

The residual vibration detection circuit 280 detects the input residual vibration Vout-1, generates the residual vibration signal NVT11 based on the detected residual vibration Vout-1, and outputs the residual vibration signal NVT11 to the ejecting portion state determination circuit 73.

Figure 12:
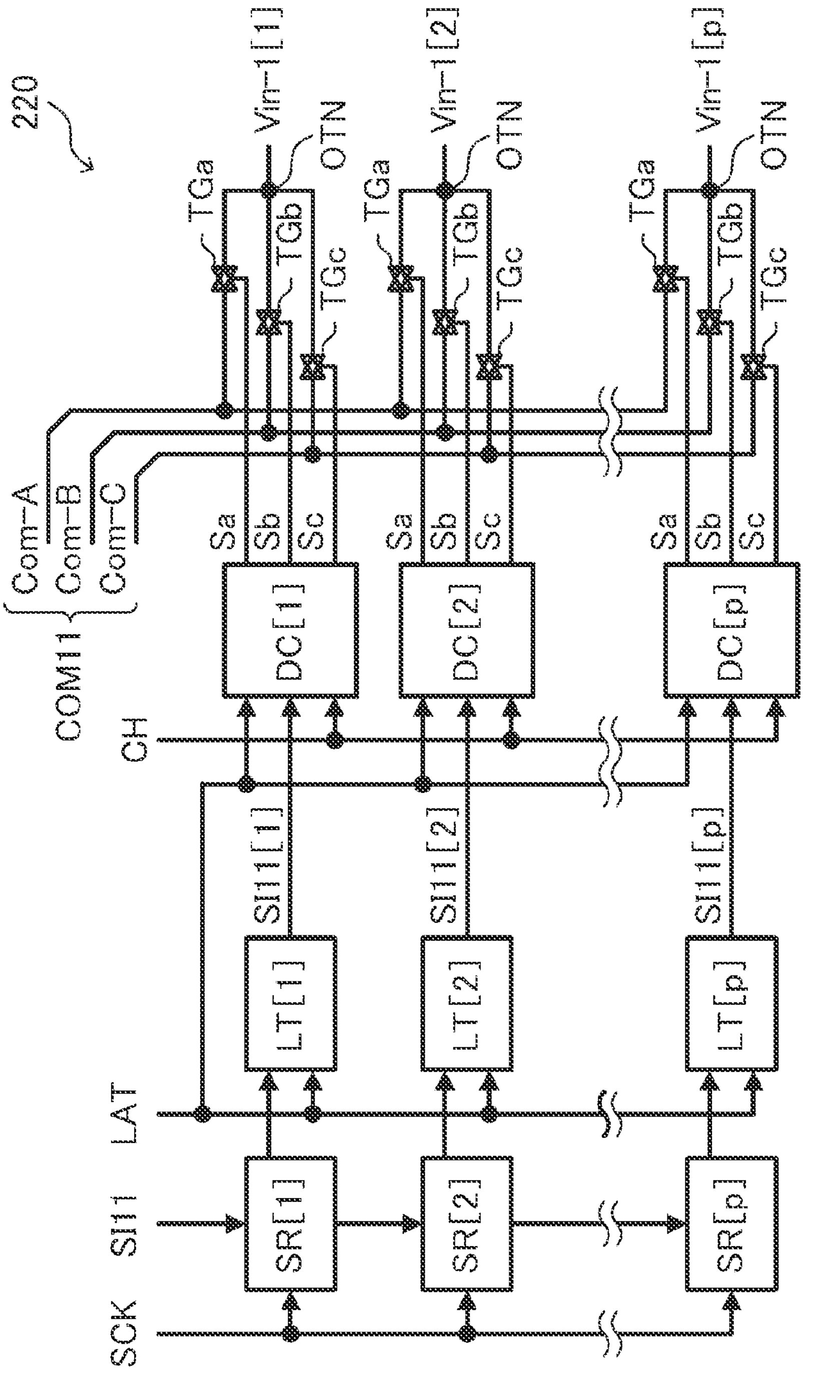
FIG. 12 is a block diagram illustrating the configuration of a selection control circuit.

In the drive signal selection control circuit 210 configured as described above, the configuration and operation of the selection control circuit 220 will be described first. FIG. 12 is a block diagram illustrating the configuration of the selection control circuit 220. As illustrated in FIG. 12, the selection control circuit 220 has the same number of shift registers SR, latch circuits LT, decoders DC, and transmission gates TGa, TGb, and TGc as the ejecting portions 600 of the head chip 310-1. In other words, the selection control circuit 220 includes the same number of sets of the shift register SR, the latch circuit LT, the decoder DC, and the transmission gates TGa, TGb, and TGc as the ejecting portion 600 of the head chip 310-1. Here, the head chip 310-1 is assumed to have p ejecting portions 600 in the following description. In other words, in the following description, the selection control circuit 220 has p sets of the shift register SR, the latch circuit LT, the decoder DC, and the transmission gates TGa, TGb, and TGc.

Here, in the following description, the respective elements of the shift register SR, the latch circuit LT, the decoder DC, and the transmission gates TGa, TGb, and TGc of the selection control circuit 220 are referred to as a first stage, a second stage, . . . , a p stage in order from the upper side in FIG. 12 so as to respectively correspond to the p ejecting portions 600. Further, in FIG. 12, the shift registers SR respectively corresponding to the first stage, the second stage, . . . , the p stage are illustrated as SR[1], SR[2], . . . , SR[p], the latch circuits LT respectively corresponding to the first stage, the second stage, . . . , the p stage are illustrated as LT[1], LT[2], . . . , LT[p], the decoders DC respectively corresponding to the first stage, the second stage, . . . , the p stage are illustrated as DC[1], DC[2], . . . , DC[p], and the drive signals Vin-1 respectively corresponding to the first stage, the second stage, . . . , the p stage are illustrated as Vin-1[1], Vin-1[2], . . . , Vin-1[*p*].

The clock signal SCK, the printing data signal SI11, the latch signal LAT, the change signal CH, and the drive signal COM11 are input to the selection control circuit 220. In addition, as illustrated in FIG. 12, the drive signal COM11 includes three drive signals Com-A, Com-B, and Com-C.

The printing data signal SI11 is a digital signal defining the amount of ink ejected from the nozzle 651 of the corresponding ejecting portion 600 in a case where one dot is formed on the medium P. Specifically, the printing data signal SI11 includes three-bit printing data [b1, b2, b3] corresponding to each of the p ejecting portions 600. In other words, the printing data signal SI11 includes a total of 3p bits of data. The amount of ink ejected from the ejecting portion 600 is defined by the printing data [b1, b2, b3].

The printing data signal SI11 is input to the selection control circuit 220 in synchronization with the clock signal SCK. The selection control circuit 220 outputs the drive signal Vin-1 corresponding to the amount of ink ejected from the ejecting portion 600 based on the input printing data signal SI11. The drive signal Vin-1 is supplied to the piezoelectric element 60 included in the corresponding ejecting portion 600. Then, the four gradations of non-recording, small-dot, medium-dot, and large-dot are expressed on the medium P by the drive signal Vin-1 being supplied to the corresponding piezoelectric element 60. In addition, the selection control circuit 220 also generates the drive signal Vin-1 for inspection for inspecting the state of the ejecting portion 600 based on the input printing data signal SI11.

Each of the shift registers SR holds the three-bit printing data [b1, b2, b3] included in the printing data signal SI11 and sequentially transfers the three-bit printing data [b1, b2, b3] to the subsequent shift register SR in accordance with the clock signal SCK. Specifically, the p shift registers SR respectively corresponding to the p ejecting portions 600 are coupled in cascade. Further, the serially supplied printing data signal SI11 is sequentially transferred to the subsequent shift register SR in accordance with the clock signal SCK. Subsequently, the supply of the clock signal SCK is stopped at the point in time when the printing data signal SI11 is transferred to all of the p shift registers SR. As a result, each of the p shift registers SR holds the three-bit printing data [b1, b2, b3] corresponding to each of the p ejecting portions 600.

At the subsequent rise of the latch signal LAT, each of the p latch circuits LT simultaneously latches the three-bit printing data [b1, b2, b3] held by each of the p shift registers SR. Here, the SI11[1] to SI11[*p*] that are illustrated in FIG. 12 correspond to p pieces of printing data [b1, b2, b3] respectively held by the p shift registers SR[1] to SR[p] and latched by the corresponding latch circuits LT[1] to LT[p].

By the way, the operation period in which the liquid ejecting apparatus 1 executes printing includes a plurality of unit operation periods Tu. The plurality of unit operation periods Tu include, for example, the unit operation period Tu in which printing processing is executed, the unit operation period Tu in which ejection abnormality detection processing is executed, and the unit operation period Tu in which both the printing processing and the ejection abnormality detection processing are executed. In addition, each unit operation period Tu includes a control period Ts1 and a control period Ts2 subsequent to the control period Ts1.

The printing data signal SI11 is supplied to the selection control circuit 220 for each unit operation period Tu, and the latch circuit LT latches the printing data [b1, b2, b3] for each unit operation period Tu. In other words, the selection control circuit 220 outputs the drive signal Vin-1 corresponding to the piezoelectric elements 60 included in the p ejecting portions 600 for each unit operation period Tu.

Specifically, in a case where the print head 3 executes only the printing processing in the unit operation period Tu, the selection control circuit 220 supplies the drive signal Vin-1 for printing with respect to the piezoelectric elements 60 of the p ejecting portions 600. In this case, ink is ejected to the medium P by an amount corresponding to the image that is formed from each nozzle 651. In addition, in a case where the print head 3 executes only the ejection abnormality detection processing in the unit operation period Tu, the selection control circuit 220 supplies the drive signal Vin-1 for inspection with respect to the piezoelectric elements 60 of the p ejecting portions 600. In this case, detection processing is executed as to whether or not an abnormality has occurred in the corresponding ejecting portion 600. In addition, in a case where the print head 3 executes both the printing processing and the ejection abnormality detection processing in the unit operation period Tu, the selection control circuit 220 supplies the drive signal Vin-1 for printing with respect to some of the piezoelectric elements 60 of the p ejecting portions 600 and supplies the drive signal Vin-1 for inspection with respect to the piezoelectric elements 60 of the rest of the ejecting portions 600.

By decoding the three-bit printing data [b1, b2, b3] latched by the latch circuit LT, the decoder DC outputs H-level or L-level selection signals Sa, Sb, and Sc in each of the control periods Ts1 and Ts2.

FIG. 13 is a diagram illustrating an example of the content of the decoding performed by the decoder DC. The example illustrated in FIG. 13 means that in a case where, for example, printing data [b1, b2, b3]=[1, 0, 0] is input to the decoder DC, the decoder DC sets the logic levels of the selection signals Sa, Sb, and Sc respectively to the H, L, and L levels in the control period Ts1 and sets the logic levels of the selection signals Sa, Sb, and Sc respectively to the L, H, and L levels in the control period Ts2.

Returning to FIG. 12, the selection signal Sa is input to the control terminal of the transmission gate TGa. The input and output ends of the transmission gate TGa become conductive in a case where the selection signal Sa input to the control terminal is at the H level and become non-conductive in a case where the selection signal Sa input to the control terminal is at the L level. Likewise, the selection signal Sb is input to the control terminal of the transmission gate TGb. The input and output ends of the transmission gate TGb become conductive in a case where the selection signal Sb input to the control terminal is at the H level and become non-conductive in a case where the selection signal Sb input to the control terminal is at the L level. Likewise, the selection signal Sc is input to the control terminal of the transmission gate TGc. The input and output ends of the transmission gate TGc become conductive in a case where the selection signal Sc input to the control terminal is at the H level and become non-conductive in a case where the selection signal Sc input to the control terminal is at the L level.

In other words, in a case where printing data [b1, b2, b3]=[1, 0, 0] is input to the decoder DC, the input end and the output end of the transmission gate TGa become conductive, the input end and the output end of the transmission gate TGb become non-conductive, and the input end and the output end of the transmission gate TGc become non-conductive in the control period Ts1 and the input end and the output end of the transmission gate TGa become non-conductive, the input end and the output end of the transmission gate TGb become conductive, and the input end and the output end of the transmission gate TGc become non-conductive in the control period Ts2.

Here, as illustrated in FIG. 12, the drive signal Com-A in the drive signal COM11 is supplied to the input end of the transmission gate TGa, the drive signal Com-B in the drive signal COM11 is supplied to the input end of the transmission gate TGb, and the drive signal Com-C in the drive signal COM11 is supplied to the input end of the transmission gate TGc. In addition, the respective output ends of the transmission gates TGa, TGb, and TGc are coupled in common at a terminal OTN. Accordingly, the drive signals Com-A, Com-B, and Com-C included in the drive signal COM11 are selectively output to the terminal OTN by the transmission gates TGa, TGb, and TGc becoming conductive or non-conductive in each of the control periods Ts1 and Ts2. The signal output to the terminal OTN is supplied to the switching circuit 250 as the drive signal Vin-1.

Figure 14:
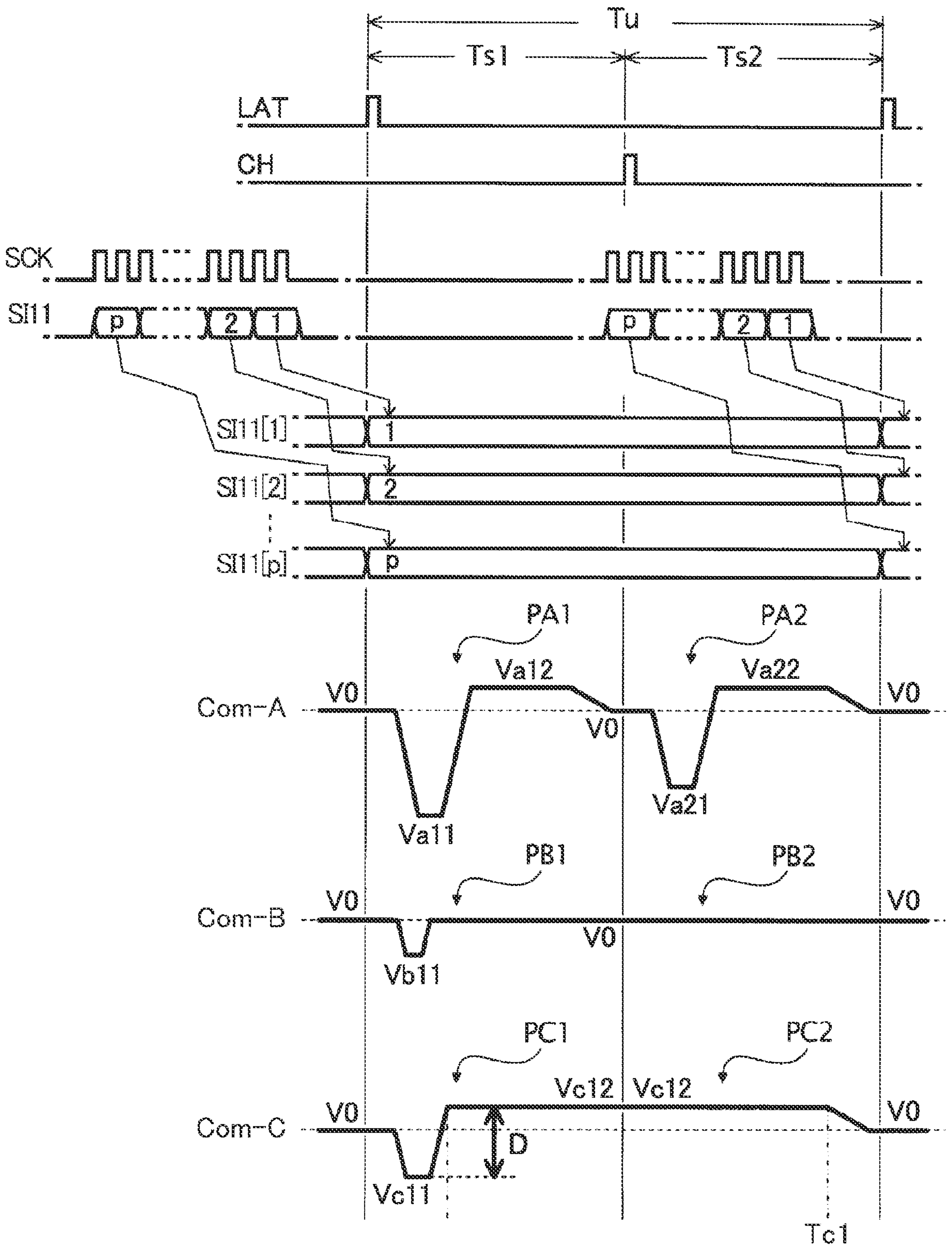
FIG. 14 is a diagram for describing the operation of the selection control circuit in a unit operation period.

A specific example of the operation of the selection control circuit 220 will be described. FIG. 14 is a diagram for describing the operation of the selection control circuit 220 in the unit operation period Tu. In describing the operation of the selection control circuit 220, first, an example of the waveform of the drive signal COM11 input to the selection control circuit 220 will be described with reference to FIG. 14.

As illustrated in FIG. 14, the unit operation period Tu is defined by the latch signal LAT. In addition, the control periods Ts1 and Ts2 included in the unit operation period Tu are defined by the latch signal LAT and the change signal CH. Further, of the drive signals COM11 input to the selection control circuit 220, the drive signal Com-A is a signal for generating the drive signal Vin-1 for printing in the unit operation period Tu and includes a waveform in which a unit waveform PA1 disposed in the control period Ts1 and a unit waveform PA2 disposed in the control period Ts2 are continuous. As for the unit waveform PA1 and the unit waveform PA2, each of the potentials at the start and end timings is a reference potential V0. In addition, the potential difference between a potential Va11 and a potential Va12 of the unit waveform PA1 included in the drive signal Com-A is larger than the potential difference between a potential Va21 and a potential Va22 of the unit waveform PA2. Accordingly, the amount of ink ejected from the corresponding nozzle 651 in a case where the unit waveform PA1 is supplied to the piezoelectric element 60 is larger than the amount of ink ejected from the corresponding nozzle 651 in a case where the unit waveform PA2 is supplied to the piezoelectric element 60. Here, in the following description, the amount of ink ejected from the nozzle 651 based on the unit waveform PA1 is referred to as a medium amount and the amount of ink ejected from the nozzle 651 based on the unit waveform PA2 is referred to as a small amount.

Of the drive signals COM11 input to the selection control circuit 220, the drive signal Com-B is a signal for generating the drive signal Vin-1 for printing in the unit operation period Tu and includes a waveform in which a unit waveform PB1 disposed in the control period Ts1 and a unit waveform PB2 disposed in the control period Ts2 are continuous. The potential of the unit waveform PB1 is the reference potential V0 at both the start and end timings, and the potential of the unit waveform PB2 is the reference potential V0 over the control period Ts2. In addition, the potential difference between a potential Vb11 of the unit waveform PB1 included in the drive signal Com-B and the reference potential V0 is smaller than the potential difference between the potential Va21 of the unit waveform PA2 and the reference potential V0 and the potential difference between the potential Va22 and the reference potential V0. In a case where the unit waveform PB1 is supplied to the piezoelectric element 60, the piezoelectric element 60 is driven to the extent that no ink is ejected from the corresponding nozzle 651. In addition, in a case where the unit waveform PB2 is supplied to the piezoelectric element 60, the piezoelectric element 60 is not displaced. Accordingly, no ink is ejected from the nozzle 651.

Of the drive signals COM11 input to the selection control circuit 220, the drive signal Com-C is a signal for generating the drive signal Vin-1 for inspection in the unit operation period Tu and includes a waveform in which a unit waveform PC1 disposed in the control period Ts1 and a unit waveform PC2 disposed in the control period Ts2 are continuous. Both the potential at the start timing of the unit waveform PC1 and the potential at the end timing of the unit waveform PC2 are the reference potential V0. In addition, the potential of the unit waveform PC1 transitions from the reference potential V0 to a potential Vc11 and then from the potential Vc11 to a potential Vc12. Then, after maintaining the potential Vc12 until a control time Tc1, the unit waveform PC2 transitions from the potential Vc12 to the reference potential V0 before the control period Ts2 ends.

The operation of the selection control circuit 220 to which the drive signal COM11 including the drive signals Com-A, Com-B, and Com-C is input will be described. The printing data signals SI11[1] to SI11[*p*] input to the selection control circuit 220 are sequentially propagated to the subsequent shift register SR by the clock signal SCK. Then, by stopping the clock signal SCK, the printing data signals SI11[1] to SI11[*p*] corresponding to the p ejecting portions 600 are held by the shift registers SR[1] to SR[p]. Then, at the rise timing of the latch signal LAT, the p latch circuits LT simultaneously latch the printing data signals SI11[1] to SI11[*p*] respectively held by the shift registers SR[1] to SR[p]. The printing data signals SI11[1] to SI11[*p*] latched by the p latch circuits LT are input to the p decoders DC. In each of the control periods Ts1 and Ts2, each of the p decoders DC outputs the selection signals Sa, Sb, and Sc of the logic levels corresponding to the input printing data signals SI11[1] to SI11[*p*] in accordance with the content of FIG. 13. As a result, each of the p sets of transmission gates TGa, TGb, and TGc is controlled to be conductive or non-conductive. As a result, each of the drive signals Com-A, Com-B, and Com-C included in the drive signal COM11 is controlled to be selected or non-selected and the drive signal Vin-1 is output to the terminal OTN.

Figure 15:
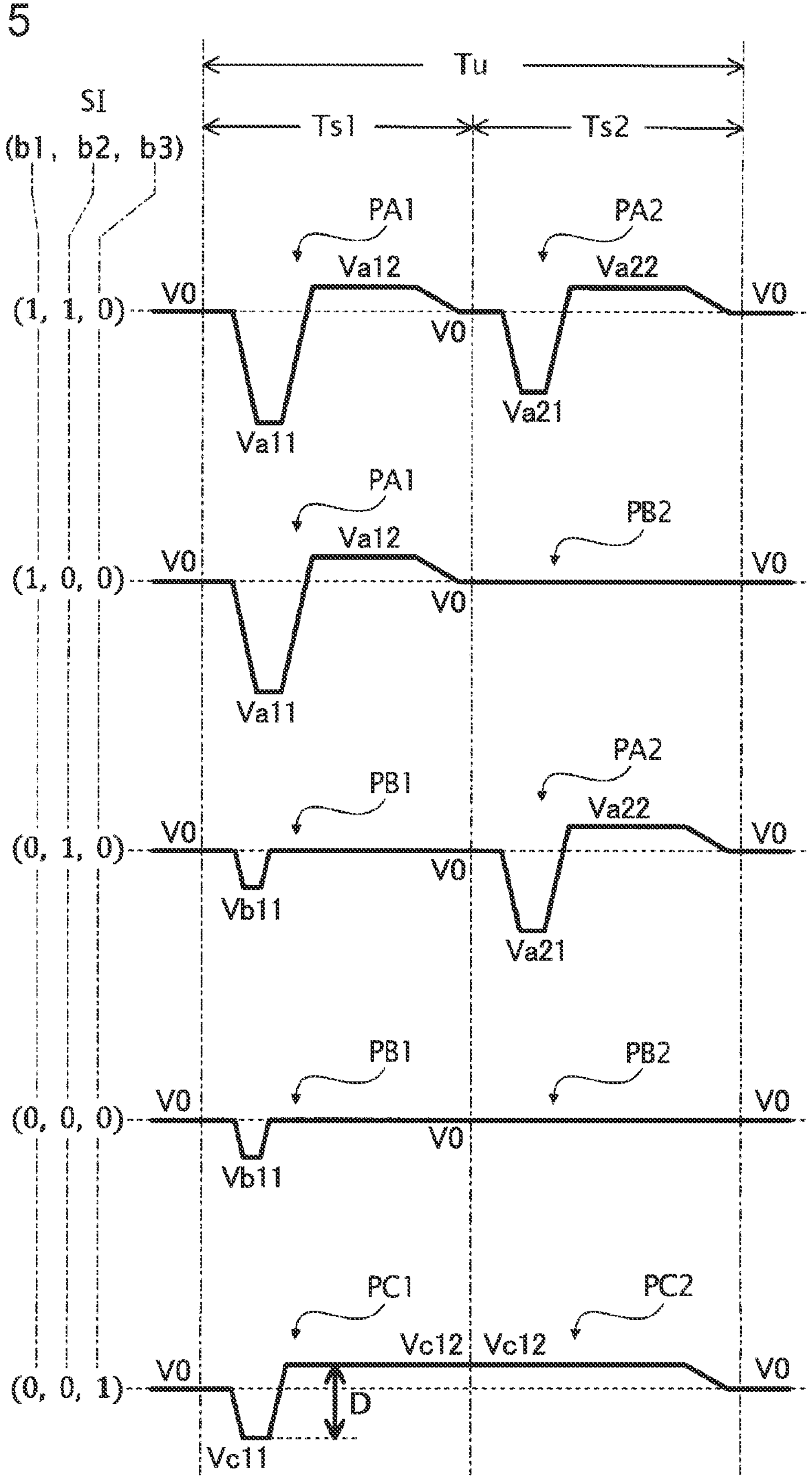
FIG. 15 is a diagram illustrating an example of the waveform of a drive signal.

An example of the waveform of the drive signal Vin-1 output in the unit operation period Tu from the selection control circuit 220 configured as described above will be described. FIG. 15 is a diagram illustrating an example of the waveform of the drive signal Vin-1.

In a case where printing data [b1, b2, b3]=[1, 1, 0] is input to the selection control circuit 220 in the unit operation period Tu, the decoder DC sets the logic levels of the selection signals Sa, Sb, and Sc in the control period Ts1 to the H, L, and L levels and sets the logic levels of the selection signals Sa, Sb, and Sc in the control period Ts2 to the H, L, and L levels. Accordingly, the drive signal Com-A is selected in the control period Ts1 and the drive signal Com-A is selected in the control period Ts2. As a result, the selection control circuit 220 outputs the drive signal Vin-1 in which the unit waveform PA1 and the unit waveform PA2 are continuous in the unit operation period Tu. Accordingly, in the unit operation period Tu, the medium amount of ink and the small amount of ink are ejected from the nozzle 651 corresponding to the piezoelectric element 60 to which the drive signal Vin-1 is supplied. Then, large dots are formed on the medium P by the ink ejected from the nozzle 651 being joined on the medium P.

In addition, in a case where printing data [b1, b2, b3]=[1, 0, 0] is input to the selection control circuit 220 in the unit operation period Tu, the decoder DC sets the logic levels of the selection signals Sa, Sb, and Sc in the control period Ts1 to the H, L, and L levels and sets the logic levels of the selection signals Sa, Sb, and Sc in the control period Ts2 to the L, H, and L levels. Accordingly, the drive signal Com-A is selected in the control period Ts1 and the drive signal Com-B is selected in the control period Ts2. As a result, the selection control circuit 220 outputs the drive signal Vin-1 having a waveform in which the unit waveform PA1 and the unit waveform PB2 are continuous in the unit operation period Tu. Accordingly, in the unit operation period Tu, the medium amount of ink is ejected from the nozzle 651 corresponding to the piezoelectric element 60 to which the drive signal Vin-1 is supplied and medium dots are formed on the medium P.

In addition, in a case where printing data [b1, b2, b3]=[0, 1, 0] is input to the selection control circuit 220 in the unit operation period Tu, the decoder DC sets the logic levels of the selection signals Sa, Sb, and Sc in the control period Ts1 to the L, H, and L levels and sets the logic levels of the selection signals Sa, Sb, and Sc in the control period Ts2 to the H, L, and L levels. Accordingly, the drive signal Com-B is selected in the control period Ts1 and the drive signal Com-A is selected in the control period Ts2. As a result, the selection control circuit 220 outputs the drive signal Vin-1 having a waveform in which the unit waveform PB1 and the unit waveform PA2 are continuous in the unit operation period Tu. Accordingly, in the unit operation period Tu, the small amount of ink is ejected from the nozzle 651 corresponding to the piezoelectric element 60 to which the drive signal Vin-1 is supplied and small dots are formed on the medium P.

In addition, in a case where printing data [b1, b2, b3]=[0, 0, 0] is input to the selection control circuit 220 in the unit operation period Tu, the decoder DC sets the logic levels of the selection signals Sa, Sb, and Sc in the control period Ts1 to the L, H, and L levels and sets the logic levels of the selection signals Sa, Sb, and Sc in the control period Ts2 to the L, H, and L levels. Accordingly, the drive signal Com-B is selected in the control period Ts1 and the drive signal Com-B is selected in the control period Ts2. As a result, the selection control circuit 220 outputs the drive signal Vin-1 having a waveform in which the unit waveform PB1 and the unit waveform PB2 are continuous in the unit operation period Tu. Accordingly, in the unit operation period Tu, no ink is ejected from the nozzle 651 corresponding to the piezoelectric element 60 to which the drive signal Vin-1 is supplied. Accordingly, no dot is formed on the medium P. The drive signal Vin-1 output by the selection control circuit 220 in this case drives the piezoelectric element 60 to the extent that no ink is ejected from the nozzle 651. As a result, the ink in the vicinity of the nozzle 651 vibrates. As a result, the possibility that the viscosity of the ink in the vicinity of the nozzle 651 increases is reduced.

In addition, in a case where printing data [b1, b2, b3]=[0, 0, 1] is input to the selection control circuit 220 in the unit operation period Tu, the decoder DC sets the logic levels of the selection signals Sa, Sb, and Sc in the control period Ts1 to the L, L, and H levels and sets the logic levels of the selection signals Sa, Sb, and Sc in the control period Ts2 to the L, L, and H levels. Accordingly, the drive signal Com-C is selected in the control period Ts1 and the drive signal Com-C is selected in the control period Ts2. As a result, the selection control circuit 220 outputs the drive signal Vin-1 having a waveform in which the unit waveform PC1 and the unit waveform PC2 are continuous in the unit operation period Tu. Accordingly, in the unit operation period Tu, no ink is ejected from the nozzle 651 of the ejecting portion 600 to which the drive signal Vin-1 is supplied. Accordingly, no dot is formed on the medium P. The drive signal Vin-1 output by the selection control circuit 220 in this case corresponds to a waveform for inspection for detecting the residual vibration Vout-1 of the piezoelectric element 60.

Figure 16:
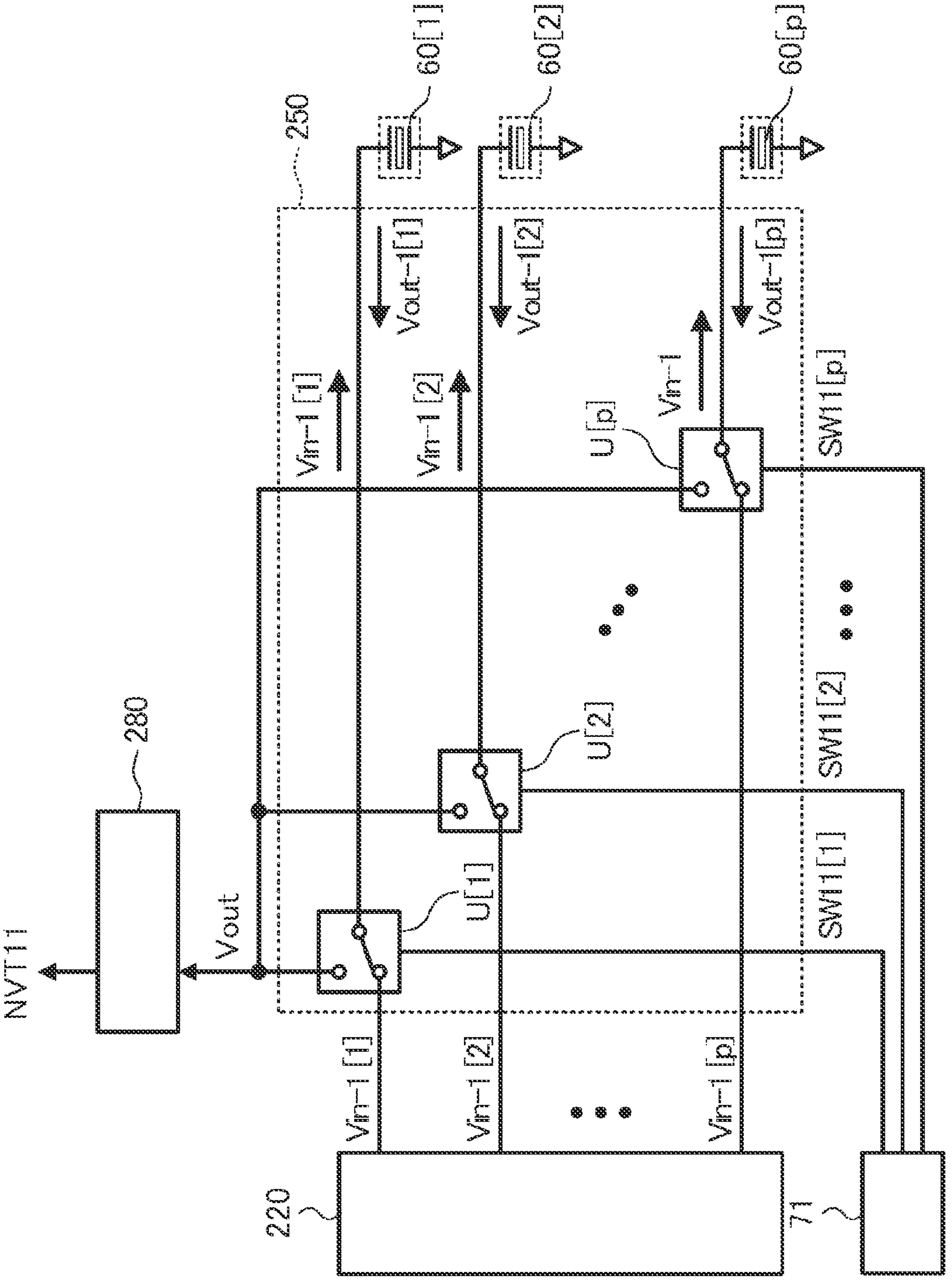
FIG. 16 is a diagram illustrating an example of the functional configuration of a switching circuit.

Next, the configuration and operation of the switching circuit 250 will be described. FIG. 16 is a diagram illustrating an example of the functional configuration of the switching circuit 250. The switching circuit 250 includes p changeover switches U as many as the p ejecting portions 600 of the head chip 310-1. It should be noted that the changeover switches U to which the drive signals Vin-1[1], Vin-1[2], . . . , Vin-1[*p*] output from the selection control circuit 220 are input are indicated as U[1], U[2], . . . , U[p] in FIG. 16. In addition, in FIG. 16, of the p piezoelectric elements 60 of the p ejecting portions 600, the piezoelectric elements 60 to which the drive signals Vin-1[1], Vin-1[2], . . . , Vin-1[*p*] are input are illustrated as 60[1], 60[2], . . . , 60[*p*].

Each of the changeover switches U switches, based on the switching signal SW11, between whether to supply the drive signal Vin-1 input from the selection control circuit 220 to the piezoelectric element 60 of the corresponding ejecting portion 600 or to supply the residual vibration Vout-1 generated after the drive signal Vin-1 is supplied to the piezoelectric element 60 to the residual vibration detection circuit 280.

Specifically, the switching signal SW11[1] is input to the changeover switch U[1]. Then, the changeover switch U[1] switches, based on the switching signal SW11[1], whether to supply the drive signal Vin-1[1] to the piezoelectric element 60[1] or to supply the residual vibration Vout-1[1] generated in the piezoelectric element 60[1] after the drive signal Vin-1[1] is supplied to the piezoelectric element 60[1] to the residual vibration detection circuit 280.

Likewise, the switching signal SW11[*p*] is input to the changeover switch U[p]. Then, the changeover switch U[p] switches, based on the switching signal SW11[*p*], whether to supply the drive signal Vin-1[*p*] to the piezoelectric element 60[*p*] or to supply the residual vibration Vout-1[*p*] generated in the piezoelectric element 60[*p*] after the drive signal Vin-1[*p*] is supplied to the piezoelectric element 60[*p*] to the residual vibration detection circuit 280.

Here, in the unit operation period Tu, the switching signals SW11[1] to SW11[*p*] switch the changeover switches U[1] to U[p] such that any one of the piezoelectric elements 60[1] to 60[*p*] is electrically coupled to the residual vibration detection circuit 280. In other words, the residual vibration detection circuit 280 detects any one of the residual vibrations Vout-1[1] to Vout-1[*p*] respectively corresponding to the p piezoelectric elements 60[1] to 60[*p*] based on the switching signal SW11 and generates the residual vibration signal NVT11 in the corresponding ejecting portion 600. Accordingly, the switching signal SW11 may be capable of controlling the changeover switches U[1] to U[p] to be sequentially turned ON and may be a configuration sequentially controlling the p changeover switches U by sequentially propagating the switching signal SW11 by a register (not illustrated) or the like. It should be noted that the residual vibration Vout-1 is assumed to be input from the switching circuit 250 to the residual vibration detection circuit 280 in the following description.

Figure 17:
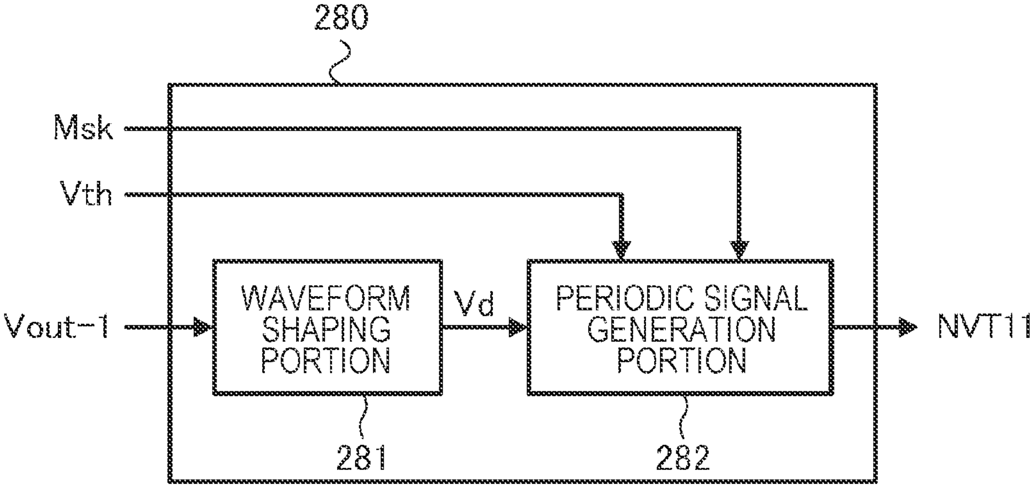
FIG. 17 is a block diagram illustrating the configuration of a residual vibration detection circuit.

Next, the configuration of the residual vibration detection circuit 280 will be described. FIG. 17 is a block diagram illustrating the configuration of the residual vibration detection circuit 280. The residual vibration detection circuit 280 detects the residual vibration Vout-1 and generates and outputs the residual vibration signal NVT11 indicating at least one of the cycle and the vibration frequency of the detected residual vibration Vout-1.

As illustrated in FIG. 17, the residual vibration detection circuit 280 includes a waveform shaping portion 281 and a periodic signal generation portion 282. The waveform shaping portion 281 generates a shaped waveform signal Vd, which is obtained by a noise component being removed from the residual vibration Vout-1. The waveform shaping portion 281 includes, for example, a high-pass filter for outputting a signal in which a frequency component lower in frequency band than the residual vibration Vout-1 is attenuated or a low-pass filter for outputting a signal in which a frequency component higher in frequency band than the residual vibration Vout-1 is attenuated. As a result, the waveform shaping portion 281 limits the frequency range of the residual vibration Vout-1 and outputs the noise component-removed shaped waveform signal Vd. In addition, the waveform shaping portion 281 may include a negative feedback-type amplifier circuit for adjusting the amplitude of residual vibration Vout-1, an impedance conversion circuit for converting the impedance of the residual vibration Vout-1, or the like.

The periodic signal generation portion 282 generates and outputs the residual vibration signal NVT11 indicating the cycle and the vibration frequency of the residual vibration Vout-1 based on the shaped waveform signal Vd. The shaped waveform signal Vd, a mask signal Msk, and a threshold potential Vth are input to the periodic signal generation portion 282. Here, the mask signal Msk and the threshold potential Vth may be supplied from, for example, the print head control circuit 71 or may be supplied to the periodic signal generation portion 282 by information stored in a storage portion (not illustrated) being read.

Figure 18:
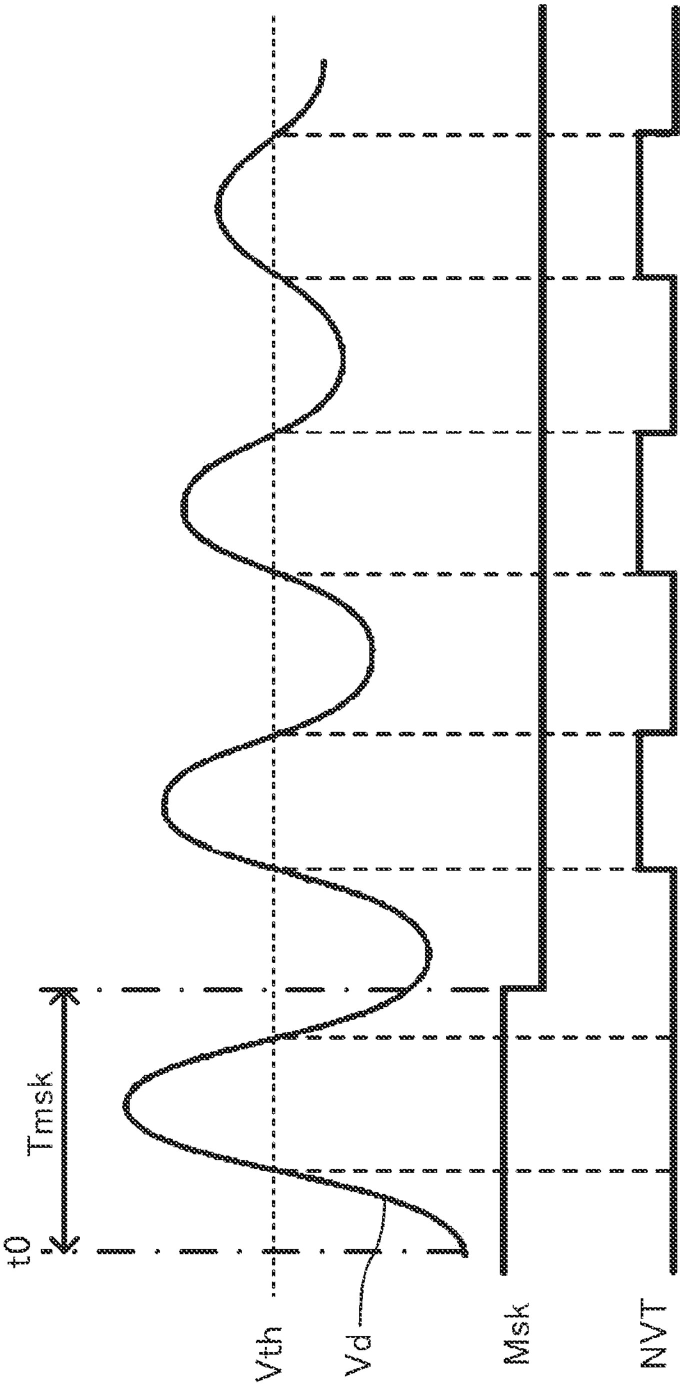
FIG. 18 is a diagram for describing the operation of a periodic signal generation portion.

FIG. 18 is a diagram for describing the operation of the periodic signal generation portion 282. Here, the threshold potential Vth illustrated in FIG. 18 is a threshold that is set to a potential of a predetermined level within the amplitude of the shaped waveform signal Vd and is set to, for example, a potential at the center level of the amplitude of the shaped waveform signal Vd. The periodic signal generation portion 282 generates and outputs the residual vibration signal NVT11 based on the input shaped waveform signal Vd and threshold potential Vth.

Specifically, the periodic signal generation portion 282 compares the potential of the shaped waveform signal Vd with the threshold potential Vth. Then, the periodic signal generation portion 282 generates the residual vibration signal NVT11 that becomes the H level in a case where the potential of the shaped waveform signal Vd is equal to or higher than the threshold potential Vth and becomes the L level in a case where the potential of the shaped waveform signal Vd is lower than the threshold potential Vth.

The residual vibration signal NVT11 generated by the residual vibration detection circuit 280 is input to the ejecting portion state determination circuit 73. The ejecting portion state determination circuit 73 measures the cycle and the vibration frequency of the residual vibration Vout-1 by detecting the period until the logic level of the input residual vibration signal NVT11 becomes the H level again after a transition from the H level to the L level. Then, the ejecting portion state determination circuit 73 generates the ejecting portion state signal DI11 indicating the corresponding ejecting portion 600 based on the result of the cycle and vibration frequency measurement and inputs the ejecting portion state signal DI11 to the print head control circuit 71.

The mask signal Msk is a signal that is at the H level for a predetermined period Tmsk from time t0 when the supply of the shaped waveform signal Vd is started. The periodic signal generation portion 282 stops the generation of the residual vibration signal NVT11 while the mask signal Msk is at the H level and generates the residual vibration signal NVT11 while the mask signal Msk is at the H level. In other words, the periodic signal generation portion 282 generates the residual vibration signal NVT11 only for the shaped waveform signal Vd after the elapse of the period Tmsk among the shaped waveform signals Vd. As a result, the periodic signal generation portion 282 is capable of excluding a noise component that is superimposed immediately after the residual vibration Vout-1 is generated and is capable of generating the high-precision residual vibration signal NVT11.

As described above, the liquid ejecting apparatus 1 of the present embodiment includes the drive signal output circuit 72 that outputs the drive signal COM and the print head 3 that is assembled to the liquid ejecting apparatus 1 ejecting ink onto the medium P, the print head 3 has the ejecting portion 600 that ejects ink in response to the drive signal COM, the storage circuit 200 that includes an electrically erasable non-volatile memory, and the wireless communication module 230, the storage circuit 200 stores the history information of the print head 3, and the wireless communication module 230 transmits the history information stored in the storage circuit 200 in accordance with a request from the external device 10.

1.3.5 History Information Stored in Storage Circuit and Operation of Print Head

Next, a specific example of the history information indicating the operation state of the print head 3 stored in the storage circuit 200 and changing in accordance with the operation state of the print head 3 will be described with reference to FIG. 19. FIG. 19 is a diagram illustrating an example of the history information stored in the storage circuit 200 of the print head 3. As illustrated in FIG. 19, information on a cumulative printing surface count TP, information on an elapsed day count LD, information on an error count EC, information on a transport error count CEC, information on a capping processing count CP, information on a cleaning processing count CL, and information on a wiping processing count WP are stored as the history information indicating the operation state of the print head 3 in the storage circuit 200. It should be noted that the information stored in the storage circuit 200 is not limited thereto and may include, for example, the product and lot numbers of the print head 3.

The information on the cumulative printing surface count TP is information indicating the number of surfaces printed after the print head 3 is assembled to the liquid ejecting apparatus 1 and is stored in storage regions M1 to M4 of the storage circuit 200. Here, the number of printing surfaces is the number of surfaces of the medium P where an image is formed with ink ejected from the ejecting portion 600 of the print head 3, is counted as "2" in a case where, for example, an image has been formed by the liquid ejecting apparatus 1 ejecting ink with respect to both surfaces of the medium P, and is counted as "1" in a case where, for example, printing has been performed by the liquid ejecting apparatus 1 allocating two pages of the image data signal IMG with respect to one surface of the medium P.

Cumulative printing surface count first threshold information TPth1 as a piece of the threshold information of the cumulative printing surface count TP is stored in the storage region M1, which is one of the storage regions M1 to M4 of the storage circuit 200 storing the information on the cumulative printing surface count TP. The cumulative printing surface count first threshold information TPth1 corresponds to a threshold for determining whether or not the print head 3 has a use history and is set to, for example, "1".

Cumulative printing surface count second threshold information TPth2 as a piece of the threshold information of the cumulative printing surface count TP is stored in the storage region M2, which is one of the storage regions M1 to M4 of the storage circuit 200 storing the information on the cumulative printing surface count TP. The ejection state in the print head 3 greatly fluctuates in an initial state and then becomes stable after a predetermined number of ejections. The cumulative printing surface count second threshold information TPth2 is a threshold for dividing the state of the print head 3 to be reused and corresponds to a threshold for dividing between the initial state where the ejection state fluctuates greatly and the stable state after stabilization.

Here, the cumulative printing surface count second threshold information TPth2 may include, for example, a threshold for determination indicating whether or not the number of surfaces printed until cumulative printing surface count information TPc reaches threshold information defined by the cumulative printing surface count third threshold information TPth3, which will be described later, is equal to or greater than a predetermined printing surface count. In other words, the storage circuit 200 may store a plurality of pieces of the cumulative printing surface count second threshold information TPth2. As a result, it is possible to easily estimate the remaining service life of each portion of the print head 3 to be reused.

The cumulative printing surface count third threshold information TPth3 as a piece of the threshold information of the cumulative printing surface count TP is stored in the storage region M3, which is one of the storage regions M1 to M4 of the storage circuit 200 storing the information on the cumulative printing surface count TP. The cumulative printing surface count third threshold information TPth3 corresponds to a threshold for determining whether or not the print head 3 can be reused. In other words, a case where the number of surfaces printed after the print head 3 is assembled to the liquid ejecting apparatus 1 exceeds the cumulative printing surface count third threshold information TPth3 means that the print head 3 is not suitable for reuse.

The cumulative printing surface count information TPc as the history information of the cumulative printing surface count TP is stored in the storage region M4, which is one of the storage regions M1 to M4 of the storage circuit 200 storing the information on the cumulative printing surface count TP. The cumulative printing surface count information TPc corresponds to the count value of the number of printing surfaces of the medium P where an image is formed with ink ejected from the ejecting portion 600 of the print head 3. In other words, the cumulative printing surface count information TPc changes in accordance with the state of ink ejection from the ejecting portion 600 of the print head 3.

An example of the operation of the liquid ejecting apparatus 1 corresponding to the information on the cumulative printing surface count TP stored in the storage circuit 200 as described above will be described.

By the print head control circuit 71 outputting, to the storage circuit 200, the memory control signal MC for reading the information on the cumulative printing surface count TP stored in the storage circuit 200, the cumulative printing surface count first threshold information TPth1, the cumulative printing surface count second threshold information TPth2, the cumulative printing surface count third threshold information TPth3, and the cumulative printing surface count information TPc are read by the print head control circuit 71 as the information on the cumulative printing surface count TP stored in the storage circuit 200.

Then, the print head control circuit 71 counts the number of printing surfaces of the medium P where ink has been ejected from the ejecting portion 600 of the print head 3 and adds the counted number of the printing surfaces to the cumulative printing surface count information TPc read from the storage circuit 200. Then, the print head control circuit 71 compares the result of the addition with each of the cumulative printing surface count first threshold information TPth1, the cumulative printing surface count second threshold information TPth2, and the cumulative printing surface count third threshold information TPth3.

The print head control circuit 71 controls each portion of the liquid ejecting apparatus 1 including the print head 3 depending on whether the result of adding the counted number of the printing surfaces to the cumulative printing surface count information TPc exceeds the cumulative printing surface count first threshold information TPth1, the cumulative printing surface count second threshold information TPth2, and the cumulative printing surface count third threshold information TPth3.

For example, the print head control circuit 71 may execute control for correcting, for example, the ejection speed of the ink ejected from the ejecting portion 600 or the transport speed of the medium P depending on whether or not the addition result exceeds the cumulative printing surface count second threshold information TPth2. In addition, in a case where the addition result exceeds the cumulative printing surface count third threshold information TPth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of the printing surfaces to the cumulative printing surface count information TPc in the storage region M4 of the storage circuit 200 as the cumulative printing surface count information TPc at a predetermined timing. Here, the predetermined timing at which the print head control circuit 71 writes the cumulative printing surface count information TPc may be any timing in a period when the print head 3 is incorporated in the same liquid ejecting apparatus 1 and may be any of, for example, a timing when a request for removing the print head 3 incorporated in the liquid ejecting apparatus 1 has been made, a timing when the result of adding the counted number of the printing surfaces to the cumulative printing surface count information TPc read from the storage circuit 200 has exceeded at least any one of the cumulative printing surface count first threshold information TPth1, the cumulative printing surface count second threshold information TPth2, and the cumulative printing surface count third threshold information TPth3, a timing when a request for writing to the storage circuit 200 has been made as a result of user operation, and a timing when the supply of the power supply voltage to the liquid ejecting apparatus 1 is interrupted.

As a result, the storage circuit 200 of the print head 3 stores the information on the cumulative printing surface count TP of image formation on the medium P in a period when the print head 3 is assembled to the liquid ejecting apparatus 1 as the history information varying with the operation state of the print head 3. In other words, the operation state of the print head 3 includes a state where ink is ejected from the ejecting portion 600, and the history information stored in the storage circuit 200 includes the cumulative printing surface count of the medium P on which ink is ejected by the ejecting portion 600 of the print head 3 after the print head 3 is assembled to the liquid ejecting apparatus 1.

In addition, in a case where the wireless communication module 230 receives the wireless communication signal Wr for reading the information on the cumulative printing surface count TP stored in the storage circuit 200 from the external device 10, the wireless communication module 230 generates and outputs to the storage circuit 200 the memory control signal Wmc for reading the information on the cumulative printing surface count TP stored in the storage circuit 200. As a result, as the information on the cumulative printing surface count TP stored in the storage circuit 200, the cumulative printing surface count first threshold information TPth1, the cumulative printing surface count second threshold information TPth2, the cumulative printing surface count third threshold information TPth3, and the cumulative printing surface count information TPc are read by the wireless communication module 230.

The wireless communication module 230 generates and outputs to the external device 10 the wireless communication signal Wr including the cumulative printing surface count first threshold information TPth1, the cumulative printing surface count second threshold information TPth2, the cumulative printing surface count third threshold information TPth3, and the cumulative printing surface count information TPc read from the storage circuit 200. As a result, the cumulative printing surface count first threshold information TPth1, the cumulative printing surface count second threshold information TPth2, the cumulative printing surface count third threshold information TPth3, and the cumulative printing surface count information TPc are input to the external device 10.

In other words, in the liquid ejecting apparatus 1 according to the present embodiment, the print head 3 transmits the information on the cumulative printing surface count TP as the history information to the external device 10 in accordance with a request from the external device 10. As a result, a user who operates the external device 10 can acquire the information on the cumulative printing surface count TP indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the cumulative printing surface count TP.

The information on the elapsed day count LD is information indicating the number of days that have elapsed since the assembly of the print head 3 to the liquid ejecting apparatus 1 and is stored in storage regions M5 to M8 of the storage circuit 200. Here, the information on the elapsed day count LD may be calculated based on the elapsed time information YMD measured by the time measurement circuit 83 with the print head 3 assembled to the liquid ejecting apparatus 1 or may be calculated based on date and time information stored in a storage portion (not illustrated) and current date and time information with the storage portion storing the date and time of the assembly of the print head 3 to the liquid ejecting apparatus 1.

Elapsed day count first threshold information LDth1 as a piece of the threshold information of the elapsed day count LD is stored in the storage region M5, which is one of the storage regions M5 to M8 of the storage circuit 200 storing the information on the elapsed day count LD. The elapsed day count first threshold information LDth1 corresponds to a threshold for determining whether or not the print head 3 has a use history and is set to, for example, “1”.

Elapsed day count second threshold information LDth2 as a piece of the threshold information of the elapsed day count LD is stored in the storage region M6, which is one of the storage regions M5 to M8 of the storage circuit 200 storing the information on the elapsed day count LD. The elapsed day count second threshold information LDth2 is a threshold for dividing the state of the print head 3 to be reused. In addition, the elapsed day count second threshold information LDth2 may be a threshold indicating whether or not the number of days until the threshold defined by elapsed day count third threshold information LDth3, which will be described later, is reached is equal to or greater than a predetermined number of days. As a result, it is possible to easily estimate the remaining service life of each portion of the print head 3 to be reused.

The elapsed day count third threshold information LDth3 as a piece of the threshold information of the elapsed day count LD is stored in the storage region M7, which is one of the storage regions M5 to M8 of the storage circuit 200 storing the information on the elapsed day count LD. The elapsed day count third threshold information LDth3 corresponds to a threshold for determining whether or not the print head 3 can be reused. In other words, a case where the number of days since the assembly of the print head 3 to the liquid ejecting apparatus 1 exceeds the elapsed day count third threshold information LDth3 means that the print head 3 is not suitable for reuse.

Elapsed day count information LDc as the history information of the elapsed day count LD is stored in the storage region M8, which is one of the storage regions M5 to M8 of the storage circuit 200 storing the information on the elapsed day count LD. The elapsed day count information LDc varies with the number of days that have elapsed with the print head 3 incorporated in the liquid ejecting apparatus 1. In other words, the elapsed day count information LDc varies with the state where the print head 3 is incorporated in the liquid ejecting apparatus 1.

An example of the operation of the liquid ejecting apparatus 1 corresponding to the information on the elapsed day count LD stored in the storage circuit 200 as described above will be described.

By the print head control circuit 71 outputting, to the storage circuit 200, the memory control signal MC for reading the information on the elapsed day count LD stored in the storage circuit 200, the elapsed day count first threshold information LDth1, the elapsed day count second threshold information LDth2, the elapsed day count third threshold information LDth3, and the elapsed day count information LDc are read by the print head control circuit 71 as the information on the elapsed day count LD stored in the storage circuit 200.

Then, the print head control circuit 71 counts the number of days since the assembly of the print head 3 to the liquid ejecting apparatus 1 and adds the counted number of days to the elapsed day count information LDc read from the storage circuit 200. Then, the print head control circuit 71 compares the result of the addition with each of the elapsed day count first threshold information LDth1, the elapsed day count second threshold information LDth2, and the elapsed day count third threshold information LDth3.

The print head control circuit 71 controls each portion of the liquid ejecting apparatus 1 including the print head 3 depending on whether the result of adding the counted number of days to the elapsed day count information LDc exceeds the elapsed day count first threshold information LDth1, the elapsed day count second threshold information LDth2, and the elapsed day count third threshold information LDth3.

For example, the print head control circuit 71 may execute control for correcting, for example, the ejection speed of the ink ejected from the ejecting portion 600 or the transport speed of the medium P depending on whether or not the addition result exceeds the elapsed day count second threshold information LDth2. In addition, in a case where the addition result exceeds the elapsed day count third threshold information LDth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of days to the elapsed day count information LDc in the storage region M8 of the storage circuit 200 as the elapsed day count information LDc at a predetermined timing. Here, the predetermined timing at which the print head control circuit 71 writes the elapsed day count information LDc is the same as in the case of the information on the cumulative printing surface count TP described above.

As a result, the storage circuit 200 of the print head 3 stores the information on the elapsed day count LD since the assembly of the print head 3 to the liquid ejecting apparatus 1 as the history information varying with the operation state of the print head 3. In other words, the operation state of the print head 3 includes a state where the print head 3 is assembled to the liquid ejecting apparatus 1, and the history information stored in the storage circuit 200 includes the number of days since the assembly of the print head 3 to the liquid ejecting apparatus 1.

In addition, in a case where the wireless communication module 230 receives the wireless communication signal Wr for reading the information on the elapsed day count LD stored in the storage circuit 200 from the external device 10, the wireless communication module 230 generates and outputs to the storage circuit 200 the memory control signal Wmc for reading the information on the elapsed day count LD stored in the storage circuit 200. As a result, as the information on the elapsed day count LD stored in the storage circuit 200, the elapsed day count first threshold information LDth1, the elapsed day count second threshold information LDth2, the elapsed day count third threshold information LDth3, and the elapsed day count information LDc are read by the wireless communication module 230.

The wireless communication module 230 generates and outputs to the external device 10 the wireless communication signal Wr including the elapsed day count first threshold information LDth1, the elapsed day count second threshold information LDth2, the elapsed day count third threshold information LDth3, and the elapsed day count information LDc read from the storage circuit 200. As a result, the elapsed day count first threshold information LDth1, the elapsed day count second threshold information LDth2, the elapsed day count third threshold information LDth3, and the elapsed day count information LDc are input to the external device 10.

In other words, in the liquid ejecting apparatus 1 according to the present embodiment, the print head 3 transmits the information on the elapsed day count LD as the history information to the external device 10 in accordance with a request from the external device 10. As a result, a user who operates the external device 10 can acquire the information on the elapsed day count LD indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the elapsed day count LD.

The information on the error count EC is information indicating the number of errors that have occurred in the print head 3 since the assembly of the print head 3 to the liquid ejecting apparatus 1 and is stored in storage regions M9 to M12 of the storage circuit 200. Here, the information on the error count EC is information indicating a state where an error has occurred in the print head 3 and specifically includes, for example, an ejecting portion abnormality in which no ink is ejected from the nozzle 651 in the ejecting portion 600, overvoltage and overcurrent abnormalities in the print head 3, and a transport abnormality in which the medium P is not transported normally. Further, the error count EC is calculated based on, for example, the ejecting portion state signal DI based on the residual vibration signal NVT output from the ejecting portion state determination circuit 73 described above, the medium transport error signal ERR1 output from the medium transport error detection circuit 58, and signals output from overvoltage and overcurrent detection circuits (not illustrated) and indicating the presence or absence of overvoltage and overcurrent abnormalities.

Error count first threshold information ECth1 as a piece of the threshold information of the error count EC is stored in the storage region M9, which is one of the storage regions M9 to M12 of the storage circuit 200 storing the information on the error count EC. The error count first threshold information ECth1 corresponds to a threshold for determining whether or not the print head 3 has a use history and is set to, for example, "1".

Error count second threshold information ECth2 as a piece of the threshold information of the error count EC is stored in the storage region M10, which is one of the storage regions M9 to M12 of the storage circuit 200 storing the information on the error count EC. The error count second threshold information ECth2 is a threshold for dividing the state of the print head 3 to be reused. In addition, the error count second threshold information ECth2 may be a threshold indicating whether or not the number of errors until the threshold defined by error count third threshold information ECth3, which will be described later, is reached is equal to or greater than a predetermined number. As a result, it is possible to easily estimate the remaining service life of each portion of the print head 3 to be reused.

The error count third threshold information ECth3 as a piece of the threshold information of the error count EC is stored in the storage region M11, which is one of the storage regions M9 to M12 of the storage circuit 200 storing the information on the error count EC. The error count third threshold information ECth3 corresponds to a threshold for determining whether or not the print head 3 can be reused. In other words, a case where the number of errors that have occurred since the assembly of the print head 3 to the liquid ejecting apparatus 1 exceeds the error count third threshold information ECth3 means that the print head 3 is not suitable for reuse.

Error count information ECc as the history information of the error count EC is stored in the storage region M12, which is one of the storage regions M9 to M12 of the storage circuit 200 storing the information on the error count EC. The error count information ECc varies with the number of errors that have occurred since the incorporation of the print head 3 in the liquid ejecting apparatus 1. In other words, the error count information ECc varies with the state where the print head 3 is incorporated in the liquid ejecting apparatus 1.

An example of the operation of the liquid ejecting apparatus 1 corresponding to the information on the error count EC stored in the storage circuit 200 as described above will be described.

By the print head control circuit 71 outputting, to the storage circuit 200, the memory control signal MC for reading the information on the error count EC stored in the storage circuit 200, the error count first threshold information ECth1, the error count second threshold information ECth2, the error count third threshold information ECth3, and the error count information ECc are read by the print head control circuit 71 as the information on the error count EC stored in the storage circuit 200.

Then, the print head control circuit 71 counts the number of errors since the assembly of the print head 3 to the liquid ejecting apparatus 1 and adds the counted number of errors to the error count information ECc read from the storage circuit 200. Then, the print head control circuit 71 compares the result of the addition with each of the error count first threshold information ECth1, the error count second threshold information ECth2, and the error count third threshold information ECth3.

The print head control circuit 71 controls each portion of the liquid ejecting apparatus 1 including the print head 3 depending on whether the result of adding the counted number of errors to the error count information ECc exceeds the error count first threshold information ECth1, the error count second threshold information ECth2, and the error count third threshold information ECth3.

For example, the print head control circuit 71 may execute control for correcting, for example, the ejection speed of the ink ejected from the ejecting portion 600 or the transport speed of the medium P depending on whether or not the addition result exceeds the error count second threshold information ECth2. In addition, in a case where the addition result exceeds the error count third threshold information ECth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of errors to the error count information ECc in the storage region M12 of the storage circuit 200 as the error count information ECc at a predetermined timing. Here, the predetermined timing at which the print head control circuit 71 writes the error count information ECc is the same as in the case of the information on the cumulative printing surface count TP described above.

As a result, the storage circuit 200 of the print head 3 stores the information on the error count EC since the assembly of the print head 3 to the liquid ejecting apparatus 1 as the history information varying with the operation state of the print head 3. In other words, the operation state of the print head 3 includes a state where an error has occurred in the print head 3, and the history information stored in the storage circuit 200 includes the number of errors since the assembly of the print head 3 to the liquid ejecting apparatus 1.

In addition, in a case where the wireless communication module 230 receives the wireless communication signal Wr for reading the information on the error count EC stored in the storage circuit 200 from the external device 10, the wireless communication module 230 generates and outputs to the storage circuit 200 the memory control signal Wmc for reading the information on the error count EC stored in the storage circuit 200. As a result, as the information on the error count EC stored in the storage circuit 200, the error count first threshold information ECth1, the error count second threshold information ECth2, the error count third threshold information ECth3, and the error count information ECc are read by the wireless communication module 230.

The wireless communication module 230 generates and outputs to the external device 10 the wireless communication signal Wr including the error count first threshold information ECth1, the error count second threshold information ECth2, the error count third threshold information ECth3, and the error count information ECc read from the storage circuit 200. As a result, the error count first threshold information ECth1, the error count second threshold information ECth2, the error count third threshold information ECth3, and the error count information ECc are input to the external device 10.

In other words, in the liquid ejecting apparatus 1 according to the present embodiment, the print head 3 transmits the information on the error count EC as the history information to the external device 10 in accordance with a request from the external device 10. As a result, a user who operates the external device 10 can acquire the information on the error count EC indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the error count EC.

The information on the transport error count CEC is information indicating the number of errors that have occurred during the transport of the medium P after the assembly of the print head 3 to the liquid ejecting apparatus 1 and is stored in storage regions M13 to M16 of the storage circuit 200. Here, the information on the transport error count CEC is information indicating a state where a transport error has occurred in the medium P transported to the print head 3 and specifically includes, for example, a so-called jam that occurs after the assembly of the print head 3 to the liquid ejecting apparatus 1 and in which the medium P cannot be normally supplied or discharged in the medium transport mechanism 5. Further, the transport error count CEC is calculated based on the medium transport error signal ERR1 output from the medium transport error detection circuit 58 described above.

In the case of the so-called jam or the like in which the medium P cannot be normally supplied or discharged in the medium transport mechanism 5, the medium P comes into contact with the nozzle surface 652 of the print head 3 and the nozzle 651 may be damaged as a result. Accordingly, in the print head 3 to be reused, it is possible to enhance the precision of determination as to whether the print head 3 can be reused by storing the information on the transport error count CEC separately from the error count EC described above.

Transport error count first threshold information CECth1 as a piece of the threshold information of the transport error count CEC is stored in the storage region M13, which is one of the storage regions M13 to M16 of the storage circuit 200 storing the information on the transport error count CEC. The transport error count first threshold information CECth1 corresponds to a threshold for determining whether or not the print head 3 has a use history and is set to, for example, “1”.

Transport error count second threshold information CECth2 as a piece of the threshold information of the transport error count CEC is stored in the storage region M14, which is one of the storage regions M13 to M16 of the storage circuit 200 storing the information on the transport error count CEC. The transport error count second threshold information CECth2 is a threshold for dividing the state of the print head 3 to be reused. In addition, the transport error count second threshold information CECth2 may be a threshold indicating whether or not the number of transport errors until the threshold defined by transport error count third threshold information CECth3, which will be described later, is reached is equal to or greater than a predetermined number. As a result, it is possible to easily estimate the remaining service life of each portion of the print head 3 to be reused.

The transport error count third threshold information CECth3 as a piece of the threshold information of the transport error count CEC is stored in the storage region M15, which is one of the storage regions M13 to M16 of the storage circuit 200 storing the information on the transport error count CEC. The transport error count third threshold information CECth3 corresponds to a threshold for determining whether or not the print head 3 can be reused. In other words, a case where the number of transport errors that have occurred since the assembly of the print head 3 to the liquid ejecting apparatus 1 exceeds the transport error count third threshold information CECth3 means that the print head 3 is not suitable for reuse.

Transport error count information CECc as the history information of the transport error count CEC is stored in the storage region M16, which is one of the storage regions M13 to M16 of the storage circuit 200 storing the information on the transport error count CEC. The transport error count information CECc varies with the number of transport errors that have occurred since the incorporation of the print head 3 in the liquid ejecting apparatus 1. In other words, the transport error count information CECc varies with the state where the print head 3 is incorporated in the liquid ejecting apparatus 1.

An example of the operation of the liquid ejecting apparatus 1 corresponding to the information on the transport error count CEC stored in the storage circuit 200 as described above will be described.

By the print head control circuit 71 outputting, to the storage circuit 200, the memory control signal MC for reading the information on the transport error count CEC stored in the storage circuit 200, the transport error count first threshold information CECth1, the transport error count second threshold information CECth2, the transport error count third threshold information CECth3, and the transport error count information CECc are read by the print head control circuit 71 as the information on the transport error count CEC stored in the storage circuit 200.

Then, the print head control circuit 71 counts the number of transport errors since the assembly of the print head 3 to the liquid ejecting apparatus 1 and adds the counted number of transport errors to the transport error count information CECc read from the storage circuit 200. Then, the print head control circuit 71 compares the result of the addition with each of the transport error count first threshold information CECth1, the transport error count second threshold information CECth2, and the transport error count third threshold information CECth3.

The print head control circuit 71 controls each portion of the liquid ejecting apparatus 1 including the print head 3 depending on whether the result of adding the counted number of transport errors to the transport error count information CECc exceeds the transport error count first threshold information CECth1, the transport error count second threshold information CECth2, and the transport error count third threshold information CECth3.

For example, the print head control circuit 71 may execute control for correcting, for example, the ejection speed of the ink ejected from the ejecting portion 600 or the transport speed of the medium P depending on whether or not the addition result exceeds the transport error count second threshold information CECth2. In addition, in a case where the addition result exceeds the transport error count third threshold information CECth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of transport errors to the transport error count information CECc in the storage region M16 of the storage circuit 200 as the transport error count information CECc at a predetermined timing. Here, the predetermined timing at which the print head control circuit 71 writes the transport error count information CECc is the same as in the case of the information on the cumulative printing surface count TP described above.

As a result, the storage circuit 200 of the print head 3 stores the information on the transport error count CEC since the assembly of the print head 3 to the liquid ejecting apparatus 1 as the history information varying with the operation state of the print head 3. In other words, the operation state of the print head 3 includes a state where a transport error has occurred in the medium P transported to the print head 3, and the history information stored in the storage circuit 200 includes the number of transport errors since the assembly of the print head 3 to the liquid ejecting apparatus 1.

In addition, in a case where the wireless communication module 230 receives the wireless communication signal Wr for reading the information on the transport error count CEC stored in the storage circuit 200 from the external device 10, the wireless communication module 230 generates and outputs to the storage circuit 200 the memory control signal Wmc for reading the information on the transport error count CEC stored in the storage circuit 200. As a result, as the information on the transport error count CEC stored in the storage circuit 200, the transport error count first threshold information CECth1, the transport error count second threshold information CECth2, the transport error count third threshold information CECth3, and the transport error count information CECc are read by the wireless communication module 230.

The wireless communication module 230 generates and outputs to the external device 10 the wireless communication signal Wr including the transport error count first threshold information CECth1, the transport error count second threshold information CECth2, the transport error count third threshold information CECth3, and the transport error count information CECc read from the storage circuit 200. As a result, the transport error count first threshold information CECth1, the transport error count second threshold information CECth2, the transport error count third threshold information CECth3, and the transport error count information CECc are input to the external device 10.

In other words, in the liquid ejecting apparatus 1 according to the present embodiment, the print head 3 transmits the information on the transport error count CEC as the history information to the external device 10 in accordance with a request from the external device 10. As a result, a user who operates the external device 10 can acquire the information on the transport error count CEC indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the transport error count CEC.

The information on the capping processing count CP is information indicating how many times the capping processing of attaching a cap to the nozzle surface 652 where the nozzle 651 is formed in order to reduce a change in the characteristics of the ink stored in the print head 3 has been executed and is stored in storage regions M17 to M20 of the storage circuit 200. In other words, the information on the capping processing count CP is information indicating the state of execution of the capping processing where the cap is attached to the nozzle 651 and is calculated based on how many times the capping processing of attaching the cap to the nozzle surface 652 has been executed since the assembly of the print head 3 to the liquid ejecting apparatus 1.

In such capping processing, the cap comes into contact with the nozzle surface 652 of the print head 3, and thus the nozzle 651 may be damaged by the cap. Accordingly, in the print head 3 to be reused, it is possible to enhance the precision of determination as to whether the print head 3 can be reused by individually storing the information on the capping processing count CP.

Capping processing count first threshold information CPth1 as a piece of the threshold information of the capping processing count CP is stored in the storage region M17, which is one of the storage regions M17 to M20 of the storage circuit 200 storing the information on the capping processing count CP. The capping processing count first threshold information CPth1 corresponds to a threshold for determining whether or not the print head 3 has a use history and is set to, for example, "1".

Capping processing count second threshold information CPth2 as a piece of the threshold information of the capping processing count CP is stored in the storage region M18, which is one of the storage regions M17 to M20 of the storage circuit 200 storing the information on the capping processing count CP. The capping processing count second threshold information CPth2 is a threshold for dividing the state of the print head 3 to be reused. In addition, the capping processing count second threshold information CPth2 may be a threshold indicating whether or not the number of times of the capping processing until the threshold defined by capping processing count third threshold information CPth3, which will be described later, is reached is equal to or greater than a predetermined number. As a result, it is possible to easily estimate the remaining service life of each portion of the print head 3 to be reused.

The capping processing count third threshold information CPth3 as a piece of the threshold information of the capping processing count CP is stored in the storage region M19, which is one of the storage regions M17 to M20 of the storage circuit 200 storing the information on the capping processing count CP. The capping processing count third threshold information CPth3 corresponds to a threshold for determining whether or not the print head 3 can be reused. In other words, a case where the number of times of the capping processing that has been executed since the assembly of the print head 3 to the liquid ejecting apparatus 1 exceeds the capping processing count third threshold information CPth3 means that the print head 3 is not suitable for reuse.

Capping processing count information CPc as the history information of the capping processing count CP is stored in the storage region M20, which is one of the storage regions M17 to M20 of the storage circuit 200 storing the information on the capping processing count CP. The capping processing count information CPc varies with the number of times of the capping processing executed since the incorporation of the print head 3 in the liquid ejecting apparatus 1. In other words, the capping processing count information CPc varies with the state where the print head 3 is incorporated in the liquid ejecting apparatus 1.

An example of the operation of the liquid ejecting apparatus 1 corresponding to the information on the capping processing count CP stored in the storage circuit 200 as described above will be described.

By the print head control circuit 71 outputting, to the storage circuit 200, the memory control signal MC for reading the information on the capping processing count CP stored in the storage circuit 200, the capping processing count first threshold information CPth1, the capping processing count second threshold information CPth2, the capping processing count third threshold information CPth3, and the capping processing count information CPc are read by the print head control circuit 71 as the information on the capping processing count CP stored in the storage circuit 200.

Then, the print head control circuit 71 counts the number of times of the capping processing executed since the assembly of the print head 3 to the liquid ejecting apparatus 1 and adds the counted number of times of the capping processing to the capping processing count information CPc read from the storage circuit 200. Then, the print head control circuit 71 compares the result of the addition with each of the capping processing count first threshold information CPth1, the capping processing count second threshold information CPth2, and the capping processing count third threshold information CPth3.

The print head control circuit 71 controls each portion of the liquid ejecting apparatus 1 including the print head 3 depending on whether the result of adding the counted number of times of the capping processing to the capping processing count information CPc exceeds the capping processing count first threshold information CPth1, the capping processing count second threshold information CPth2, and the capping processing count third threshold information CPth3.

For example, the print head control circuit 71 may execute control for correcting, for example, the ejection speed of the ink ejected from the ejecting portion 600 or the transport speed of the medium P depending on whether or not the addition result exceeds the capping processing count second threshold information CPth2. In addition, in a case where the addition result exceeds the capping processing count third threshold information CPth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of times of the capping processing to the capping processing count information CPc in the storage region M20 of the storage circuit 200 as the capping processing count information CPc at a predetermined timing. Here, the predetermined timing at which the print head control circuit 71 writes the capping processing count information CPc is the same as in the case of the information on the cumulative printing surface count TP described above.

As a result, the storage circuit 200 of the print head 3 stores the information on the capping processing count CP since the assembly of the print head 3 to the liquid ejecting apparatus 1 as the history information varying with the operation state of the print head 3. In other words, the operation state of the print head 3 includes a state where the capping processing of attaching a cap to the nozzle 651 where the liquid is ejected from the ejecting portion 600 is executed, and the history information stored in the storage circuit 200 includes the number of times of the capping processing since the assembly of the print head 3 to the liquid ejecting apparatus 1.

In addition, in a case where the wireless communication module 230 receives the wireless communication signal Wr for reading the information on the capping processing count CP stored in the storage circuit 200 from the external device 10, the wireless communication module 230 generates and outputs to the storage circuit 200 the memory control signal Wmc for reading the information on the capping processing count CP stored in the storage circuit 200. As a result, as the information on the capping processing count CP stored in the storage circuit 200, the capping processing count first threshold information CPth1, the capping processing count second threshold information CPth2, the capping processing count third threshold information CPth3, and the capping processing count information CPc are read by the wireless communication module 230.

The wireless communication module 230 generates and outputs to the external device 10 the wireless communication signal Wr including the capping processing count first threshold information CPth1, the capping processing count second threshold information CPth2, the capping processing count third threshold information CPth3, and the capping processing count information CPc read from the storage circuit 200. As a result, the capping processing count first threshold information CPth1, the capping processing count second threshold information CPth2, the capping processing count third threshold information CPth3, and the capping processing count information CPc are input to the external device 10.

In other words, in the liquid ejecting apparatus 1 according to the present embodiment, the print head 3 transmits the information on the capping processing count CP as the history information to the external device 10 in accordance with a request from the external device 10. As a result, a user who operates the external device 10 can acquire the information on the capping processing count CP indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the capping processing count CP.

The information on the cleaning processing count CL is information indicating how many times cleaning processing for normally ejecting ink from the print head 3, examples of which include the wiping processing for removing a paper piece or the like attached to the nozzle surface 652 of the print head 3 and the flushing processing for maintaining the viscosity of the ink stored in the print head 3 in an appropriate range, has been executed and is stored in storage regions M21 to M24 of the storage circuit 200. In other words, the information on the cleaning processing count CL is information indicating a state where the cleaning processing is executed on the ejecting portion 600 and is calculated based on the numbers of times of the wiping processing and the flushing processing that have been executed on the print head 3 since the assembly of the print head 3 to the liquid ejecting apparatus 1.

Cleaning processing count first threshold information CLth1 as a piece of the threshold information of the cleaning processing count CL is stored in the storage region M21, which is one of the storage regions M21 to M24 of the storage circuit 200 storing the information on the cleaning processing count CL. The cleaning processing count first threshold information CLth1 corresponds to a threshold for determining whether or not the print head 3 has a use history and is set to, for example, “1”.

Cleaning processing count second threshold information CLth2 as a piece of the threshold information of the cleaning processing count CL is stored in the storage region M22, which is one of the storage regions M21 to M24 of the storage circuit 200 storing the information on the cleaning processing count CL. The cleaning processing count second threshold information CLth2 is a threshold for dividing the state of the print head 3 to be reused. In addition, the cleaning processing count second threshold information CLth2 may be a threshold indicating whether or not the number of times of the cleaning processing until the threshold defined by cleaning processing count third threshold information CLth3, which will be described later, is reached is equal to or greater than a predetermined number. As a result, it is possible to easily estimate the remaining service life of each portion of the print head 3 to be reused.

The cleaning processing count third threshold information CLth3 as a piece of the threshold information of the cleaning processing count CL is stored in the storage region M23, which is one of the storage regions M21 to M24 of the storage circuit 200 storing the information on the cleaning processing count CL. The cleaning processing count third threshold information CLth3 corresponds to a threshold for determining whether or not the print head 3 can be reused. In other words, a case where the number of times of the cleaning processing that has been executed since the assembly of the print head 3 to the liquid ejecting apparatus 1 exceeds the cleaning processing count third threshold information CLth3 means that the print head 3 is not suitable for reuse.

Cleaning processing count information CLc as the history information of the cleaning processing count CL is stored in the storage region M24, which is one of the storage regions M21 to M24 of the storage circuit 200 storing the information on the cleaning processing count CL. The cleaning processing count information CLc varies with the number of times of the cleaning processing executed since the incorporation of the print head 3 in the liquid ejecting apparatus 1. In other words, the cleaning processing count information CLc varies with the state where the print head 3 is incorporated in the liquid ejecting apparatus 1.

An example of the operation of the liquid ejecting apparatus 1 corresponding to the information on the cleaning processing count CL stored in the storage circuit 200 as described above will be described.

By the print head control circuit 71 outputting, to the storage circuit 200, the memory control signal MC for reading the information on the cleaning processing count CL stored in the storage circuit 200, the cleaning processing count first threshold information CLth1, the cleaning processing count second threshold information CLth2, the cleaning processing count third threshold information CLth3, and the cleaning processing count information CLc are read by the print head control circuit 71 as the information on the cleaning processing count CL stored in the storage circuit 200.

Then, the print head control circuit 71 counts the number of times of the cleaning processing executed since the assembly of the print head 3 to the liquid ejecting apparatus 1 and adds the counted number of times of the cleaning processing to the cleaning processing count information CLc read from the storage circuit 200. Then, the print head control circuit 71 compares the result of the addition with each of the cleaning processing count first threshold information CLth1, the cleaning processing count second threshold information CLth2, and the cleaning processing count third threshold information CLth3.

The print head control circuit 71 controls each portion of the liquid ejecting apparatus 1 including the print head 3 depending on whether the result of adding the counted number of times of the cleaning processing to the cleaning processing count information CLc exceeds the cleaning processing count first threshold information CLth1, the cleaning processing count second threshold information CLth2, and the cleaning processing count third threshold information CLth3.

For example, the print head control circuit 71 may execute control for correcting, for example, the ejection speed of the ink ejected from the ejecting portion 600 or the transport speed of the medium P depending on whether or not the addition result exceeds the cleaning processing count second threshold information CLth2. In addition, in a case where the addition result exceeds the cleaning processing count third threshold information CLth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of times of the cleaning processing to the cleaning processing count information CLc in the storage region M24 of the storage circuit 200 as the cleaning processing count information CLc at a predetermined timing. Here, the predetermined timing at which the print head control circuit 71 writes the cleaning processing count information CLc is the same as in the case of the information on the cumulative printing surface count TP described above.

As a result, the storage circuit 200 of the print head 3 stores the information on the cleaning processing count CL since the assembly of the print head 3 to the liquid ejecting apparatus 1 as the history information varying with the operation state of the print head 3. In other words, the operation state of the print head 3 includes a state where the cleaning processing is executed, and the history information stored in the storage circuit 200 includes the number of times of the cleaning processing since the assembly of the print head 3 to the liquid ejecting apparatus 1.

In addition, in a case where the wireless communication module 230 receives the wireless communication signal Wr for reading the information on the cleaning processing count CL stored in the storage circuit 200 from the external device 10, the wireless communication module 230 generates and outputs to the storage circuit 200 the memory control signal Wmc for reading the information on the cleaning processing count CL stored in the storage circuit 200. As a result, as the information on the cleaning processing count CL stored in the storage circuit 200, the cleaning processing count first threshold information CLth1, the cleaning processing count second threshold information CLth2, the cleaning processing count third threshold information CLth3, and the cleaning processing count information CLc are read by the wireless communication module 230.

The wireless communication module 230 generates and outputs to the external device 10 the wireless communication signal Wr including the cleaning processing count first threshold information CLth1, the cleaning processing count second threshold information CLth2, the cleaning processing count third threshold information CLth3, and the cleaning processing count information CLc read from the storage circuit 200. As a result, the cleaning processing count first threshold information CLth1, the cleaning processing count second threshold information CLth2, the cleaning processing count third threshold information CLth3, and the cleaning processing count information CLc are input to the external device 10.

In other words, in the liquid ejecting apparatus 1 according to the present embodiment, the print head 3 transmits the information on the cleaning processing count CL as the history information to the external device 10 in accordance with a request from the external device 10. As a result, a user who operates the external device 10 can acquire the information on the cleaning processing count CL indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the cleaning processing count CL.

The information on the wiping processing count WP is information indicating how many times the wiping processing for removing a paper piece or the like attached to the nozzle surface 652 of the print head 3 has been executed and is stored in storage regions M25 to M28 of the storage circuit 200. In other words, the information on the wiping processing count WP includes information indicating the state of execution of the wiping processing of wiping the nozzle surface 652 provided with the nozzle 651 where ink is ejected from the ejecting portion 600. Here, the information on the wiping processing count WP is calculated based on how many times the wiping processing has been executed since the assembly of the print head 3 to the liquid ejecting apparatus 1. During the wiping processing, the nozzle surface 652 of the print head 3 is directly wiped, and thus the nozzle 651 may be damaged. Accordingly, in the print head 3 to be recycled or reused, it is possible to enhance the precision of determination as to whether the print head 3 can be recycled or reused by individually storing the information on the wiping processing count WP.

Wiping processing count first threshold information WPth1 as a piece of the threshold information of the wiping processing count WP is stored in the storage region M25, which is one of the storage regions M25 to M28 of the storage circuit 200 storing the information on the wiping processing count WP. The wiping processing count first threshold information WPth1 corresponds to a threshold for determining whether or not the print head 3 has a use history and is set to, for example, "1".

Wiping processing count second threshold information WPth2 as a piece of the threshold information of the wiping processing count WP is stored in the storage region M26, which is one of the storage regions M25 to M28 of the storage circuit 200 storing the information on the wiping processing count WP. The wiping processing count second threshold information WPth2 is a threshold for dividing the state of the print head 3 to be reused. In addition, the wiping processing count second threshold information WPth2 may be a threshold indicating whether or not the number of times of the wiping processing until the threshold defined by wiping processing count third threshold information WPth3, which will be described later, is reached is equal to or greater than a predetermined number. As a result, it is possible to easily estimate the remaining service life of each portion of the print head 3 to be reused.

The wiping processing count third threshold information WPth3 as a piece of the threshold information of the wiping processing count WP is stored in the storage region M27, which is one of the storage regions M25 to M28 of the storage circuit 200 storing the information on the wiping processing count WP. The wiping processing count third threshold information WPth3 corresponds to a threshold for determining whether or not the print head 3 can be reused. In other words, a case where the number of times of the wiping processing that has been executed since the assembly of the print head 3 to the liquid ejecting apparatus 1 exceeds the wiping processing count third threshold information WPth3 means that the print head 3 is not suitable for reuse.

Wiping processing count information WPc as the history information of the wiping processing count WP is stored in the storage region M28, which is one of the storage regions M25 to M28 of the storage circuit 200 storing the information on the wiping processing count WP. The wiping processing count information WPc varies with the number of times of the wiping processing executed since the incorporation of the print head 3 in the liquid ejecting apparatus 1. In other words, the wiping processing count information WPc varies with the state where the print head 3 is incorporated in the liquid ejecting apparatus 1.

An example of the operation of the liquid ejecting apparatus 1 corresponding to the information on the wiping processing count WP stored in the storage circuit 200 as described above will be described.

By the print head control circuit 71 outputting, to the storage circuit 200, the memory control signal MC for reading the information on the wiping processing count WP stored in the storage circuit 200, the wiping processing count first threshold information WPth1, the wiping processing count second threshold information WPth2, the wiping processing count third threshold information WPth3, and the wiping processing count information WPc are read by the print head control circuit 71 as the information on the wiping processing count WP stored in the storage circuit 200.

Then, the print head control circuit 71 counts the number of times of the wiping processing executed since the assembly of the print head 3 to the liquid ejecting apparatus 1 and adds the counted number of times of the wiping processing to the wiping processing count information WPc read from the storage circuit 200. Then, the print head control circuit 71 compares the result of the addition with each of the wiping processing count first threshold information WPth1, the wiping processing count second threshold information WPth2, and the wiping processing count third threshold information WPth3.

The print head control circuit 71 controls each portion of the liquid ejecting apparatus 1 including the print head 3 depending on whether the result of adding the counted number of times of the wiping processing to the wiping processing count information WPc exceeds the wiping processing count first threshold information WPth1, the wiping processing count second threshold information WPth2, and the wiping processing count third threshold information WPth3.

For example, the print head control circuit 71 may execute control for correcting, for example, the ejection speed of the ink ejected from the ejecting portion 600 or the transport speed of the medium P depending on whether or not the addition result exceeds the wiping processing count second threshold information WPth2. In addition, in a case where the addition result exceeds the wiping processing count third threshold information WPth3, the print head control circuit 71 may execute control for notifying a user of a decrease in the remaining service life of the print head 3 via the information output mechanism 9.

After that, the print head control circuit 71 outputs the memory control signal MC for storing the result of adding the counted number of times of the wiping processing to the wiping processing count information WPc in the storage region M28 of the storage circuit 200 as the wiping processing count information WPc at a predetermined timing. Here, the predetermined timing at which the print head control circuit 71 writes the wiping processing count information WPc is the same as in the case of the information on the cumulative printing surface count TP described above.

As a result, the storage circuit 200 of the print head 3 stores the information on the wiping processing count WP since the assembly of the print head 3 to the liquid ejecting apparatus 1 as the history information varying with the operation state of the print head 3. In other words, the operation state of the print head 3 includes a state where the wiping processing is executed, and the history information stored in the storage circuit 200 includes the number of times of the wiping processing since the assembly of the print head 3 to the liquid ejecting apparatus 1.

In addition, in a case where the wireless communication module 230 receives the wireless communication signal Wr for reading the information on the wiping processing count WP stored in the storage circuit 200 from the external device 10, the wireless communication module 230 generates and outputs to the storage circuit 200 the memory control signal Wmc for reading the information on the wiping processing count WP stored in the storage circuit 200. As a result, as the information on the wiping processing count WP stored in the storage circuit 200, the wiping processing count first threshold information WPth1, the wiping processing count second threshold information WPth2, the wiping processing count third threshold information WPth3, and the wiping processing count information WPc are read by the wireless communication module 230.

The wireless communication module 230 generates and outputs to the external device 10 the wireless communication signal Wr including the wiping processing count first threshold information WPth1, the wiping processing count second threshold information WPth2, the wiping processing count third threshold information WPth3, and the wiping processing count information WPc read from the storage circuit 200. As a result, the wiping processing count first threshold information WPth1, the wiping processing count second threshold information WPth2, the wiping processing count third threshold information WPth3, and the wiping processing count information WPc are input to the external device 10.

In other words, in the liquid ejecting apparatus 1 according to the present embodiment, the print head 3 transmits the information on the wiping processing count WP as the history information to the external device 10 in accordance with a request from the external device 10. As a result, a user who operates the external device 10 can acquire the information on the wiping processing count WP indicating the operation state of the print head 3 without removing the print head 3 assembled to the liquid ejecting apparatus 1 from the liquid ejecting apparatus 1. In other words, the user who operates the external device 10 can easily and accurately determine the state of the print head 3 refurbished for the purpose of reuse based on the acquired information on the wiping processing count WP.

Here, of the various types of information stored in the storage circuit 200, the three pieces of threshold information corresponding to each of the information on the cumulative printing surface count TP, the information on the elapsed day count LD, the information on the error count EC, the information on the transport error count CEC, the information on the capping processing count CP, the information on the cleaning processing count CL, and the information on the wiping processing count WP may be written in, for example, a step of manufacturing the print head 3. The determination threshold for determining the information on whether or not the print head 3 can be reused is determined in a step of manufacturing the print head 3. By storing such a determination threshold in the print head 3, it is possible to determine the state of the print head 3 by a uniform reference during refurbishing for reusing the print head 3. Accordingly, the quality of the liquid ejecting apparatus 1 is stable in the case of re-market distribution of the liquid ejecting apparatus 1 including the reused print head 3.

It should be noted that the three pieces of threshold information corresponding to each of the information on the cumulative printing surface count TP, the information on the elapsed day count LD, the information on the error count EC, the information on the transport error count CEC, the information on the capping processing count CP, the information on the cleaning processing count CL, and the information on the wiping processing count WP read from the storage circuit 200 may be stored in a storage portion (not illustrated) of the print head control circuit 71. In this case, writing in the storage portion may be performed in a step of manufacturing the liquid ejecting apparatus 1. As a result, the storage capacity of the storage circuit 200 of the print head 3 can be reduced.

Further, the respective storage capacities of the storage regions M1 to M28 as illustrated in FIG. 19 are not limited to the same storage capacity and may be different storage capacities depending on the capacity of stored data and a controllable address region.

Here, the wiring substrate 335 provided with the storage circuit 200 is an example of the circuit substrate in the first embodiment. In addition, any of the head main bodies 31-1 to **31-*m* electrically coupled to the wiring substrate 335 is an example of a first ejecting module and the ejecting portion 600 of the head main body 31 corresponding to the first ejecting module is an example of a first ejecting portion. In addition, of the head main bodies 31-1 to 31-*m* electrically coupled to the wiring substrate 335, the head main body 31 different from the head main body 31 corresponding to the first ejecting module is an example of a second ejecting module and the ejecting portion 600 of the head main body 31 corresponding to the second ejecting module is an example of a second ejecting portion. In other words, in the liquid ejecting apparatus 1 of the present embodiment, the print head 3 includes the head main body 31 including the ejecting portion 600 corresponding to the first ejecting portion among the plurality of ejecting portions 600, the head main body 31 including the ejecting portion 600 corresponding to the second ejecting portion among the plurality of ejecting portions 600, and the wiring substrate 335 electrically coupled to the plurality of head main bodies 31, and the storage circuit 200 is disposed on the wiring substrate 335. As a result, the number of storage circuits 200 that the print head 3 is capable of having can be reduced and the size of the print head 3** can be reduced.

1.4 Action and Effect

As described above, the print head 3 according to the present embodiment includes the storage circuit 200 in which the history information that varies with the operation state of the print head 3 is stored, and the wireless communication module 230 that transmits the history information stored in the storage circuit 200 in accordance with a request from the external device 10. As a result, the state of the print head 3 can be grasped based on the history information stored in the storage circuit 200, the state of the print head 3 including the degree of deterioration of the print head 3 and the ejecting portion 600 of the print head 3, which is whether the print head 3 is suitable for reuse, can be determined with high precision, and, by providing the wireless communication module 230, the history information stored in the storage circuit 200 can be easily acquired without using a dedicated jig, wiring, or the like. In other words, in the liquid ejecting apparatus 1 and the print head 3 in the present embodiment, the state of the print head 3 that is reused can be determined with ease and high precision.

2. Second Embodiment

Next, the liquid ejecting apparatus 1 and the print head 3 in a second embodiment will be described. It should be noted that configurations identical to those of the liquid ejecting apparatus 1 and the print head 3 in the first embodiment will be denoted by the same reference numerals and description thereof will be simplified or omitted in the following description of the liquid ejecting apparatus 1 and the print head 3 of the second embodiment.

Figure 20A:
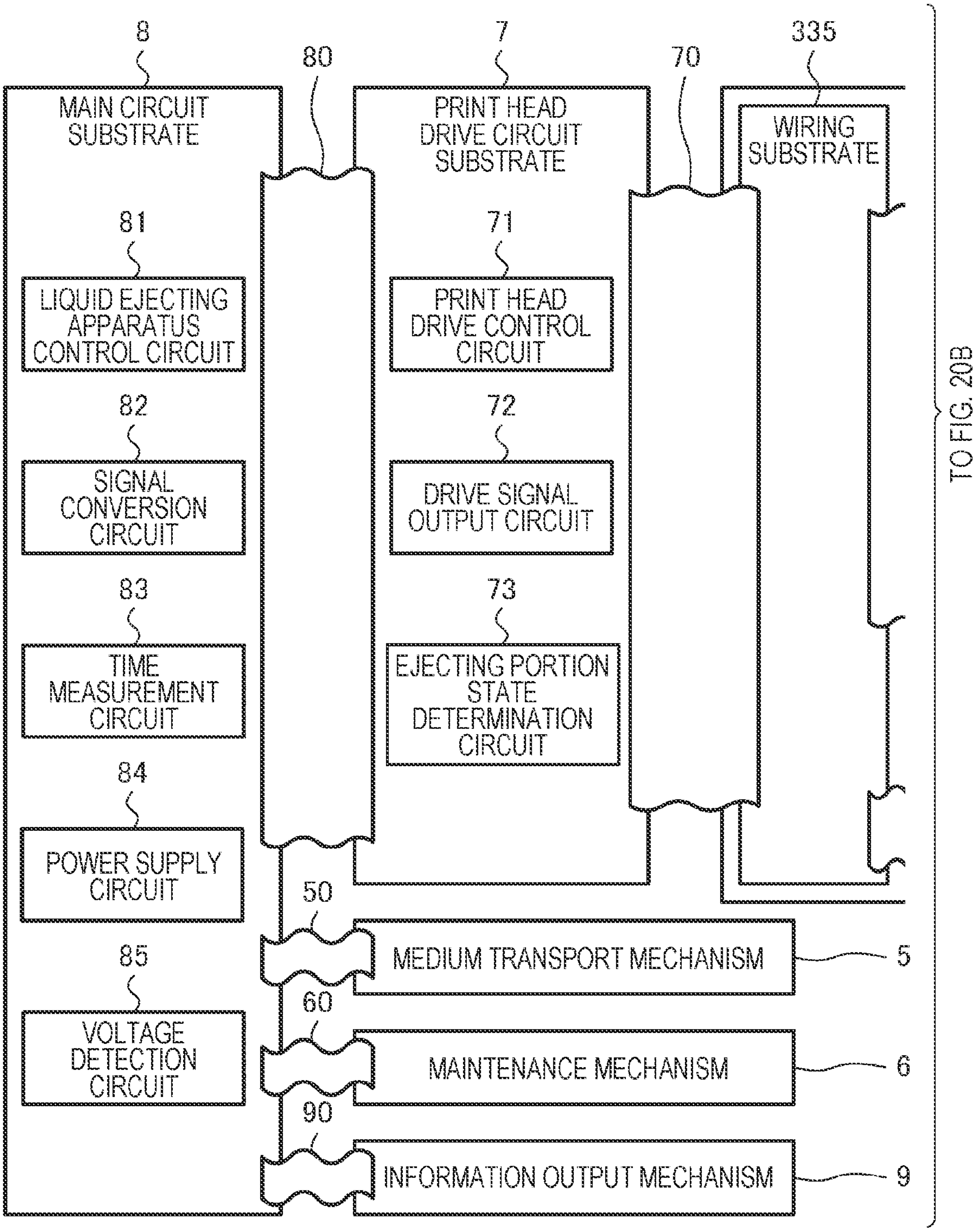
FIGS. 20A and 20B are diagrams illustrating the functional configuration of the liquid ejecting apparatus according to a second embodiment.
Figure 20B:
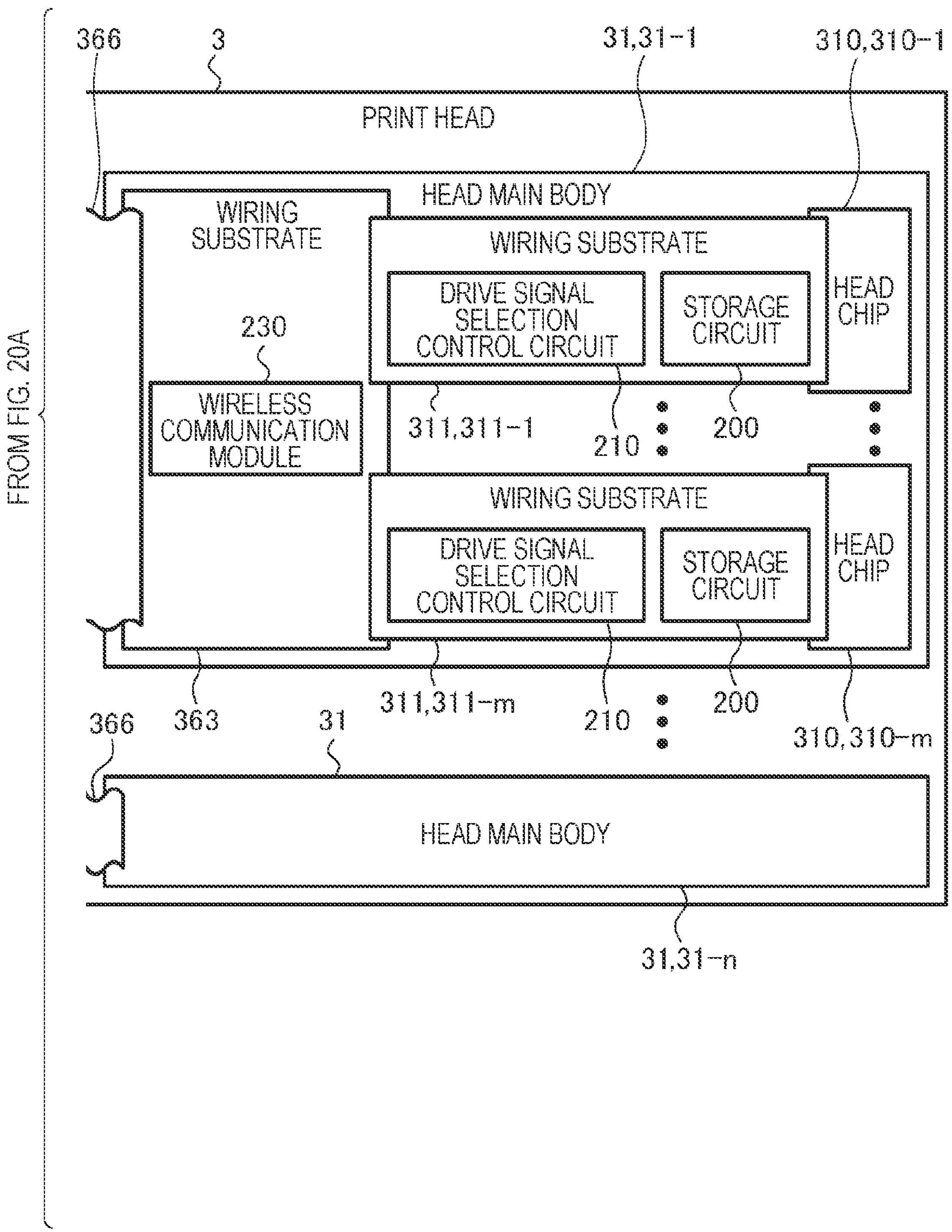

FIGS. 20A and 20B are diagrams illustrating the functional configuration of the liquid ejecting apparatus 1 of the second embodiment. As illustrated in FIG. 20B, the liquid ejecting apparatus 1 in the second embodiment is different from the liquid ejecting apparatus 1 and the print head 3 of the first embodiment in that the storage circuit 200 is mounted on the integrated circuit 312 provided on the flexible wiring substrate 311 and the wireless communication module 230 is provided on the wiring substrate 363. In other words, the print head 3 of the second embodiment includes the head chip 310 including the ejecting portion 600, the flexible wiring substrate 311 electrically coupled to the head chip 310, the wiring substrates 335 and 363 to which the flexible wiring substrate 311 is electrically coupled, and the base member 33 to which the wiring substrates 335 and 363, the head chip 310, and the flexible wiring substrate 311 are assembled. Further, the storage circuit 200 storing the ejecting portion-related information is disposed on the flexible wiring substrate 311.

Here, the configuration that includes the flexible wiring substrate 311 and the head chip 310 including the ejecting portion 600 is an example of an ejecting module and the wiring substrate 363 to which the ejecting module is electrically coupled or the wiring substrate 335 to which the ejecting module is electrically coupled via the cable 366 is an example of a circuit substrate in the second embodiment. Further, the base member 33 to which the wiring substrates 335 and 363, the head chip 310, and the flexible wiring substrate 311 are assembled is an example of a housing.

In the storage circuit 200 configured as described above, the print head 3 in which the head main body 31 including the plurality of head chips 310 is assembled to the base member 33 stores ejecting portion-related information including information on the cumulative printing surface count TP, information on the elapsed day count LD, information on the error count EC, information on the transport error count CEC, information on the capping processing count CP, information on the cleaning processing count CL, and information on the wiping processing count WP for each head chip 310 subsequent to assembly to the liquid ejecting apparatus 1.

In other words, the storage circuit 200 stores history information with respect to each of the plurality of head chips 310. Accordingly, in a case where the print head 3 including the plurality of head chips 310 is reused, it is possible to grasp the reusability and the state of each individual head chip 310 stored in the storage circuit 200 and, further, the wireless communication module 230 is capable of outputting the history information for each of the plurality of head chips 310 stored in the storage circuit 200 to the external device 10.

Accordingly, in the liquid ejecting apparatus 1 and the print head 3 in the second embodiment, it is possible to select the print head 3 that is classified in more detail in accordance with the applications of the liquid ejecting apparatus 1 incorporating the print head 3 to be reused and the state of the print head 3 that is reused can be determined with ease and more precision. As a result, it is possible to further improve user convenience, further reduce the amount of the print heads 3 to be discarded, and further reduce the environmental load.

Although embodiments and modification examples have been described above, the present disclosure is not limited to the embodiments and can be implemented in various aspects without departing from the scope of the present disclosure. For example, the above-described embodiments can be combined as appropriate.

The present disclosure includes a configuration that is substantially identical to the configuration described in the embodiments (such as a configuration identical in function, method, and result and a configuration identical in object and effect). In addition, the present disclosure includes a configuration in which a non-essential part of the configuration described in the embodiments has been replaced. In addition, the present disclosure includes a configuration that is identical in action and effect to the configuration described in the embodiments or a configuration that is capable of achieving the same object as the configuration described in the embodiments. In addition, the present disclosure includes a configuration in which a known technique has been added to the configuration described in the embodiments.

The following content is derived from the embodiment described above.

One aspect of the print head is a print head ejecting a liquid with respect to a medium and assembled to a liquid ejecting apparatus, the print head including:

an ejecting portion ejecting the liquid by receiving a drive signal;

an electrically erasable non-volatile memory; and a wireless communication module, in which history information changing in accordance with an operation state of the print head is stored in the non-volatile memory, and the wireless communication module transmits the history information in accordance with a request from an outside.

According to this print head, by storing the history information changing in accordance with the operation state of the print head in the non-volatile memory, the state of the print head that is reused can be managed with the print head itself. Therefore, the state of the print head can be grasped with high precision based on the information stored in the non-volatile memory. Further, since the print head has the wireless communication module, the history information stored in the non-volatile memory can be easily retrieved to the outside of the print head. In other words, since the print head has the wireless communication module, the information stored in the non-volatile memory can be retrieved without using a dedicated jig, wiring, or the like. As a result, the state of the print head that is reused can be determined with ease and high precision.

In one aspect of the print head, the wireless communication module may include a Wi-Fi module.

In one aspect of the print head, the wireless communication module may include a Bluetooth module.

In one aspect of the print head, the operation state may include a state where the liquid is ejected from the ejecting portion, and the history information may include a cumulative printing surface count of the medium where the liquid is ejected by the ejecting portion after the print head is assembled to the liquid ejecting apparatus.

According to this print head, the state of the print head that is reused can be grasped more precisely.

In one aspect of the print head, the operation state may include a state where the print head is assembled to the liquid ejecting apparatus, and the history information may include an elapsed day count after the print head is assembled to the liquid ejecting apparatus.

According to this print head, the state of the print head that is reused can be grasped more precisely.

In one aspect of the print head, the operation state may include a state where an error occurs in the print head, and the history information may include how many times the error occurs in the print head after the print head is assembled to the liquid ejecting apparatus.

According to this print head, the state of the print head that is reused can be grasped more precisely.

In one aspect of the print head, the operation state may include a state where a transport error occurs in the medium transported to the print head, and the history information may include how many times the transport error occurs after the print head is assembled to the liquid ejecting apparatus.

According to this print head, the state of the print head that is reused can be grasped more precisely.

In one aspect of the print head, the operation state may include a state where capping processing of attaching a cap to a nozzle where the liquid is ejected from the ejecting portion is executed, and the history information may include how many times the capping processing is executed after the print head is assembled to the liquid ejecting apparatus.

According to this print head, the state of the print head that is reused can be grasped more precisely.

In one aspect of the print head, the print head further includes:

a first ejecting module including a first ejecting portion as the ejecting portion;

a second ejecting module including a second ejecting portion as the ejecting portion; and a circuit substrate electrically coupled to the first ejecting module and the second ejecting module, in which the non-volatile memory may be disposed on the circuit substrate.

According to this print head, information indicating the respective states of the first ejecting module and the second ejecting module is stored in one non-volatile memory. As a result, the print head can be reduced in size.

In one aspect of the print head, the print head further includes:

an ejecting module including the ejecting portion;

a circuit substrate electrically coupled to the ejecting module; and a housing where the circuit substrate and the ejecting module are assembled, in which the non-volatile memory may be disposed in the ejecting module.

According to this print head, the non-volatile memory is provided so as to correspond to one ejecting module, and thus reuse is possible on an ejecting module basis and the state of the print head that is reused can be determined more precisely.

One aspect of a liquid ejecting apparatus includes:

a drive signal output circuit outputting a drive signal; and a print head ejecting a liquid with respect to a medium and assembled to the liquid ejecting apparatus, in which the print head includes an ejecting portion ejecting the liquid by receiving the drive signal, an electrically erasable non-volatile memory, and a wireless communication module, history information changing in accordance with an operation state of the print head is stored in the non-volatile memory, and the wireless communication module transmits the history information in accordance with a request from an outside.

According to this liquid ejecting apparatus, by storing the history information changing in accordance with the operation state of the print head in the non-volatile memory of the print head, the state of the print head that is reused can be managed with the print head itself. Therefore, the state of the print head can be grasped with high precision based on the information stored in the non-volatile memory. Further, since the print head has the wireless communication module, the history information stored in the non-volatile memory can be easily retrieved to the outside of the print head. In other words, since the print head has the wireless communication module, the information stored in the non-volatile memory can be retrieved without using a dedicated jig, wiring, or the like. As a result, the state of the print head that is reused can be determined with ease and high precision.

What is claimed is:

1. A print head ejecting a liquid with respect to a medium and assembled to a liquid ejecting apparatus, the print head comprising:

an ejecting portion ejecting the liquid by receiving a drive signal;

an electrically erasable non-volatile memory; and a wireless communication module that wirelessly communicates with an outside located outside of the print head, wherein history information changing in accordance with an operation state of the print head is stored in the non-volatile memory, and the wireless communication module receives, as a request of the history information, a first wireless communication signal from the outside, and in response to receiving the first wireless communication signal from the outside, generates a second wireless communication signal including the history information input from the electrically erasable non-volatile memory, and wirelessly transmits the second wireless communication signal to the outside.

2. The print head according to claim 1, wherein the wireless communication module includes a Wi-Fi module.

3. The print head according to claim 1, wherein the wireless communication module includes a Bluetooth module.

4. The print head according to claim 1, wherein the operation state includes a state where the liquid is ejected from the ejecting portion, and the history information includes a cumulative printing surface count of the medium where the liquid is ejected by the ejecting portion after the print head is assembled to the liquid ejecting apparatus.

5. The print head according to claim 1, wherein the operation state includes a state where the print head is assembled to the liquid ejecting apparatus, and the history information includes an elapsed day count after the print head is assembled to the liquid ejecting apparatus.

6. The print head according to claim 1, wherein the operation state includes a state where an error occurs in the print head, and the history information includes how many times the error occurs in the print head after the print head is assembled to the liquid ejecting apparatus.

7. The print head according to claim 1, wherein the operation state includes a state where a transport error occurs in the medium transported to the print head, and the history information includes how many times the transport error occurs after the print head is assembled to the liquid ejecting apparatus.

8. The print head according to claim 1, wherein the operation state includes a state where capping processing of attaching a cap to a nozzle where the liquid is ejected from the ejecting portion is executed, and the history information includes how many times the capping processing is executed after the print head is assembled to the liquid ejecting apparatus.

9. The print head according to claim 1, further comprising:

a first ejecting module including a first ejecting portion as the ejecting portion;

a second ejecting module including a second ejecting portion as the ejecting portion; and a circuit substrate electrically coupled to the first ejecting module and the second ejecting module, wherein the non-volatile memory is disposed on the circuit substrate.

10. The print head according to claim 1, further comprising:

an ejecting module including the ejecting portion;

a circuit substrate electrically coupled to the ejecting module; and a housing where the circuit substrate and the ejecting module are assembled, wherein the non-volatile memory is disposed in the ejecting module.

11. A liquid ejecting apparatus comprising:

a drive signal output circuit outputting a drive signal; and a print head ejecting a liquid with respect to a medium and assembled to the liquid ejecting apparatus, wherein the print head includes an ejecting portion ejecting the liquid by receiving the drive signal, an electrically erasable non-volatile memory, and a wireless communication module that wirelessly communicates with an outside located outside of the liquid ejecting apparatus, history information changing in accordance with an operation state of the print head is stored in the non-volatile memory, and the wireless communication module receives, as a request of the history information, a first wireless communication signal from the outside, and in response to receiving the first wireless communication signal from the outside, generates a second wireless communication signal including the history information input from the electrically erasable non-volatile memory, and wirelessly transmits the second wireless communication signal to the outside.

* * * * *